US011722774B2

(12) United States Patent
Sharma et al.

(10) Patent No.: US 11,722,774 B2
(45) Date of Patent: Aug. 8, 2023

(54) MOBILE ZOOM USING MULTIPLE OPTICAL IMAGE STABILIZATION CAMERAS

(71) Applicant: Apple Inc., Cupertino, CA (US)

(72) Inventors: Shashank Sharma, San Francisco, CA (US); Scott W. Miller, Los Gatos, CA (US); Aurelien R. Hubert, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/408,304

(22) Filed: Aug. 20, 2021

(65) Prior Publication Data

US 2021/0385387 A1 Dec. 9, 2021

Related U.S. Application Data

(63) Continuation of application No. 16/994,341, filed on Aug. 14, 2020, now Pat. No. 11,102,416, which is a
(Continued)

(51) Int. Cl.
*H04N 23/69* (2023.01)
*H04N 23/45* (2023.01)
(Continued)

(52) U.S. Cl.
CPC ............ *H04N 23/69* (2023.01); *G02B 7/09* (2013.01); *G02B 27/646* (2013.01); *G03B 5/02* (2013.01);
(Continued)

(58) Field of Classification Search
None
See application file for complete search history.

(56) References Cited

U.S. PATENT DOCUMENTS 4,796,755 A 1/1989 Ardenti
7,623,177 B2 11/2009 Nakamura et al.
(Continued)

FOREIGN PATENT DOCUMENTS

CN 1538776 10/2004
CN 1782848 6/2006
(Continued)

OTHER PUBLICATIONS

Official Action dated Jul. 29, 2021 in European Patent Application No. 19191800.2, Apple Inc., pp. 1-6.
(Continued)

*Primary Examiner* — Rodney E Fuller
(74) *Attorney, Agent, or Firm* — Robert C. Kowert; Kowert, Hood, Munyon, Rankin & Goetzel, P.C.

(57) ABSTRACT

A camera system includes a first camera unit and a second camera unit. The first camera unit may include a first actuator. The second camera unit may include a second actuator. The first actuator may move one or more components of the first camera unit to provide autofocus and/or optical image stabilization functionality to the first camera unit. The second actuator may move one or more components of the second camera unit to provide autofocus and/or optical image stabilization functionality to the second camera unit. The first camera unit may be configured to capture a first image of a first visual field. The second camera unit may be configured to capture, simultaneously with the first camera unit capturing the first image, a second image of a second visual field.

20 Claims, 32 Drawing Sheets

Related U.S. Application Data continuation of application No. 16/537,301, filed on Aug. 9, 2019, now Pat. No. 10,750,096, which is a continuation of application No. 15/240,956, filed on Aug. 18, 2016, now Pat. No. 10,382,698.

(60) Provisional application No. 62/235,353, filed on Sep. 30, 2015.

(51) Int. Cl.
    H04N 23/54      (2023.01)
    H04N 23/55      (2023.01)
    H04N 23/57      (2023.01)
    G02B 7/09       (2021.01)
    G02B 27/64      (2006.01)
    G03B 5/02       (2021.01)
    G03B 13/36      (2021.01)

(52) U.S. Cl.
    CPC ............ *G03B 13/36* (2013.01); *H04N 23/45* (2023.01); *H04N 23/54* (2023.01); *H04N 23/55* (2023.01); *H04N 23/57* (2023.01)

(56) References Cited

U.S. PATENT DOCUMENTS

| | | | |
|---|---|---|---|
| 7,724,300 | B2 | 5/2010 | Misawa et al. |
| 8,041,201 | B2 | 10/2011 | Eromaki et al. |
| 8,294,780 | B2 | 10/2012 | Chang |
| 8,542,287 | B2 | 9/2013 | Griffith et al. |
| 8,670,195 | B2 | 3/2014 | Ikushima et al. |
| 8,731,390 | B2 | 5/2014 | Goldenberg et al. |
| 8,792,782 | B1 | 7/2014 | Cheng et al. |
| 8,885,096 | B2 | 11/2014 | Vakil |
| 8,891,185 | B2 | 11/2014 | Phoon et al. |
| 9,083,873 | B1 | 7/2015 | Lewkow |
| 9,143,664 | B2 | 9/2015 | Phoon et al. |
| 9,185,291 | B1 | 9/2015 | Shabtay et al. |
| 9,392,188 | B2 | 7/2016 | Shabtay et al. |
| 9,413,972 | B2 | 8/2016 | Shabtay et al. |
| 9,420,183 | B2 | 8/2016 | Hwang et al. |
| 9,769,389 | B2 | 9/2017 | Miller et al. |
| 9,774,787 | B2 | 9/2017 | Miller et al. |
| 9,781,345 | B1 | 10/2017 | Miller et al. |
| 10,382,698 | B2 | 8/2019 | Sharma et al. |
| 10,750,096 | B2 | 8/2020 | Sharma et al. |
| 11,102,416 | B2 | 8/2021 | Sharma et al. |
| 2003/0020814 | A1 | 1/2003 | Ono |
| 2006/0115256 | A1 | 6/2006 | Nomura |
| 2006/0187312 | A1 | 8/2006 | Labaziewicz et al. |
| 2006/0280492 | A1 | 12/2006 | Chang et al. |
| 2006/0285840 | A1 | 12/2006 | Takahashi |
| 2007/0146503 | A1 | 6/2007 | Shiraki |
| 2008/0030592 | A1 | 2/2008 | Border et al. |
| 2008/0219654 | A1 | 2/2008 | Border et al. |
| 2009/0251777 | A1 | 10/2009 | Suzuki |
| 2010/0097443 | A1 | 4/2010 | Lablans |
| 2010/0277619 | A1 | 11/2010 | Scarff |
| 2011/0001836 | A1* | 1/2011 | Chiang .............. H02K 41/0354 348/208.99 |
| 2011/0050963 | A1 | 3/2011 | Watabe |
| 2011/0052164 | A1 | 3/2011 | Huang et al. |
| 2011/0075999 | A1* | 3/2011 | Chiu .................. H02K 41/0356 359/557 |
| 2011/0169920 | A1 | 7/2011 | Ryu et al. |
| 2011/0228111 | A1 | 9/2011 | Imagawa |
| 2012/0026366 | A1 | 2/2012 | Golan et al. |
| 2012/0039589 | A1* | 2/2012 | Ku ........................ G03B 5/00 396/55 |
| 2012/0154614 | A1 | 6/2012 | Moriya et al. |
| 2012/0287517 | A1* | 11/2012 | Terajima ............ H02K 41/0356 359/824 |
| 2013/0028581 | A1 | 1/2013 | Yeung et al. |
| 2013/0044382 | A1 | 2/2013 | Phoon et al. |
| 2013/0050536 | A1 | 2/2013 | Suzuki et al. |
| 2013/0076919 | A1 | 3/2013 | Gutierrez et al. |
| 2013/0141541 | A1 | 6/2013 | Jung et al. |
| 2013/0162777 | A1 | 6/2013 | Wu et al. |
| 2013/0194466 | A1 | 8/2013 | Cheng et al. |
| 2013/0242057 | A1 | 9/2013 | Hong et al. |
| 2013/0242181 | A1 | 9/2013 | Phoon et al. |
| 2013/0300336 | A1 | 11/2013 | Ishikawa et al. |
| 2014/0092298 | A1 | 4/2014 | Miyawaki |
| 2014/0177056 | A1 | 6/2014 | Hayashi et al. |
| 2014/0218798 | A1 | 8/2014 | Suzuka |
| 2014/0255016 | A1 | 9/2014 | Kim et al. |
| 2014/0267767 | A1* | 9/2014 | Choi ...................... G02B 7/023 348/164 |
| 2014/0313582 | A1* | 10/2014 | Cheng ..................... G02B 7/09 359/557 |
| 2014/0340537 | A1 | 11/2014 | Eromaki |
| 2015/0029601 | A1 | 1/2015 | Dror et al. |
| 2015/0062408 | A1 | 3/2015 | Yano |
| 2015/0070781 | A1 | 3/2015 | Cheng et al. |
| 2015/0085174 | A1 | 3/2015 | Shabtay et al. |
| 2015/0109468 | A1 | 4/2015 | Laroia |
| 2015/0177479 | A1 | 6/2015 | Lee et al. |
| 2015/0215541 | A1 | 7/2015 | Nomura et al. |
| 2015/0244942 | A1 | 8/2015 | Shabtay et al. |
| 2015/0244949 | A1 | 8/2015 | Laroia et al. |
| 2015/0316744 | A1 | 11/2015 | Chen |
| 2016/0018720 | A1 | 1/2016 | Bachar et al. |
| 2016/0112650 | A1 | 4/2016 | Laroia et al. |
| 2016/0182821 | A1 | 6/2016 | Shabtay et al. |
| 2016/0282580 | A1* | 9/2016 | Koyama .................. G02B 7/08 |
| 2016/0316150 | A1 | 10/2016 | Eromaki |
| 2017/0094180 | A1 | 3/2017 | Miller et al. |
| 2017/0094183 | A1 | 3/2017 | Miller et al. |
| 2017/0094187 | A1 | 3/2017 | Sharma et al. |
| 2017/0315376 | A1 | 11/2017 | Hu et al. |
| 2018/0027185 | A1 | 2/2018 | Miller et al. |
| 2018/0046063 | A1 | 2/2018 | Sharma |

FOREIGN PATENT DOCUMENTS

| | | |
|---|---|---|
| CN | 1858975 | 11/2006 |
| CN | 1881008 | 12/2006 |
| CN | 101685235 | 3/2010 |
| CN | 101688965 | 3/2010 |
| CN | 102269857 | 12/2011 |
| CN | 202172446 | 3/2012 |
| CN | 103163716 | 6/2013 |
| CN | 202995127 | 6/2013 |
| CN | 103842875 | 6/2014 |
| CN | 104054020 | 9/2014 |
| CN | 203933331 | 11/2014 |
| CN | 104202527 | 12/2014 |
| CN | 104267559 | 1/2015 |
| CN | 104272716 | 1/2015 |
| CN | 204305162 | 4/2015 |
| CN | 104767915 | 7/2015 |
| CN | 104834158 | 8/2015 |
| CN | 105024516 | 11/2015 |
| CN | 105187695 | 12/2015 |
| EP | 2802937 | 11/2014 |
| JP | 2012208063 | 10/2012 |
| KR | 10-2013-0024314 | 3/2013 |
| KR | 10-2014-0140329 | 12/2014 |
| TW | I498658 | 9/2013 |
| TW | 201518838 | 5/2015 |
| TW | 201518854 | 5/2015 |
| WO | 2015001519 | 1/2015 |
| WO | 2015015383 | 2/2015 |
| WO | 2015068056 | 5/2015 |
| WO | 2015068061 | 5/2015 |
| WO | 2015081563 | 6/2015 |

(56) References Cited

FOREIGN PATENT DOCUMENTS

| WO | 2015124966 | 8/2015 |
|---|---|---|
| WO | 2016156996 | 10/2016 |

OTHER PUBLICATIONS

International Search Report & Written Opinion from PCT/US2016/048475, dated Nov. 2, 2016, Apple Inc., pp. 1-12.
Office Action from Chinese Application No. 201610795517.3, (Chinese Version only) dated Dec. 27, 2018, Apple Inc., pp. 1-14.
U.S. Appl. No. 15/722,848, filed Oct. 2, 2017, Scott W. Miller.
Office Action from Chinese Application No. 201610795517.3, dated Dec. 27, 2018, Apple Inc., pp. 1-14.
Utility Model Patentability Evaluation Report from Chinese Patent No. ZL2016210314866, English Translation & Chinese Version, Apple Inc., pp. 1-15.
Examination Report from Australian Patent No. 2018102069, dated Feb. 15, 2019, (Apple Inc.), pp. 1-5.
Examination Report from European Application No. 16766708.8-1208, (Apple Inc.), dated Feb. 20, 2019, pp. 1-5.
Office Action from Korean Application No. 10-2018-7008979, (Korean Version), dated Mar. 21, 2019, pp. 1-5.
Examination Report from Australian Patent No. 2018100438, dated Jun. 26, 2018, (Apple inc.) pp. 1-6.
Office Action from Chinese Patent Application No. 201811140833.2, dated Feb. 6, 2020, Apple Inc., pp. 1-26.
Extended European Search Report in Application No. 19191800.2-1208, dated Sep. 20, 2019, pp. 1-8.
Office action from Chinese Application No. 201811140833.2, dated Dec. 8, 2020, (English Translation and Chinese Version), pp. 1-41.
Jiang Guang-wen et al, "Design and Implementation of Synchronous Image Acquisition System of Multiple Cameras", vol. 8, No. 2, dated Apr. 2010, (Chinese version only), pp. 1-4.
Office action from Chinese Application No. 202010405369.6, dated Mar. 26, 2021, (English Translation and Chinese Version), pp. 1-20.
Notice of Preliminary Rejection from Korean Application No. 10-2021-7038170, (Korean version, and English translation), dated Aug. 23, 2022, pp. 1-7.

\* cited by examiner

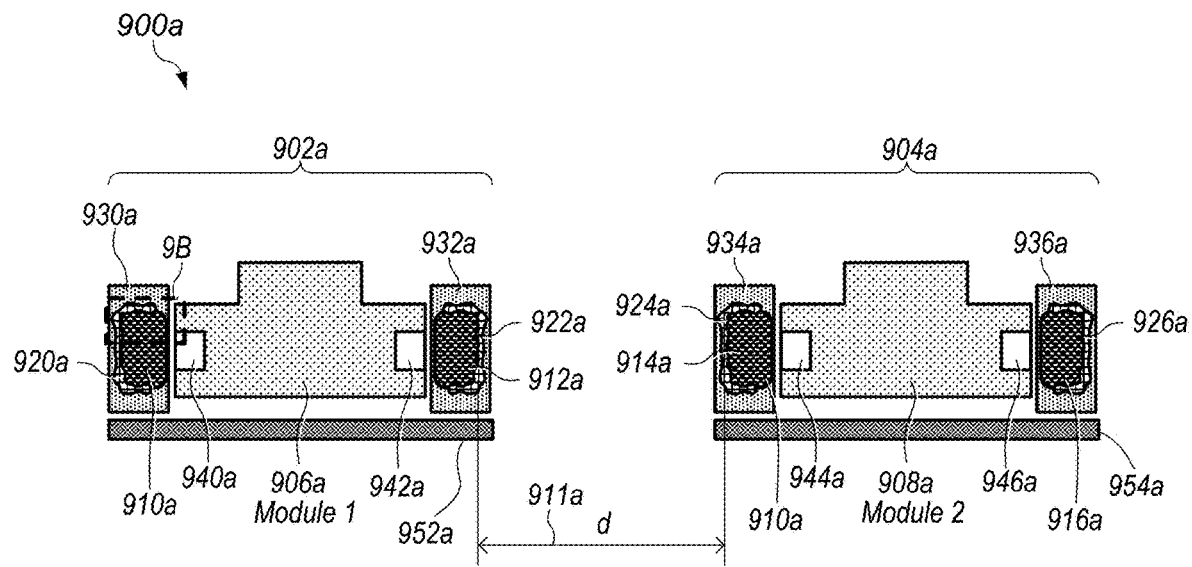
FIG. 9A
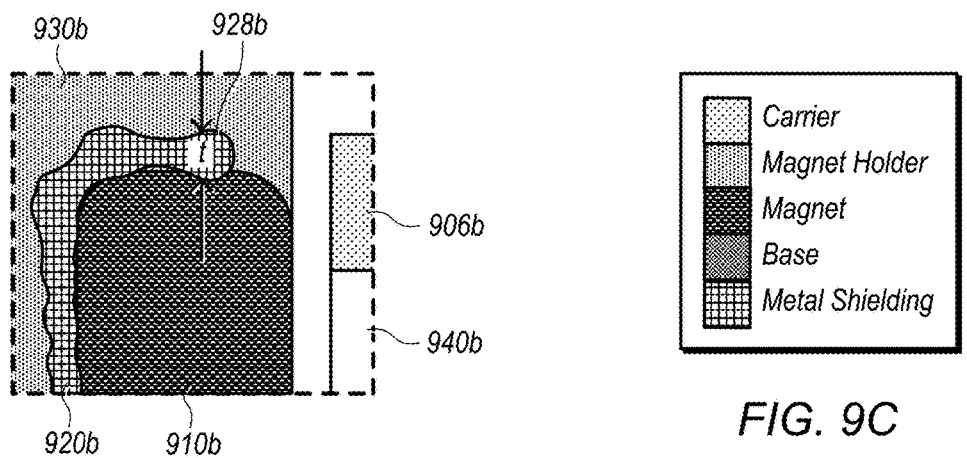
FIG. 9B
FIG. 9C

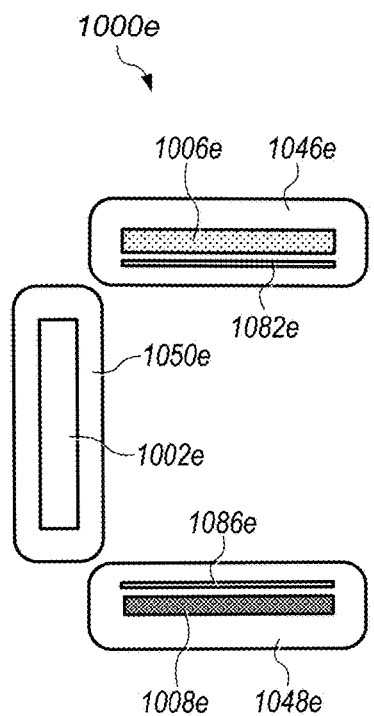
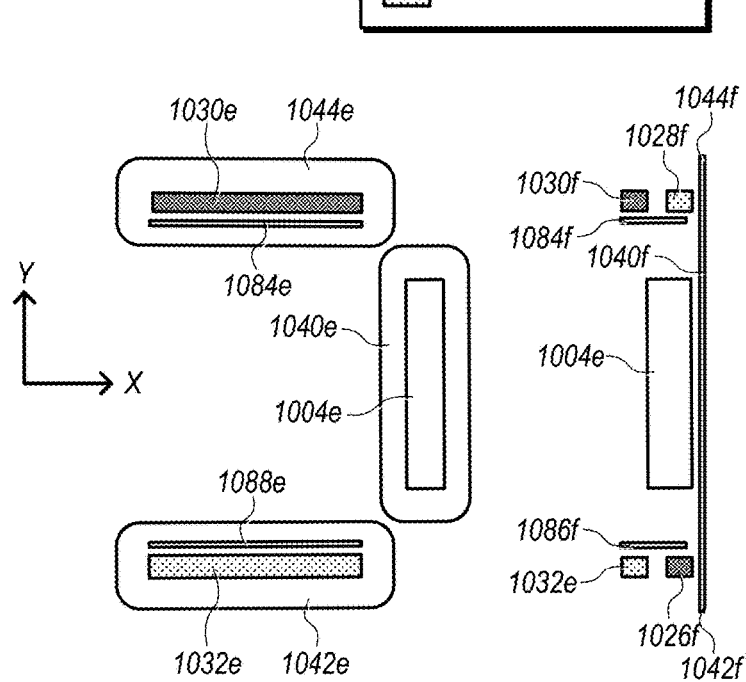
FIG. 10E
FIG. 10F
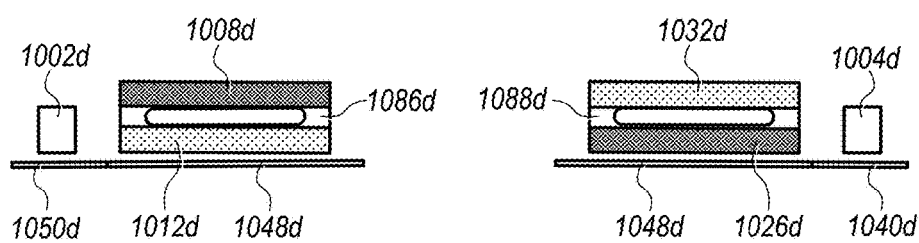
FIG. 10D

MOBILE ZOOM USING MULTIPLE OPTICAL IMAGE STABILIZATION CAMERAS

This application is a continuation of U.S. patent application Ser. No. 16/994,341, filed Aug. 14, 2020, which is a continuation of U.S. patent application Ser. No. 16/537,301, filed Aug. 9, 2019, now U.S. Pat. No. 10,750,096, which is a continuation of application Ser. No. 15/240,956, filed Aug. 18, 2016, now U.S. Pat. No. 10,382,698, which claims benefit of priority to U.S. Provisional Application No. 62/235,353, filed Sep. 30, 2015, which are hereby incorporated by reference herein in their entirety.

BACKGROUND

Technical Field

This disclosure relates generally to camera module components, and, more specifically, to the use of multiple cameras for zoom functions in mobile devices.

Description of the Related Art

The advent of small, mobile multipurpose devices such as smartphones and tablet or pad devices has resulted in a need for high-resolution, small form factor cameras, capable of generating high levels of image quality, for integration in the devices.

Increasingly, as users rely on multifunction devices as their primary cameras for day-to-day use, users demand features, such as zoom photography, that they have become accustomed to using in dedicated-purpose camera bodies. The zoom function is useful for capturing the details of a scene or alternatively capturing the context in which those details exist. The ability to change focal length to achieve zoom effects is sufficiently compelling to users of dedicated purpose cameras that it compels them to carry bags with an array of removable lenses, each of which weighs more and takes up more space than many common examples of a multifunction device, such as a phone.

Providing the zoom feature in a camera unit of a multifunction device has traditionally required moving mechanical parts that increase complexity and cost of the device. Such moving parts also reduce reliability of the device and take up valuable space inside the device, which puts the desire for zoom functions in direct conflict with the desire for smaller camera units that take up less space in the multifunction device.

SUMMARY OF EMBODIMENTS

Some embodiments provide a camera system (e.g., a dual camera system) having a first camera unit and a second camera unit. The first camera unit may include a first actuator configured to move a first optical package. For instance, the first actuator may be configured to move the first optical package along a first optical axis and/or along a first plane that is orthogonal to the first optical axis. The first optical package may include one or more lenses that define the first optical axis. Furthermore, the second actuator may be configured to move the second optical package along a second optical axis and/or along a second plane that is orthogonal to the second optical axis. The second optical package may include one or more lenses that define the second optical axis.

In various examples, the first actuator of the first camera unit may include one or more magnets and/or one or more coils for actuation along the first optical axis and/or along the first plane that is orthogonal to the first optical axis. For instance, at least one of the coils may be configured to receive a current that causes the coil to produce a magnetic field that interacts with at least one magnetic field of the one or more magnets.

In some embodiments, the second actuator of the second camera unit may include one or more magnets and/or one or more coils for actuation along the second optical axis and/or along the second plane that is orthogonal to the second optical axis. For instance, at least one of the coils may be configured to receive a current that causes the coil to produce a magnetic field that interacts with at least one magnetic field of the one or more magnets.

In some embodiments, a first camera unit includes a first actuator for moving a first optical package configured for a first focal length. A second camera unit of the multifunction device for simultaneously capturing a second image of a second visual field includes a second actuator for moving a second optical package configured for a second focal length, and the camera system includes a shared magnet positioned between the first camera unit and the second camera unit to generate magnetic fields usable in creating motion in both the first camera actuator and the second camera actuator.

In some embodiments, a camera system (e.g., a camera system of a multifunction device) and/or a mobile device may include a first camera unit and a second camera unit. The first camera unit may include a first voice coil motor (VCM) actuator configured to move a first optical package. For instance, the first VCM actuator may be configured to move the first optical package along a first optical axis and/or along a first plane that is orthogonal to the first optical axis. The first optical package may include one or more lenses that define the first optical axis. Furthermore, the second camera unit may include a second VCM actuator. The second VCM actuator may be configured to move the second optical package along a second optical axis and/or along a second plane that is orthogonal to the second optical axis. The second optical package may include one or more lenses that define the second optical axis.

In various examples, the first VCM actuator of the first camera unit may include one or more magnets and/or one or more coils for actuation along the first optical axis and/or along the first plane that is orthogonal to the first optical axis. For instance, at least one of the coils may be configured to receive a current that causes the coil to produce a magnetic field that interacts with at least one magnetic field of the one or more magnets.

In some embodiments, the first VCM actuator of the first camera unit may include a symmetric magnet arrangement. Additionally or alternatively, the symmetric magnet arrangement of the first VCM actuator may include four corner magnets.

In some embodiments, the first VCM actuator of the first camera unit may include a symmetric optical image stabilization coil arrangement for actuation along the first plane that is orthogonal to the first optical axis. Additionally or alternatively, the symmetric optical image stabilization arrangement of the first VCM actuator may include four optical image stabilization coils. For instance, the first camera unit may be rectangular in plan, and the four optical image stabilization coils of the symmetric optical image stabilization arrangement may be individually disposed proximate a respective corner of the first camera unit.

In various embodiments, the first VCM actuator of the first camera unit may include at least one autofocus coil for actuation along the first optical axis. For instance, the autofocus coil may be configured to radially surround the first optical package of the first camera unit.

In some embodiments, the second VCM actuator of the second camera unit may include one or more magnets and/or one or more coils for actuation along the second optical axis and/or along the second plane that is orthogonal to the second optical axis. For instance, at least one of the coils may be configured to receive a current that causes the coil to produce a magnetic field that interacts with at least one magnetic field of the one or more magnets.

In some embodiments, the second VCM actuator of the second camera unit may include an asymmetric magnet arrangement. For example, the second camera unit may be rectangular in plan, and the asymmetric magnet arrangement may include a first magnet (e.g., an actuator lateral magnet) disposed proximate a first side of the second camera unit, a second magnet (e.g., an actuator transverse magnet) disposed proximate a second side of the second camera unit, and a third magnet (e.g., an actuator transverse magnet) disposed proximate a third side of the second camera unit. The third side of the second camera unit may be opposite the second side of the second camera unit. In some embodiments, no magnets are disposed proximate a fourth side of the second camera unit. The fourth side of the second camera unit may be opposite the first side of the second camera unit.

In some examples, the second VCM actuator of the second camera unit may include an asymmetric optical image stabilization coil arrangement for actuation along the second plane that is orthogonal to the second optical axis. For example, the asymmetric optical image stabilization coil arrangement may include a first optical image stabilization coil disposed proximate to the first magnet of the asymmetric magnet arrangement, a second optical image stabilization coil disposed proximate to the second magnet of the asymmetric magnet arrangement, and a third optical image stabilization coil disposed proximate the third magnet of the asymmetric magnet arrangement.

In various embodiments, the second VCM actuator of the second camera unit may include one or more autofocus coils for actuation along the second optical axis. For instance, the autofocus coils of the second VCM actuator may include a first autofocus coil disposed proximate the second magnet of the asymmetric magnet arrangement, and a second autofocus coil disposed proximate the third magnet of the asymmetric magnet arrangement.

In some embodiments, the first camera unit may be disposed adjacent to the second camera unit.

BRIEF DESCRIPTION OF THE DRAWINGS

FIGS. 9A-C depict an example embodiment of camera module components including shielded magnets usable for a multiple camera system for portable zoom, according to at least some embodiments.

FIGS. 10A-G depict example embodiments of camera module components including arrays of magnets omitting a center magnet between modules and usable for a multiple camera system for portable zoom, according to at least some embodiments.

FIG. 12B illustrates example coil arrangements of the first camera unit and the second camera unit.

FIG. 12C illustrates example magnet arrangements of the first camera unit and the second camera unit.

Figure 1A:
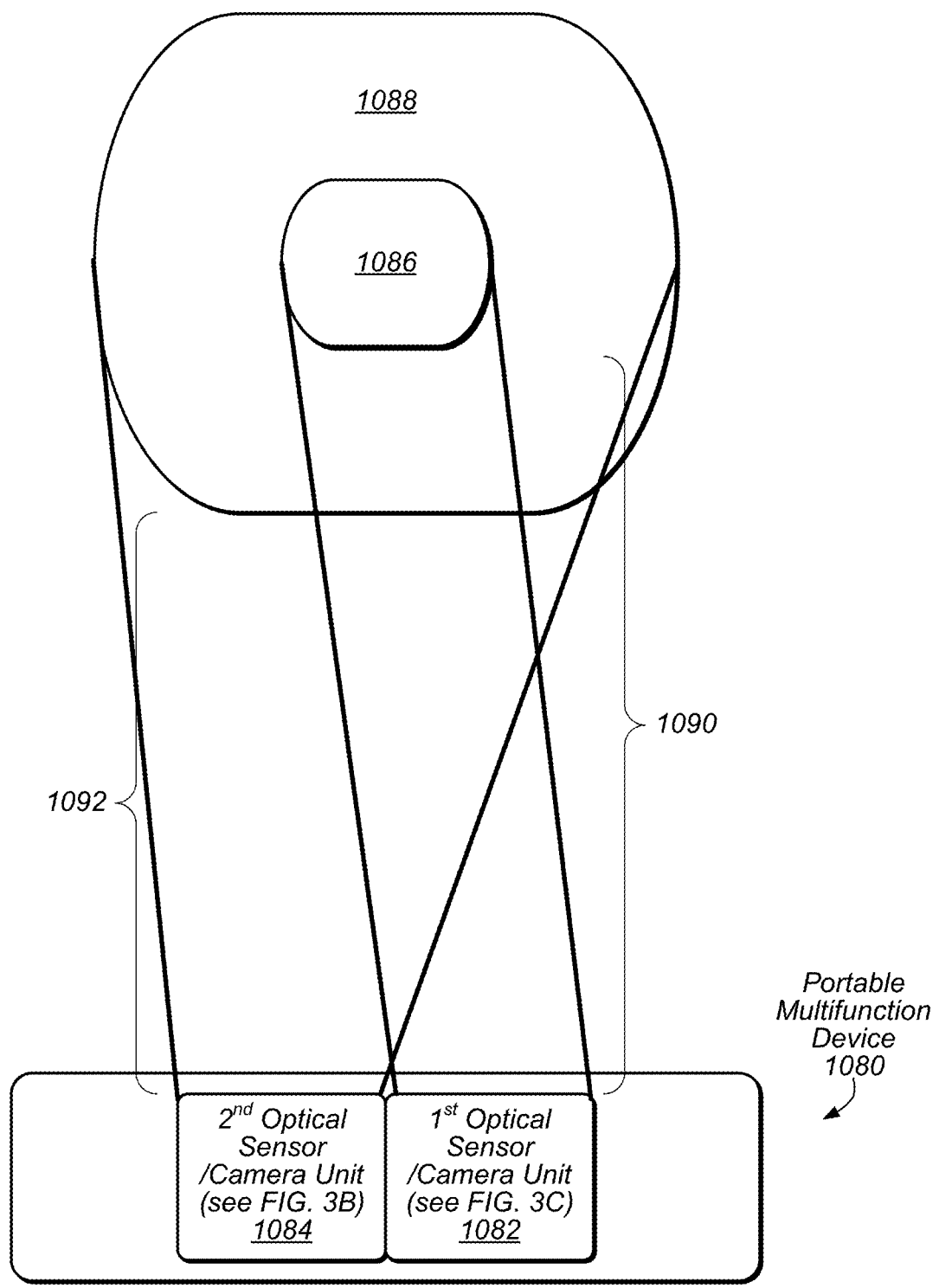
FIG. 1A illustrates a view of an example embodiment of camera module components arranged for multiple visual fields usable for a multiple camera system for portable zoom, according to at least some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Some embodiments provide an apparatus for controlling the motion of mobile components relative to static components. The apparatus can include linear actuators that controls the motion of the mobile components based at least in part upon Lorentz forces. Such linear actuators can be referred to herein as actuator mechanisms. In some embodiments, at least the mobile components included in a camera components or camera systems, such that the actuator mechanisms control the motion of optics carriers, which themselves include one or more optics components and can include one or more optical lenses, relative to one or more image sensors.

Some embodiments include methods and/or systems for using multiple cameras to provide optical zoom to a user. Some embodiments include a first camera unit of a multifunction device capturing a first image of a first visual field. A second camera unit of the multifunction device simultaneously captures a second image of a second visual field. In some embodiments, the first camera unit includes a first optical package with a first focal length. In some embodiments, the second camera unit includes a second optical package with a second focal length. In some embodiments, the first focal length is different from the second focal length, and the first visual field is a subset of the second visual field.

In some embodiments, a first camera unit includes a first actuator for moving a first optical package configured for a first focal length. A second camera unit of the multifunction device for simultaneously capturing a second image of a second visual field includes a second actuator for moving a second optical package configured for a second focal length, and the camera system includes a shared magnet positioned between the first camera unit and the second camera unit to generate magnetic fields usable in creating motion in both the first camera actuator and the second camera actuator.

In some embodiments, the camera system includes a shared magnet holder for the first actuator and the second actuator, to which are attached one or more magnets of the first camera unit and one or more magnets of the second camera unit to generate magnetic fields usable in creating motion in the first camera actuator and the second camera actuator.

In some embodiments, the camera system includes a shared magnet holder for the first actuator and the second actuator, from which the first camera actuator and the second camera actuator are suspended using respective sets of control wires mounted with a pair of control wires in each corner of each respective actuator.

In some embodiments, the camera system includes a shared magnet holder for the first actuator and the second actuator, from which the first camera actuator and the second camera actuator are attached using respective sets of control wires. In some embodiments, the camera system further includes a first actuator lateral magnet positioned opposite the shared magnet with respect to an optical axis of the first camera unit. In some embodiments, the camera system further includes a pair of first actuator transverse magnets situated opposite one another with respect to an axis between the shared magnet and the first actuator lateral magnet. In some embodiments, the camera system further includes a second actuator lateral magnet positioned opposite the shared magnet with respect to an optical axis of the second camera unit; and the camera system further includes a pair of second actuator transverse magnets situated opposite one another with respect to an axis between the shared magnet and the second actuator lateral magnet.

In some embodiments, the camera system includes a shared magnet holder to which are attached one or more side-mounted magnets of the first camera unit and one or more side-mounted magnets of the second camera unit used to generate magnetic fields usable in creating motion in one or more of the first camera actuator and the second camera actuator.

In some embodiments, the camera system includes a shared magnet holder to which are movably articulated one or more coils of the first camera unit and one or more corner-mounted magnets of the second camera unit used to usable in creating motion in one or more of the first camera actuator and the second camera actuator.

Some embodiments include a first camera unit of a multifunction device for capturing a first image of a first visual field. In some embodiments, the first camera unit includes a first actuator for moving a first optical package configured for a first focal length. Some embodiments further include a second camera unit of the multifunction device for simultaneously capturing a second image of a second visual field. In some embodiments, the second camera unit includes a second actuator for moving a second optical package configured for a second focal length, and the camera system includes a shared magnet holder for the first actuator and the second actuator.

In some embodiments, the camera system includes one or more corner magnets of the first camera unit and one or more corner magnets of the second camera unit to generate magnetic fields usable in creating motion in both the first camera actuator and the second camera actuator, and the corner magnets are attached to the shared magnet holder.

In some embodiments, the camera system includes one or more side magnets of the first camera unit and one or more side magnets of the second camera unit to generate magnetic fields usable in creating motion in both the first camera actuator and the second camera actuator, and the magnets are attached to the shared magnet holder.

In some embodiments, the camera system includes one or more magnets of the first camera unit and one or more magnets of the second camera unit to generate magnetic fields usable in creating motion in both the first camera actuator and the second camera actuator, the magnets are attached to the shared magnet holder, and the magnets include a magnet shared between the first camera unit and the second camera unit.

In some embodiments, the first camera actuator and the second actuator are attached to the shared magnet holder using respective sets of control wires mounted with a pair of control wires in each corner of each respective actuator.

In some embodiments, the first camera actuator and the second actuator are suspended from the shared magnet holder using respective sets of control wires mounted in each corner of each respective actuator.

In some embodiments, the camera system further includes a first actuator lateral magnet positioned opposite the shared magnet with respect to an optical axis of the first camera unit. In some embodiments, the camera system further includes a pair of first actuator transverse magnets situated opposite one another with respect to an axis between the shared magnet and the first actuator lateral magnet. In some embodiments, the camera system further includes a second actuator lateral magnet positioned opposite the shared magnet with respect to an optical axis of the second camera unit. In some embodiments, the camera system further includes a pair of second actuator transverse magnets situated opposite one another with respect to an axis between the shared magnet and the second actuator lateral magnet.

In some embodiments, a camera unit of a multifunction device includes an optical package and an actuator. In some embodiments, the actuator includes one or more magnets arranged at multiple sides of the optical package. In some embodiments, one of the one or more magnets is shared with a second actuator for moving a second optical package. In some embodiments, one or more autofocus coils arranged between respective ones of the magnets and the optical package.

In some embodiments, the one or more autofocus coils radially surround the optical package. In some embodiments, the actuator is attached to a magnet holder of the camera using respective sets of control wires mounted with a pair of control wires in each corner of each respective actuator. In some embodiments, the actuator is articulated to a magnet holder of the camera using respective sets of control wires mounted with a pair of control wires in each corner of the actuator. In some embodiments, the magnet holder is shared with one or more magnets of the second actuator.

In some embodiments, the actuator is attached to a magnet holder of the camera using a control wire mounted control wires in each corner of the actuator. In some embodiments, the actuator is suspended from a magnet holder of the camera using a control wire mounted control wires in each corner of the actuator.

In some embodiments, a camera system of a multifunction device includes a first camera unit of the multifunction device for capturing a first image of a first visual field. In some embodiments, the first camera unit includes a first optical image stabilization actuator for moving a first optical package configured for a first focal length. The camera system further includes second camera unit of the multifunction device for simultaneously capturing a second image of a second visual field. In some embodiments, the second camera unit includes a second optical image stabilization actuator for moving a second optical package configured for a second focal length. In some embodiments, the first focal length is different from the second focal length. In some embodiments, the first focal length being different from the second focal length includes both the first focal length and the second focal length being adjustable ranges, which may or may not overlap.

In some embodiments, the camera system includes a shared magnet positioned between the first camera unit and the second camera unit to generate magnetic fields usable in creating motion in both the first camera actuator and the second camera actuator. In some embodiments, the camera system includes a shared magnet positioned between the first camera unit and the second camera unit to generate magnetic fields usable in creating motion in both the first camera actuator and the second camera actuator.

In some embodiments, the camera system further includes a first actuator lateral magnet positioned opposite the shared magnet with respect to an optical axis of the first camera unit. In some embodiments, the camera system further includes a pair of first actuator transverse magnets situated opposite one another with respect to an axis between the shared magnet and the first actuator lateral magnet. In some embodiments, the camera system further includes a second actuator lateral magnet positioned opposite the shared magnet with respect to an optical axis of the second camera unit. In some embodiments, the camera system further includes a pair of second actuator transverse magnets situated opposite one another with respect to an axis between the shared magnet and the second actuator lateral magnet.

In some embodiments, the camera system includes a shared magnet holder to which are attached one or more magnets of the first camera unit and one or more magnets of the second camera unit used to generate magnetic fields usable in creating motion in one or more of the first camera actuator and the second camera actuator. In some embodiments, the camera system includes one or more stationary magnets secured at fixed positions relative to image sensors of the first camera unit and the second camera unit to generate magnetic fields usable in creating motion in one or more of the first camera actuator and the second camera actuator.

In some embodiments, the second camera unit includes a second central magnet array situated along the axis between the first optics package of the first camera unit and the second optics package of the second camera unit. In some embodiments, the second central magnet array includes an second central upper magnet having a first polarity and a second central lower magnet having a polarity antiparallel to the first polarity. In some embodiments, the second camera unit includes a second distal magnet array situated opposite the second central magnet array with respect to the second optics package of the second camera unit. In some embodiments, the second distal magnet array includes a second distal lower magnet having the first polarity and a second distal upper magnet.

In some embodiments, the first camera unit includes a first central magnet array situated along an axis between a first optics package of the first camera unit and a second optics package of the second camera unit. In some embodiments, the first central magnet array includes a first central upper magnet having a first polarity and a first central lower magnet having a polarity antiparallel to the first polarity. In some embodiments, the first camera unit includes a first distal magnet array situated opposite the first central magnet array with respect to the first optics package of the first camera unit. In some embodiments, the first distal magnet array includes a first distal lower magnet having the first polarity and a first distal upper magnet having the polarity antiparallel to the first polarity.

In some embodiments, a magnetic shield is included between the first optical image stabilization actuator and the second optical image stabilization actuator.

In some embodiments, a metallic shield is included between the first optical image stabilization actuator and the second optical image stabilization actuator. In some embodiments, the metallic shield includes steel including at least a quantity of iron, a quantity of manganese, a quantity of Sulphur, a quantity of phosphorus, and a quantity of carbon. In some embodiments, shielding is articulated to individual magnets of the first optical image stabilization actuator and the second optical image stabilization actuator.

In some embodiments, metallic shields are articulated to respective ones of the magnets of the first optical image stabilization actuator and respective ones of the magnets of the second optical image stabilization actuator to reduce magnetic interference between the first optical image stabilization actuator and the second optical image stabilization actuator.

In some embodiments, a method for capturing images with multiple cameras of a multifunction device includes providing optical image stabilization to the multiple cameras. In some embodiments, the method includes a first camera unit of a multifunction device capturing a first image of a first visual field. In some embodiments, the method includes a second camera unit of the multifunction device simultaneously capturing a second image of a second visual field. In some embodiments, the first camera unit includes a first optical package with a first focal length. In some embodiments, the second camera unit includes a second optical package with a second focal length. In some embodiments, the first focal length is different from the second focal length, and the first visual field is a subset of the second visual field. In some embodiments, the method includes providing optical image stabilization to the first camera unit, and providing optical image stabilization to the second camera unit.

In some embodiments, the providing optical image stabilization to the first camera unit and the providing optical image stabilization to the second camera unit further include moving the first camera unit and the second camera unit independently of one another.

In some embodiments, the providing optical image stabilization to the first camera unit and the providing optical image stabilization to the second camera unit further include moving the first camera unit and the second camera unit in unison.

In some embodiments, the providing optical image stabilization to the first camera unit and the providing optical image stabilization to the second camera unit further include generating a first magnetic field in the first camera unit and a second magnetic field in the second camera unit based on a magnet shared between the first camera unit and the second camera unit.

In some embodiments, the providing optical image stabilization to the first camera unit and the providing optical image stabilization to the second camera unit further include moving the first camera unit and the second camera unit in unison through operation of a first camera unit actuator and a second camera unit actuator that share a central magnet.

In some embodiments, the providing optical image stabilization to the first camera unit and the providing optical image stabilization to the second camera unit further include moving the first camera unit and the second camera unit in unison through operation of a first camera unit actuator and a second camera unit actuator that share a magnet holder.

Some embodiments include a non-transitory computer-readable storage medium, storing program instructions computer-executable to implement capturing a first image of a first visual field with a first camera unit of a multifunction device, simultaneously capturing a second image of a second visual field with a second camera unit of the multifunction device, providing optical image stabilization to the first camera unit, and providing optical image stabilization to the second camera unit.

In some embodiments, the first camera unit includes a first optical package with a first focal length, the second camera unit includes a second optical package with a second focal length, the first focal length is different from the second focal length, and the first visual field is a subset of the second visual field.

In some embodiments, the program instructions computer-executable to implement providing optical image stabilization to the first camera unit and the providing optical image stabilization to the second camera unit further include program instructions computer-executable to implement moving the first camera unit and the second camera unit independently of one another.

In some embodiments, the program instructions computer-executable to implement providing optical image stabilization to the first camera unit and the providing optical image stabilization to the second camera unit further include program instructions computer-executable to implement moving the first camera unit and the second camera unit in unison.

In some embodiments, the program instructions computer-executable to implement providing optical image stabilization to the first camera unit and the program instructions computer-executable to implement providing optical image stabilization to the second camera unit further include program instructions computer-executable to implement generating a first magnetic field in the first camera unit and a second magnetic field in the second camera unit based on a magnet shared between the first camera unit and the second camera unit.

In some embodiments, the program instructions computer-executable to implement providing optical image stabilization to the first camera unit and the program instructions computer-executable to implement providing optical image stabilization to the second camera unit further include program instructions computer-executable to implement moving the first camera unit and the second camera unit in unison through operation of a first camera unit actuator and a second camera unit actuator that share a magnet holder.

In some embodiments, a camera system of a multifunction device includes a first camera unit of a multifunction device for capturing a first image of a first visual field. In some embodiments, the first camera unit includes a first actuator for moving a first optical package configured for a first focal length. In some embodiments, a camera system of a multifunction device includes a second camera unit of the multifunction device for simultaneously capturing a second image of a second visual field. In some embodiments, the second camera unit includes a second actuator for moving a second optical package configured for a second focal length. In some embodiments, the second actuator includes a second actuator lateral magnet. In some embodiments, the first optical package and the second optical package are situated between the first actuator later magnet and the second actuator lateral magnet along an axis between the first actuator lateral magnet and the second actuator lateral magnet. In some embodiments, no actuator lateral magnets are situated between the first optical package and the second optical package along the axis.

In some embodiments, the first actuator lateral magnet and the second actuator lateral magnet have polarities aligned antiparallel to one another. In some embodiments, the first camera unit and the second camera unit each include a respective first pair of first actuator transverse magnets situated opposite one another with respect to the axis between the first actuator lateral magnet and the second actuator lateral magnet, and the first camera unit and the second camera unit each include a respective second pair of first actuator transverse magnets situated opposite one another with respect to the axis between the first actuator lateral magnet and the second actuator lateral magnet.

In some embodiments, the magnets of the respective first pair of first actuator transverse magnets have polarity alignments parallel to the respective alignments of corresponding respective magnets of the first pair of second actuator transverse magnets.

In some embodiments, the magnets of the respective first pair of first actuator transverse magnets have polarity alignments antiparallel to the respective alignments of corresponding respective magnets of the first pair of second actuator transverse magnets.

In some embodiments, the first actuator lateral magnet and the second actuator lateral magnet have polarities aligned at right angles to polarities of the respective first pair of first actuator transverse magnets.

Some embodiments further include coils aligned with current circulating in a plane parallel to a plane in which the first actuator lateral magnet and the second actuator lateral magnet have polarities aligned.

In some embodiments, a camera unit of a multifunction device includes an optical package and an actuator for moving the optical package to a first focal length. In some embodiments, the actuator includes a lateral magnet to one side of the optical package, and a first pair of first actuator transverse magnets situated on sides opposite one another with respect to an axis between the optical package and the lateral magnet. In some embodiments, the lateral magnet is situated one on one side of the optical package at which no transverse magnets are present. In some embodiments, no actuator lateral magnet is situated on a remaining side of the optical package at which neither the lateral magnet nor the transverse magnets are situated.

In some embodiments, coils are aligned with current circulating in a plane parallel to a plane in which the lateral magnet and the transverse magnets have polarities aligned.

In some embodiments, coils are aligned with current circulating in a plane perpendicular to a plane in which the lateral magnet and the transverse magnets have polarities aligned.

In some embodiments, a second pair of first actuator transverse magnets is situated opposite one another with respect to the axis between the lateral magnet and the optical package. In some embodiments, the magnets of the first pair of transverse magnets have polarity alignments antiparallel to one another.

In some embodiments, the magnets of the second pair of transverse magnets have polarity alignments antiparallel to one another. In some embodiments, the magnets of the first pair of transverse magnets have polarity alignments antiparallel to magnets of the second pair of transverse magnets situated on a same side of the axis between the lateral magnet and the optical package.

Some embodiments include an actuator having a lateral magnet for moving an optical package, wherein the lateral magnet is situated to one side of the optical package, and a first pair of first actuator transverse magnets situated on sides opposite one another with respect to an axis between the optical package and the lateral magnet. In some embodiments, the lateral magnet is situated one on one side of the optical package at which no transverse magnets are present, and no actuator lateral magnet is situated on a remaining side of the optical package at which nether the lateral magnet nor the transverse magnets are situated.

In some embodiments, coils are aligned with current circulating in a plane parallel to a plane in which the lateral magnet and the transverse magnets have polarities aligned. In some embodiments, coils are aligned with current circulating in a plane perpendicular to a plane in which the lateral magnet and the transverse magnets have polarities aligned.

In some embodiments, a second pair of first actuator transverse magnets situated opposite one another with respect to the axis between the lateral magnet and the optical package. In some embodiments, the magnets of the first pair of transverse magnets have polarity alignments antiparallel to one another. In some embodiments, the magnets of the second pair of transverse magnets have polarity alignments antiparallel to one another.

In some embodiments, a camera system of a multifunction device includes a first camera unit of the multifunction device for capturing a first image of a first visual field. In some embodiments, the first camera unit includes a first actuator for moving a first optical package. In some embodiments, the camera system further includes a second camera unit for simultaneously capturing a second image of a second visual field. In some embodiments, the second camera unit includes a second actuator for moving a second optical package. The second camera unit includes a second central magnet array situated along the axis between the first optics package of the first camera unit and the second optics package of the second camera unit. In some embodiments, the second central magnet array includes a second central upper magnet having a first polarity and a second central lower magnet having a polarity antiparallel to the first polarity. In some embodiments, the second camera unit includes a second distal magnet array situated opposite the second central magnet array with respect to the second optics package of the second camera unit. In some embodiments, the second distal magnet array includes a second distal lower magnet having the first polarity and a second distal upper magnet having the polarity antiparallel to the first polarity.

In some embodiments, the first camera unit includes a first central magnet array situated along an axis between a first optics package of the first camera unit and a second optics package of the second camera unit. In some embodiments, the first central magnet array includes a first central upper magnet having a first polarity and a first central lower magnet having a polarity antiparallel to the first polarity. In some embodiments, the first camera unit includes a first distal magnet array situated opposite the first central magnet array with respect to the first optics package of the first camera unit. In some embodiments, the first distal magnet array includes a first distal lower magnet having the first polarity and a first distal upper magnet having the polarity antiparallel to the first polarity.

Some embodiments further include an autofocus coil unit of the second actuator. In some embodiments, the autofocus coil unit is situated between the second optical package and the second central magnet array.

Some embodiments further include an autofocus coil unit of the second actuator. In some embodiments, the autofocus coil unit is situated between the second optical package and the second central magnet array. In some embodiments, an exterior coil unit of the second actuator, wherein the exterior coil unit includes one or more SP coils situated between the second central magnet array and the first camera unit.

In some embodiments, the exterior coil unit includes an upper exterior coil segment radially surrounding the second optical package and having a current circulating in a first direction around the second optical package, and a lower exterior coil segment radially surrounding the second optical package and having a current circulating in a second direction around the second optical package. In some embodiments, the second direction is opposite the first direction.

In some embodiments, the exterior coil unit includes an upper exterior coil segment situated at a side of the second optical package and having a current circulating along a side of the second optical package, and a lower exterior coil segment situated at the side of the second optical package and having a current circulating along the side of the second optical package.

In some embodiments, the autofocus coil unit includes an upper autofocus coil segment radially surrounding the second optical package and having a current circulating in a first direction around the second optical package, and a lower autofocus coil segment radially surrounding the second optical package and having a current circulating in a second direction around the second optical package. In some embodiments, the second direction is opposite the first direction.

Some embodiments include a camera unit of a multifunction device. In some embodiments, the camera unit includes an optical package; and an actuator. In some embodiments, the actuator includes one or more magnet arrays including a plurality of magnets arranged at multiple sides of the optical package, one or more autofocus coils arranged between respective ones of the magnet arrays and the optical package, and one or more exterior coils arranged opposite the autofocus coils with respect to the magnet arrays.

In some embodiments, the one or more autofocus coils radially surround the optical package.

In some embodiments, each of the one or more magnet arrays includes an upper magnet having a magnetic field aligned in a first direction inward toward the optical package, and each of the one or more magnet arrays further includes a lower magnet having a magnetic field aligned in a second direction outward from the optical package.

In some embodiments, each of the one or more magnet arrays includes an upper magnet having a magnetic field aligned in a first direction, and each of the one or more magnet arrays further includes a lower magnet having a magnetic field aligned in a second direction antiparallel to the first direction.

In some embodiments, the one or more autofocus coils include an upper autofocus coil segment radially surrounding the second optical package and having a current circulating in a first direction around the second optical package, and a lower autofocus coil segment radially surrounding the second optical package and having a current circulating in a second direction around the second optical package. In some embodiments, the second direction is opposite the first direction.

In some embodiments, the one or more exterior coils include an upper exterior coil segment radially surrounding the second optical package and having a current circulating in a first direction around the second optical package, and a lower exterior coil segment radially surrounding the second optical package and having a current circulating in a second direction around the second optical package. In some embodiments, the second direction is opposite the first direction.

In some embodiments, the one or more exterior coils include an upper exterior coil segment situated at a side of the second optical package and having a current circulating along a side of the second optical package, and a lower exterior coil segment situated at the side of the second optical package and having a current circulating along the side of the second optical package in a same direction as the upper exterior coil segment.

In some embodiments, a camera system includes a first camera unit and a second camera unit. The first camera unit is a first camera unit for capturing a first image of a first visual field. In some embodiments, the first camera unit includes a first actuator for moving a first optical package within a first range of focal lengths. The second camera unit is a second camera unit for simultaneously capturing a second image of a second visual field. In some embodiments, the second visual field is a subset of the first visual field. In some embodiments, the second camera unit includes a second actuator for moving a second optical package. In some embodiments, the second camera unit includes a second central magnet array situated along the axis between the first optics package of the first camera unit and the second optics package of the second camera unit. In some embodiments, the second central magnet array includes a second central upper magnet having a first polarity and a second central lower magnet having a polarity antiparallel to the first polarity.

In some embodiments, the second camera unit includes a second distal magnet array situated opposite the second central magnet array with respect to the second optics package of the second camera unit, and the second distal magnet array includes a second distal lower magnet having the first polarity and a second distal upper magnet having the polarity antiparallel to the first polarity.

In some embodiments, the first camera unit includes a first central magnet array situated along an axis between a first optics package of the first camera unit and a second optics package of the second camera unit, and the first central magnet array includes a first central upper magnet having a first polarity and a first central lower magnet having a polarity antiparallel to the first polarity.

In some embodiments, the first camera unit includes a first distal magnet array situated opposite the first central magnet array with respect to the first optics package of the first camera unit, and the first distal magnet array includes a first distal lower magnet having the first polarity and a first distal upper magnet having the polarity antiparallel to the first polarity.

Some embodiments further include an autofocus coil unit of the second actuator, wherein the autofocus coil unit is situated between the second optical package and the second central magnet array.

Some embodiments further include an exterior coil unit of the second actuator. In some embodiments, the exterior coil unit includes one or more SP coils situated between the second central magnet array and the first camera unit.

In some embodiments, the first image and the second image are preserved to a storage medium as separate data structures. In some embodiments, the first image and second image are of different media types. For example, in some embodiments, the first image is a moving image data structure captured at a first frame rate. In some embodiments, the second image is a moving image data structure captured at a second frame rate. In some embodiments, the second frame rate is faster than the first frame rate. In some embodiments, the first image is a still image taken at time t(0), and the second image is a moving image data structure captured over a time interval including t(0).

Some embodiments assign metadata to the first image and the second image a time indexing feature for establishing that the first image and the second image correspond as having been simultaneously captured or captured at overlapping time intervals. Some embodiments display the first image in a screen interface with a control for switching to display of the second image, and, responsive to an actuation of the control, display the second image in place of the first image. Some embodiments generate a synthetic intermediate image at least in part from data of the first image and data of the second image. In some embodiments, the synthetic intermediate image has a third focal length different from each of the first focal length and the second focal length, and the synthetic intermediate image has a third visual field different from each of the first visual field and the second visual field. Some embodiments preserve storage of the first image and data of the second image after creation of the synthetic intermediate image.

Some embodiments generate a synthetic result image at least in part from data of the first image and data of the second image. In some embodiments, the synthetic intermediate image has is generated by enhancing the first image using data from the second image. Some embodiments display the first image and the second image in a shared screen interface.

Some embodiments include a camera system of a multifunction device. In some embodiments, the camera system includes a first camera unit of a multifunction device for capturing a first image of a first visual field and a second camera unit of the multifunction device for simultaneously capturing a second image of a second visual field. In some embodiments, the first camera unit includes a first optical package configured for a first focal length. In some embodiments, the second camera unit includes a second optical package configured for a second focal length. In some embodiments, the first focal length is different from the second focal length.

In some embodiments, the camera system includes a processing unit configured to assign to the first image and the second image a time indexing feature for establishing that the first image and the second image were simultaneously captured. In some embodiments, the first camera unit includes a lens having a folded lens configuration with a longer focal length than a lens of the second camera unit, and the second visual field is centered on a second visual axis aligned with a first visual axis on which the first visual field is centered.

In some embodiments, the first camera unit includes a lens having a longer focal length than a lens of the second camera unit, and the second visual field is centered on a second visual axis aligned with a first visual axis on which the first visual field is centered. In some embodiments, the first camera unit includes a first movable lens and a first image sensor attached a chassis of the camera unit, the second camera unit includes a lens and a second image sensor movably attached a chassis of the camera unit.

In some embodiments, the first camera unit includes a first movable lens and a first image sensor attached a chassis of the camera unit, and the second camera unit includes a lens and a second image sensor movably attached a chassis of the camera unit. In some embodiments, the first camera unit and the second camera unit include a first image processing pipeline and a second image processing pipeline, respectively.

Some embodiments include a non-transitory computer-readable storage medium, storing program instructions, computer-executable to implement a first camera unit of a multifunction device capturing a first image of a first visual field, and a second camera unit of the multifunction device simultaneously capturing a second image of a second visual field. In some embodiments, the first camera unit includes a first optical package with a first focal length, the second camera unit includes a second optical package with a second focal length, the first focal length is different from the second focal length, and the first visual field is a subset of the second visual field.

In some embodiments, the program instructions are further computer-executable to implement assigning metadata to the first image and the second image a time indexing feature for establishing that the first image and the second image correspond as having been simultaneously captured. In some embodiments, the program instructions are further computer-executable to implement displaying the first image in a screen interface with a control for switching to display of the second image, and responsive to an actuation of the control, displaying the second image in place of the first image.

In some embodiments, the program instructions are further computer-executable to implement generating a synthetic intermediate image from data of the first image and data of the second image. In some embodiments, the synthetic intermediate image has a third focal length different from each of the first focal length and the second focal length, and the synthetic intermediate image has a third visual field different from each of the first visual field and the second visual field. In some embodiments, the program instructions are further computer-executable to implement preserving storage of the first image and data of the second image after creation of the synthetic intermediate image. In some embodiments, the synthetic intermediate image has is generated by enhancing the first image using data from the second image. In some embodiments, the program instructions are further computer-executable to implement displaying the first image and the second image in a shared screen interface.

In some embodiments, the first image is a moving image data structure captured at a first frame rate. In some embodiments, the second image is a moving image data structure captured at a second frame rate. In some embodiments, the second frame rate is faster than the first frame rate. In some embodiments, the first image is a still image taken at time t(0), and the second image is a moving image data structure captured over a time interval including t(0).

In some embodiments, a camera system (e.g., a camera system of a multifunction device) and/or a mobile device may include a first camera unit and a second camera unit. The first camera unit may include a first voice coil motor (VCM) actuator configured to move a first optical package. For instance, the first VCM actuator may be configured to move the first optical package along a first optical axis and/or along a first plane that is orthogonal to the first optical axis. The first optical package may include one or more lenses that define the first optical axis. Furthermore, the second camera unit may include a second VCM actuator. The second VCM actuator may be configured to move the second optical package along a second optical axis and/or along a second plane that is orthogonal to the second optical axis. The second optical package may include one or more lenses that define the second optical axis.

In various examples, the first VCM actuator of the first camera unit may include one or more magnets and/or one or more coils for actuation along the first optical axis and/or along the first plane that is orthogonal to the first optical axis. For instance, at least one of the coils may be configured to receive a current that causes the coil to produce a magnetic field that interacts with at least one magnetic field of the one or more magnets.

In some embodiments, the first VCM actuator of the first camera unit may include a symmetric magnet arrangement. For example, the first camera unit may be rectangular in plan, and the symmetric magnet arrangement may include multiple magnets that are individually arranged to exhibit mirror symmetry about a respective plane that is angled, at a non-zero angle, with respect to at least one side of the first camera unit. In some examples, the symmetric magnet arrangement may include four magnets that are individually arranged to exhibit mirror symmetry about a respective plane that is angled, at a non-zero angle, with respect to at least one side of the first camera unit. For instance, in some embodiments, the magnets may be individually arranged to exhibit mirror symmetry about a respective plane that is angled at or about 45 degrees with respect to at least one side of the first camera unit.

Additionally or alternatively, the symmetric magnet arrangement of the first VCM actuator may include four corner magnets. For instance, the first camera unit may be rectangular in plan, and the four corner magnets of the symmetric magnet arrangement may be individually disposed proximate a respective corner of the first camera unit.

In some embodiments, the first VCM actuator of the first camera unit may include a symmetric optical image stabilization coil arrangement for actuation along the first plane that is orthogonal to the first optical axis. For example, the first camera unit may be rectangular in plan, and the symmetric optical image stabilization coil arrangement may include multiple optical image stabilization coils that are individually arranged to exhibit mirror symmetry about a respective plane that is angled, at a non-zero angle, with respect to at least one side of the first camera unit. In some examples, the symmetric optical image stabilization coil arrangement may include four optical image stabilization coils that are individually arranged to exhibit mirror symmetry about a respective plane that is angled, at a non-zero angle, with respect to at least one side of the first camera unit. For instance, in some embodiments, the coils may be individually arranged to exhibit mirror symmetry about a respective plane that is angled at or about 45 degrees with respect to at least one side of the first camera unit.

Additionally or alternatively, the symmetric optical image stabilization arrangement of the first VCM actuator may include four optical image stabilization coils. For instance, the first camera unit may be rectangular in plan, and the four optical image stabilization coils of the symmetric optical image stabilization arrangement may be individually disposed proximate a respective corner of the first camera unit.

In some embodiments, at least one magnet of the symmetric magnet arrangement may be configured to magnetically interact with a corresponding optical image stabilization coil of the symmetric optical image stabilization coil arrangement. According to some examples, the first camera unit may be rectangular in plan, and a combined arrangement of the magnet and the corresponding optical image stabilization coil may exhibit mirror symmetry about a plane that is angled, at a non-zero angle, with respect to at least one side of the first camera unit. For instance, in some embodiments, the combined arrangement of the magnet and the corresponding optical image stabilization coil may exhibit mirror symmetry about a plane that is angled at or about 45 degrees with respect to at least one side of the first camera unit.

In various embodiments, the first VCM actuator of the first camera unit may include at least one autofocus coil for actuation along the first optical axis. For instance, the autofocus coil may be configured to radially surround the first optical package of the first camera unit. In some embodiments, the autofocus coil may be octagonal in plan. Some or all of the magnets of the first VCM actuator may be individually disposed proximate a respective side of the octagonal autofocus coil. In other embodiments, the autofocus coil may otherwise be polygonal, or circular, in plan.

In some embodiments, the second VCM actuator of the second camera unit may include one or more magnets and/or one or more coils for actuation along the second optical axis and/or along the second plane that is orthogonal to the second optical axis. For instance, at least one of the coils may be configured to receive a current that causes the coil to produce a magnetic field that interacts with at least one magnetic field of the one or more magnets.

In some embodiments, the second VCM actuator of the second camera unit may include an asymmetric magnet arrangement. For example, the second camera unit may be rectangular in plan, and the asymmetric magnet arrangement may include a first magnet (e.g., an actuator lateral magnet)

disposed proximate a first side of the second camera unit, a second magnet (e.g., an actuator transverse magnet) disposed proximate a second side of the second camera unit, and a third magnet (e.g., an actuator transverse magnet) disposed proximate a third side of the second camera unit. The third side of the second camera unit may be opposite the second side of the second camera unit. In some embodiments, no magnets are disposed proximate a fourth side of the second camera unit. The fourth side of the second camera unit may be opposite the first side of the second camera unit.

In some examples, the second VCM actuator of the second camera unit may include an asymmetric optical image stabilization coil arrangement for actuation along the second plane that is orthogonal to the second optical axis. For example, the asymmetric optical image stabilization coil arrangement may include a first optical image stabilization coil disposed proximate to the first magnet of the asymmetric magnet arrangement, a second optical image stabilization coil disposed proximate to the second magnet of the asymmetric magnet arrangement, and a third optical image stabilization coil disposed proximate the third magnet of the asymmetric magnet arrangement.

In various embodiments, the second VCM actuator of the second camera unit may include one or more autofocus coils for actuation along the second optical axis. For instance, the autofocus coils of the second VCM actuator may include a first autofocus coil disposed proximate the second magnet of the asymmetric magnet arrangement, and a second autofocus coil disposed proximate the third magnet of the asymmetric magnet arrangement.

In some embodiments, the first camera unit may be disposed adjacent to the second camera unit. For example, the first camera unit and the second camera unit may each be rectangular in plan, and the first camera unit may be disposed adjacent to the second camera unit along a first axis that intersects a second axis. For instance, the second axis may extend through the first optical package of the first camera unit and the second optical package of the second camera unit. The asymmetric magnet arrangement of the second VCM actuator may include a first magnet disposed proximate a first side of the second camera unit that is distal to the first axis. Furthermore, the first magnet may have a longitudinal axis that is parallel to the first axis. In some embodiments, no magnets are disposed proximate a second side of the second camera unit that is opposite the first side of the second camera unit. The second side of the second camera unit may extend in a direction that is parallel to the first axis. In some examples, a dummy mass may be disposed proximate the second side of the second camera unit that is opposite the first side of the second camera unit. The dummy mass may be configured to act as a counterbalance to the first magnet disposed proximate the first side of the second camera unit. In some embodiments, the asymmetric magnet arrangement of the second VCM actuator may further include a second magnet disposed proximate a third side of the second camera unit, and a third magnet disposed proximate a fourth side of the second camera unit that is opposite the third side of the second camera unit.

In some embodiments, the first camera unit may be configured to capture a first image of a first visual field. The second camera unit may be configured to capture a second image of a second visual field. In some examples, the first camera unit and the second camera unit may be configured to simultaneously capture the first image of the first visual field and the second image of the second visual field, respectively. The second visual field may be a subset of the first visual field. Furthermore, in some embodiments, the first optical package of the first camera unit may be configured for a first focal length, and the second optical package of the second camera unit may be configured for a second focal length. The second focal length may be a different length than the first focal length.

In some embodiments, a method for capturing images with multiple cameras (e.g., multiple cameras of a multifunction device) may include capturing a first image of a first visual field and capturing a second image of a second visual field. The second visual field may be a subset of the first visual field. According to various examples, capturing the second image may occur simultaneously with capturing the first image. In some examples, the first image of the first visual field may be captured via a first camera unit. The first camera unit may include a first VCM actuator and a first optical package with a first focal length. The second image of the second visual field may be captured via a second camera unit. The second camera unit may include a second VCM actuator and a second optical package with a second focal length. The second focal length of the second optical package may be a different length than the first focal length of the first optical package.

In some embodiments, the method may include actuating movement of the first camera unit to provide optical image stabilization and/or focus (e.g., autofocus) to the first camera unit. For instance, movement of the first camera unit may be actuated via the first VCM actuator of the first camera unit. The first VCM actuator may include a symmetric magnet arrangement. Furthermore, the first VCM actuator may include multiple coils, and actuating movement of the first camera unit may include providing a current through one or more of the coils such that the current-receiving coil(s) interact with one or more magnets of the symmetric magnet arrangement. The coils may include at least one autofocus coil and a symmetric optical image stabilization coil arrangement. The autofocus coil may be configured to radially surround the first optical package and to provide focus to the first camera unit. The symmetric optical image stabilization coil arrangement may be configured to provide optical image stabilization to the first camera unit.

In some embodiments, the method may include actuating movement of the second camera unit to provide optical image stabilization and/or focus (e.g., autofocus) to the second camera unit. For instance, movement of the second camera unit may be actuated via the second VCM actuator of the second camera unit. The second VCM actuator may include an asymmetric magnet arrangement. Furthermore, the second VCM actuator may include at least one autofocus coil and an asymmetric optical image stabilization coil arrangement.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use one or more common physical user-interface devices, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

FIG. 1A illustrates a view of an example embodiment of camera module components arranged for multiple visual fields usable for a multiple camera system for portable zoom, according to at least some embodiments. A portable multifunction device 1080 includes a first optical sensor/camera unit 1082 with a first focal length 1090 for capturing a first visual field 1086 and a second optical sensor/camera unit 1084 with a first focal length 1092 for capturing a first visual field 1088.

Some embodiments include a first camera unit 1082 (such as one of the cameras described below with respect to FIG. 1B and FIG. 1C) of a multifunction device capturing a first image of a first visual field 1086. A second camera unit 1084 (such as one of the cameras described below with respect to FIG. 1B and FIG. 1C) of the multifunction device 1080 simultaneously captures a second image of a first visual field 1088. In some embodiments, the first camera unit 1082 includes a first optical package with a first focal length 1090. In some embodiments, the second camera unit 1084 includes a second optical package (described below with respect to FIG. 1B, below) with a second focal length 1092. In some embodiments, the first focal length 1090 is different from the second focal length 1092, and the first visual field 1086 is a subset of the first visual field 1088. In some embodiments, the first image and the second image are preserved to a storage medium as separate data structures.

In some embodiments, a camera system of a multifunction device 1080, includes a first camera unit 1082 of the multifunction device for capturing a first image of a first visual field 1086. In some embodiments, the first camera unit 1082 includes a first optical image stabilization actuator for moving a first optical package configured for a first focal length 1090. The camera system further includes second camera 1084 unit of the multifunction device 1080 for simultaneously capturing a second image of a first visual field 1088. In some embodiments, the second camera unit 1084 includes a second optical image stabilization actuator for moving a second optical package configured for a second focal length 1092. In some embodiments, the first focal length 1090 is different from the second focal length 1092. In some embodiments, the first focal length being different from the second focal length includes both the first focal length and the second focal length being adjustable ranges, which may or may not overlap.

Some embodiments assign metadata to the first image of the first visual field 1086 and the second image of the first visual field 1088 a time indexing feature for establishing that the first image of the first visual field 1086 and the second image of the first visual field 1088 correspond as having been simultaneously captured. Some embodiments display the first image of the first visual field 1086 in a screen interface with a control for switching to display of the second image of the first visual field 1088, and, responsive to an actuation of the control, display the second image of the first visual field 1088 in place of the first image. Some embodiments generate a synthetic intermediate image at least in part from data of the first image of the first visual field 1086 and data of the second image of the first visual field 1088. In some embodiments, the synthetic intermediate image has a third focal length different from each of the first focal length 1090 and the second focal length 1092, and the synthetic intermediate image has a third visual field different from each of the first visual field 1086 and the first visual field 1088. Some embodiments preserve storage of the first image of the first visual field 1086 and data of the second image of the first visual field 1088 after creation of the synthetic intermediate image.

Some embodiments generate a synthetic result image at least in part from data of the first image of the first visual field 1086 and data of the second image of the first visual field 1088. In some embodiments, the synthetic intermediate image has is generated by enhancing the first image of the first visual field 1086 using data from the second image of the first visual field 1088. Some embodiments display the first image of the first visual field 1086 and the second image of the first visual field 1088 in a shared screen interface.

Some embodiments include a camera system of a multi-function device. In some embodiments, the camera system includes a first camera unit 1082 of a multifunction device 1080 for capturing a first image of a first visual field 1086 and a second camera unit of the multifunction device for simultaneously capturing a second image of a first visual field 1088. In some embodiments, the first camera unit 1082 includes a first optical package configured for a first focal length 1090. In some embodiments, the second camera unit 1084 includes a second optical package configured for a second focal length 1092. In some embodiments, the first focal length 1090 is different from the second focal length 1092.

In some embodiments, the camera system includes a processing unit configured to assign to the first image of a first visual field 1086 and the second image a time indexing feature for establishing that the first image and the second image of a first visual field 1088 were simultaneously captured. In some embodiments, the first camera unit 1082 includes a lens having a folded lens configuration (not shown) with a longer focal length 1090 than a focal length 1092 of a lens of the second camera unit 1084, and the first visual field 1088 is centered on a second visual axis aligned with a first visual axis on which the first visual field 1086 is centered. In some embodiments, the first camera unit 1082 includes a first movable lens (shown below with respect to FIG. 1C) and a first image sensor attached a chassis of the camera unit, the second camera unit includes a lens and a second image sensor movably attached a chassis of the second camera unit 1084.

In some embodiments, the first camera unit 1082 includes a first movable lens and a first image sensor attached a chassis of the first 1082 camera unit, and the second camera unit 1084 includes a lens (shown below with respect to FIG. 1C) and a second image sensor movably attached a chassis of the second camera unit. In some embodiments, the first camera unit 1082 and the second camera unit 1084 include a first image processing pipeline and a second image processing pipeline, respectively.

In some embodiments, the first image and second image are of different media types. For example, in some embodiments, the first image is a moving image data structure captured at a first frame rate. In some embodiments, the second image is a moving image data structure captured at a second frame rate. In some embodiments, the second frame rate is faster than the first frame rate. In some embodiments, the first image is a still image taken at time t(0), and the second image is a moving image data structure captured over a time interval including t(0).

In some embodiments, the first image has a first resolution and the second image has a second resolution. An example of the use of a first image that is a moving image data structure at a first frame rate and a second image that is a moving image data structure at a second frame rate arises in that some embodiments include second camera module 1084 recording 720p (also known as 720 pixels of vertical resolution progressive scan) slow motion video at 240 frames per second while first camera module 1082 is capturing 4K (horizontal resolution on the order of 4,000 pixels) video at 30 frames per second. In some embodiments, the analog-to-digital converter bandwidth required for each separate module to achieve the recording is 220-270 Mpixels/s. Achieving the same functionality with conventional single camera module technology requires up to 32 times higher analog-to-digital converter bandwidth for a single camera module if it is compared to embodiments in which there is a 2× difference in focal length from wide to tele module, providing benefits in terms of power, thermal dissipation, storage bandwidth, storage capacity, and actual achievable frame rates combined with zoom capability.

A use case for some embodiments is well-illustrated with respect to sports photography. In one example use case, it is possible to imagine a user of portable multifunction device 1080 filming a batter in a baseball game. Recording video of the game with portable multifunction device 1080 from bleachers, not shown, a user may decide to zoom in to capture a batter swinging and hitting the ball in slow motion using second camera module 1084 recording 720p slow motion video at 240 frames per second, but may subsequently want to switch to the simultaneously captured 4K video from first camera module 1082 at 30 frames per second of resulting home run in high quality video of the full baseball field, to capture the moments where the opposing team scrambles to catch the ball and the batter is running from base to base. Some embodiments enable this mixed-video capture by simultaneously recording using second camera module 1084 as a telephoto camera module in a 240 frames per second slow motion mode while at the same time using first camera module 1082 as a wide camera module in a 4K at 30 frames per second. After capturing a data structure including both video streams the awesome moment, some embodiments provide for a mixed-video data structure and an interface for the video streams from the two separate camera modules to be manually or automatically edited and combined to create a more engaging media which may contain normal 1080p video, 4K high resolution video, 720p motion video, and still images. In the example described above, this mixed-video media both captures the close up expressions of players, the peak action in slow motion, and frames it all in the context of a great play in a baseball game.

Another example of a use case for some embodiments arises in the context of capturing a child extinguishing candles on a birthday cake. In such an example, one can imagine a child about to blow out the candles on the birthday cake while all her friends are singing a birthday song. In some embodiments, second camera module 1084 can be used as a telephoto camera module to zoom in on the face of the child as she is about to blow out the candles and first camera module 1082 can capture a burst of high resolution still images of her smiling face. In some embodiments, first camera module 1082 is simultaneously capturing standard 1080p 30 frames per second video of the entire group of kids gathered and singing around the cake. Some embodiments provide an editing interface for combining the video stream from the wide camera module, either manually or automatically, with the close up portraits to create a much more engaging media experience which can be shared. As the two camera modules are synchronized in time, the still images can easily be automatically inserted at the right time in a final video stream.

Figure 1B:
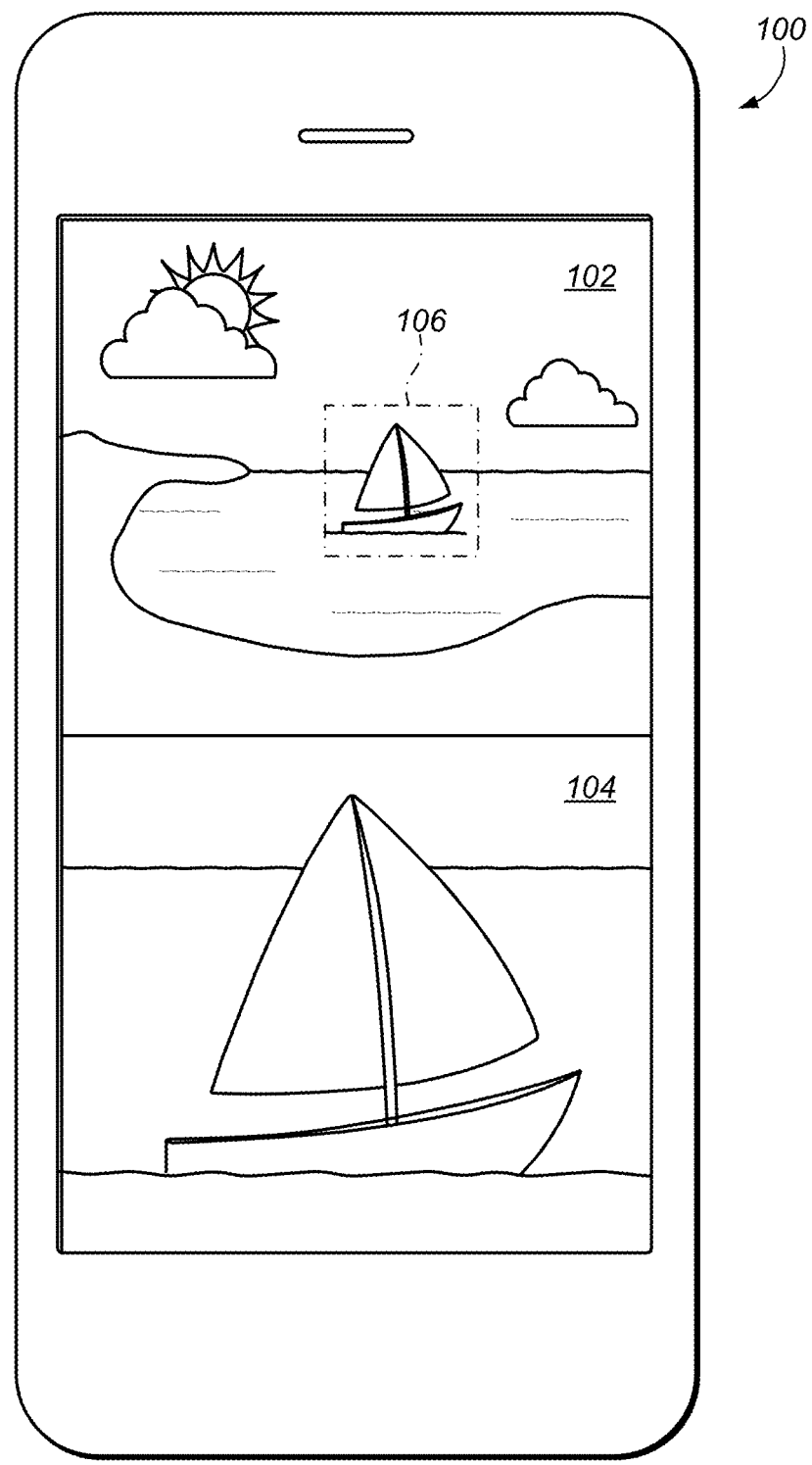
FIG. 1B illustrates a user interface for a multiple camera system for portable zoom, according to at least some embodiments.

FIG. 1B illustrates a user interface for a multiple camera system for portable zoom, according to at least some embodiments. A portable multifunction device 100 displays a first image of a first visual field 104 captured by a first camera unit and a second image of a second visual field 102 simultaneously captured by a second camera unit of the multifunction device 100. A zoom control 106 is displayed within first image of a first visual field 104. In the embodiment shown, zoom control 106 is an area of first image of first visual field 104, that, in response to control actuation through the touch screen of portable multifunction device 100, is used as a control for toggling the display mode for displaying first image of a first visual field 104 captured by a first camera unit and second image of a second visual field 102 simultaneously captured by a second camera unit of the multifunction device 100.

Some embodiments assign metadata to the first image 104 and the second image 102 for a time indexing feature for establishing that the first image 104 and the second image 102 correspond as having been simultaneously captured. Some embodiments display the first image 104 in a screen interface with a control (e.g., similar to control 106) for switching to display of the second image 102, and, responsive to an actuation of the control 106, display the second image 102 in place of the first image 104. Some embodiments generate a synthetic intermediate image at least in part from data of the first image 104 and data of the second image 102.

Figure 1C:
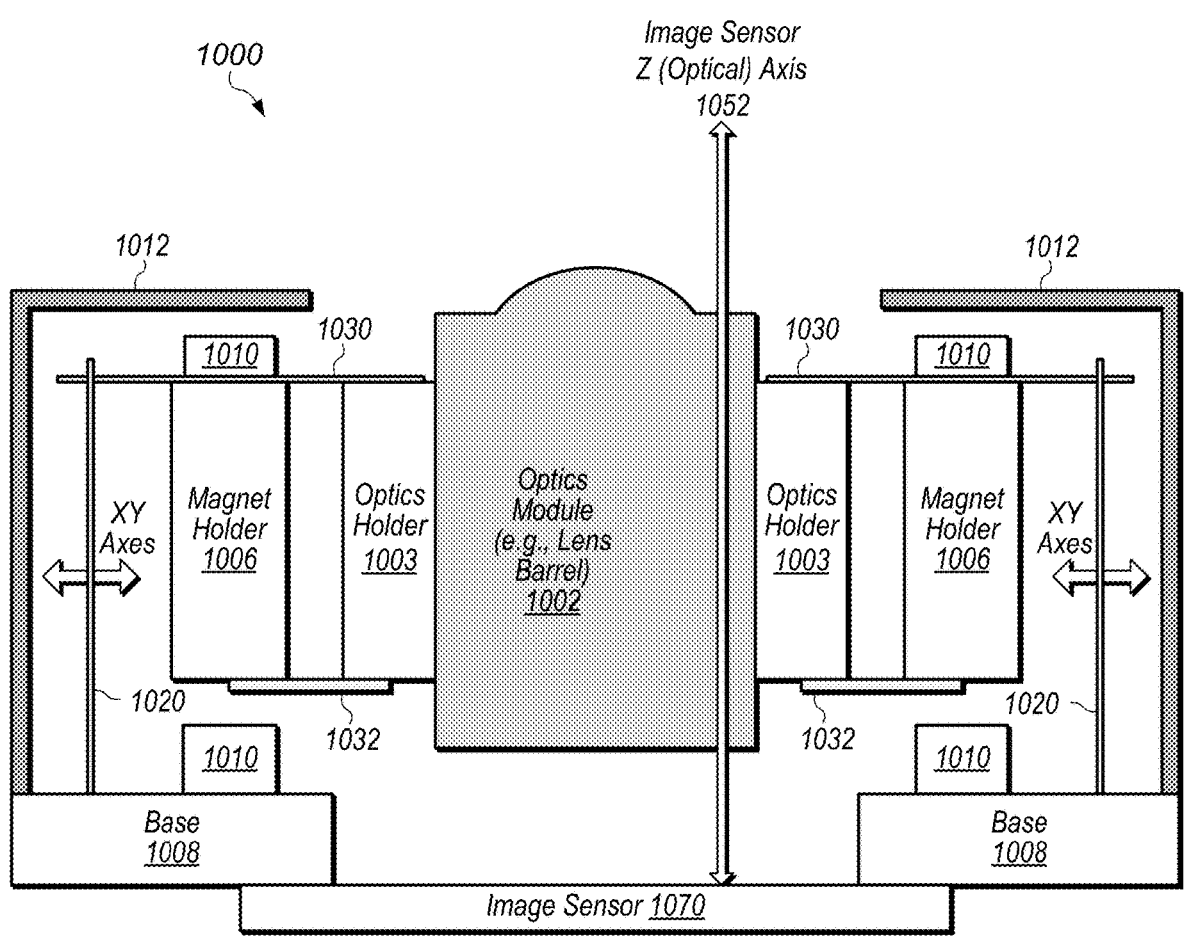
FIG. 1C depicts a side view of an example embodiment of camera module components usable for a multiple camera system for portable zoom with optical image stabilization, according to at least some embodiments.

FIG. 1C depicts a side view of an example embodiment of camera module, according to at least some embodiments. Camera module 1000, which is an embodiment of cameras 1564a-b discussed below, includes camera components such as an optics module (e.g., a lens barrel) 1002 attached to an optics holder 1003 and a magnet holder 1006. An image sensor 1070, which may or may not be mounted on a substrate that is not shown separately in FIG. 1C, is attached to a camera module base 1008. The camera components may further include, in addition to components such as power and remote control connections not shown, a cover 1012 and suspension wires 1020.

Optics module 1002 may be suspended on the base assembly 1008 by suspension of the upper springs 1030 and the suspension wires 1020. Camera components may include one or more of, but are not limited to, optics 1002, optics holder 1003, magnet holder(s) 1006, upper spring(s) 1030, and lower spring(s) 1032. The upper and lower spring(s) may be collectively referred to herein as optics springs. An optics module (e.g., a lens or lens assembly or lens barrel) 1002 may be screwed, mounted or otherwise held in or by an optics holder 1003. In at least some embodiments, the optics 1002/optics holder 1003 assembly may be suspended from or attached to the magnet holder 1006 by upper spring(s) 1030, and lower spring(s) 1032. Note that upper spring(s) 1030 and lower spring(s) 1032 are flexible to allow the optics assembly 1000 a range of motion along the Z (optical) axis for optical focusing, wires 1020 are flexible to allow a range of motion on the XY plane orthogonal to the optical axis for optical image stabilization.

Note that, in some embodiments, a camera may not include magnets and magnet holder(s) 1006, but may include a yoke or other structure 1006 that may be used to help support the optics assembly on suspension wires 1020 via upper springs 1030. In general, other embodiments of an optics assembly 1000 may include fewer or more components than the example optics assembly 1000 shown in FIG. 1C. Also note that, while embodiments show the optics assembly 1000 suspended on wires 1020, other mechanisms may be used to suspend an optics assembly 1000 in other embodiments.

The autofocus yoke (e.g., magnet holder(s) 1006) acts as the support chassis structure for the autofocus mechanism of actuator 1000. The lens carrier (optics holder 1003) is suspended on the autofocus yoke by an upper autofocus (AF) spring 1030 and a lower optics spring 1032. In this way when an electric current is applied to the autofocus coil, Lorentz forces are developed due to the presence of the four magnets, and a force substantially parallel to the optical axis is generated to move the lens carrier, and hence lens, along the optical axis, relative to the support structure of the autofocus mechanism of the actuator, so as to focus the lens. In addition to suspending the lens carrier and substantially eliminating parasitic motions, the upper spring 1030 and lower spring 1032 also resist the Lorentz forces, and hence convert the forces to a displacement of the lens. This basic architecture shown in FIG. 1C is typical of some embodiments, in which optical image stabilization function includes moving the entire autofocus mechanism of the actuator (supported by the autofocus yoke) in linear directions orthogonal to the optical axis, in response to user handshake, as detected by some means, such a two or three axis gyroscope, which senses angular velocity. The handshake of interest is the changing angular tilt of the camera in 'pitch and yaw directions', which can be compensated by said linear movements of the lens relative to the image sensor.

In at least some embodiments, the suspension of the autofocus mechanism on the actuator 1000 support structure may be achieved by the use of four corner wires 1020, for example wires with a circular cross-section. Each wire 1020 acts as a flexure beams capable of bending with relatively low stiffness, thus allowing motion in both optical image stabilization degrees-of-freedom. However, wire 1020 is in some embodiments relatively stiff in directions parallel to the optical axis, as this would require the wire to stretch or buckle, thus substantially preventing parasitic motions in these directions. In addition, the presence of four such wires, appropriately separated allows them to be stiff in the parasitic tilt directions of pitch and yaw, thus substantially preventing relative dynamic tilt between the lens and image sensor. This may be seen by appreciating that each wire 1020 is stiff in directions that require it to change in length, and hence the fixed points at the ends of each wire (eight points in total) will substantially form the vertices of a parallelepiped for all operational positions of the optical image stabilization mechanism.

FIGS. 2A-D illustrate an example embodiment of camera module components including paired side magnet arrays usable for a multiple camera system for portable zoom, according to at least some embodiments.

Figure 2A:
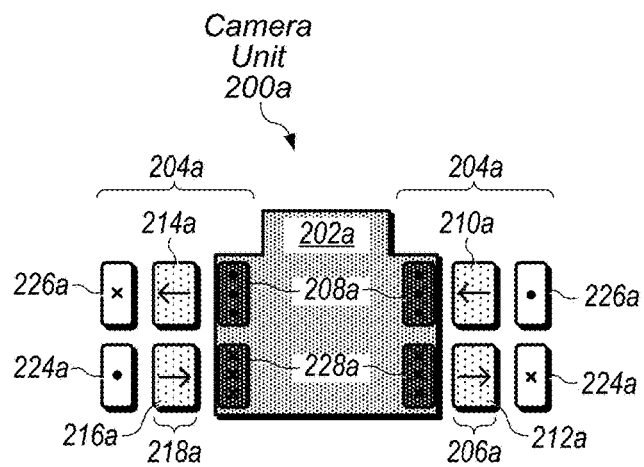
FIGS. 2A-D illustrate an example embodiment of camera module components including paired side magnet arrays usable for a multiple camera system for portable zoom, according to at least some embodiments.
Figure 2C:
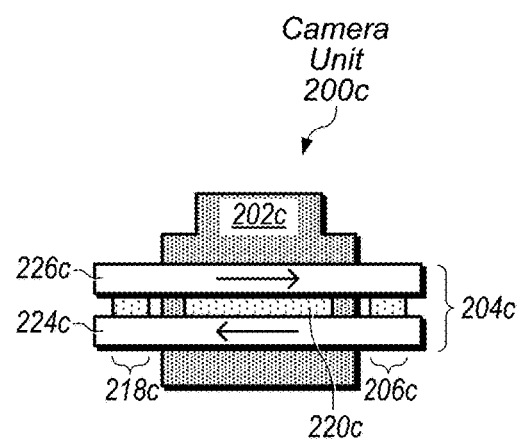
Figure 2B:
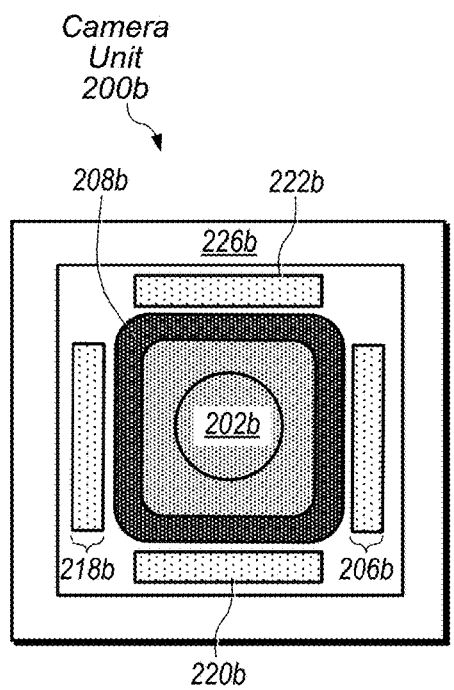
Figure 2D:
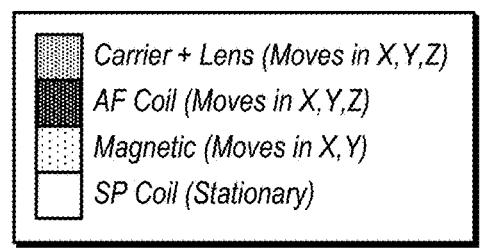

Each of FIGS. 2A-2C includes a different view of a camera unit 200a-c, which is one embodiment of a first camera unit or a second camera unit of a multifunction device for capturing a first image of a first or second visual field. Each of camera units 200a-c includes one of optics packages 202a-c and one of optical image stabilization actuators 204a-c for moving the optical package 202a-c configured for focal length or an adjustable range of focal lengths. FIG. 2D is a legend indicating the motion capability of various components illustrated in each of FIGS. 2A-C.

Optical stabilization actuators 204a-c include magnet arrays 206a-c and 218a-c, which include central magnet arrays 206a-c and distal magnet arrays 218a-c. In some embodiments, central magnet arrays 206a-c and distal magnet arrays 218a-c are arranged in opposing and mutually-canceling pairs of magnets. Additionally, in some embodiments, lower magnet arrays 220b-c and upper magnet array 222b are arranged in analogous opposing and mutually-canceling pairs. In some embodiments, the designation of central magnet arrays 206a-c and distal magnet arrays 218a-c is arbitrary, with the difference between them being the opposite and mutually canceling arrangement of magnets in the respective arrays. In some embodiments, the designation of central magnet arrays 206a-c and distal magnet arrays 218a-c is defined with respect to a center line between a pair of camera units in a camera system, as described elsewhere herein. In some embodiments, an optical package or optics module is a set of components (e.g., a lens barrel) housing one or more lens elements and other components for connecting a lens to an actuator for moving the lens relative to an image sensor.

As portrayed in FIGS. 2A-2D, camera units 200a-c include central magnet arrays 206a-c, which can be situated along the axis between the optics package of a first camera unit and an optics package of a second camera unit. Central magnet array 206a includes a central upper magnet 210a having a first polarity and a central lower magnet 212a having a polarity antiparallel to the first polarity. Camera units 200a-c also include distal magnet arrays 218a-c situated opposite the central magnet arrays 206a-c with respect to the optics packages 202a-c of the camera units 200a-c. Distal magnet array 218a includes a distal lower magnet 216a having the first polarity and a distal upper magnet 214a having the polarity antiparallel to the first polarity.

In some embodiments, camera units 200a-c include distal magnet arrays 218a-c that are situated opposite the central magnet arrays 206a-c with respect to the optics packages 202a-c of the camera units 200a-c and the distal magnet arrays 218a-c include a distal lower magnet 216a having the first polarity and a distal upper magnet 214a having the polarity antiparallel to the first polarity.

In some embodiments, camera units 200a-c include upper autofocus coils 208a-b and lower autofocus coils 228a attached to optics packages 202a-c for moving optics packages 202a-c in any of an X, Y, or Z axis, where, in some embodiments, the Z axis is the optical axis of optics packages 202a-c (thus, with at three degrees of freedom). In some embodiments, central magnet arrays 206a-c and distal magnet arrays 218a-c interact with upper latitudinal SP coils 226a-c and lower SP latitudinal coils 224a and 224c.

Figure 2E:
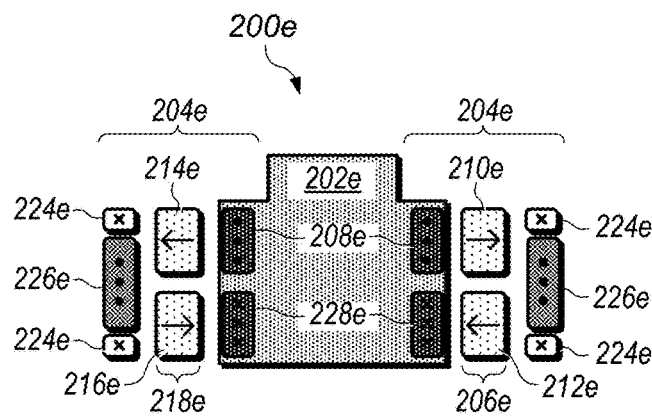
FIGS. 2E-H depict an example embodiment of camera module components including paired side magnet arrays usable for a multiple camera system for portable zoom, according to at least some embodiments.
Figure 2G:
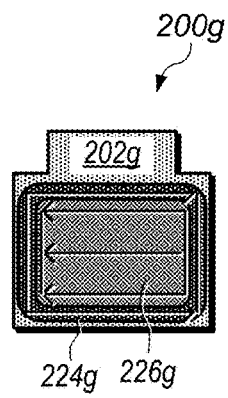
Figure 2F:
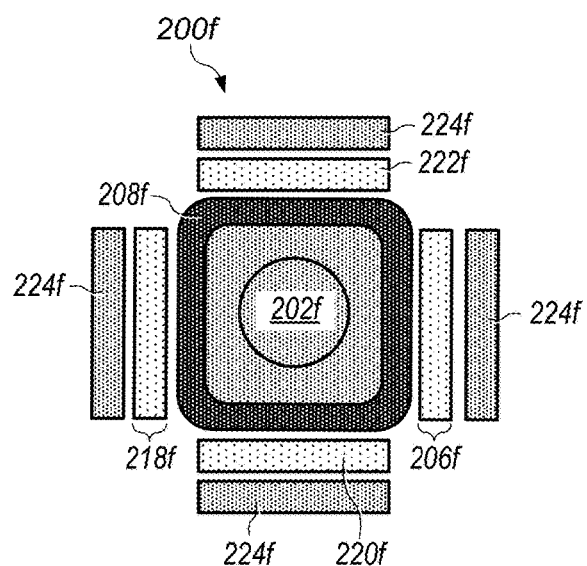
Figure 2H:
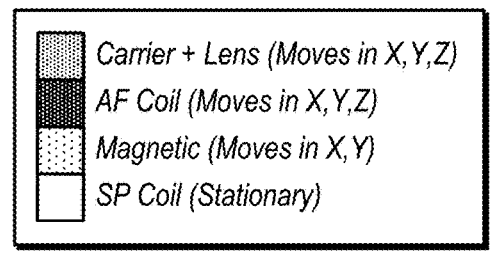

FIGS. 2E-G depict an example embodiment of camera module components including paired side magnet arrays usable for a multiple camera system for portable zoom, according to at least some embodiments. Each of FIGS. 2E-2G includes a different view of a camera unit 200e-g, which is one embodiment of a first camera unit or a second camera unit of a multifunction device for capturing a first image of a first or second visual field. Each of camera units 200e-g includes one of optics packages 202e-g and one of optical image stabilization actuators 204e (not labeled in FIG. 2F or shown in FIG. 2G) for moving the optical package 202e-g configured for focal length or an adjustable range of focal lengths. FIG. 2H is a legend indicating the motion capability of various components illustrated in each of FIGS. 2E-G. As one of skill in the art will readily comprehend in light of having viewed the present disclosure, while particular orientations of magnets and directions of current are shown for the embodiments depicted herein, other embodiments exist, in which the direction of current and orientations of magnetic poles are reversed, and such embodiments are within the scope and intent of the present disclosure.

Optical stabilization actuator 204e includes magnet arrays 206e-f and 218e-f, which include central magnet arrays 206e-f and distal magnet arrays 218e-f. In some embodiments, central magnet arrays 206e-f and distal magnet arrays 218e-f are arranged in opposing and mutually-canceling pairs of magnets. Additionally, in some embodiments, lower magnet arrays 220f and upper magnet array 222f are arranged in analogous opposing and mutually-canceling pairs. In some embodiments, the designation of central magnet arrays 206e-f and distal magnet arrays 218e-f is arbitrary, with the difference between them being the opposite and mutually canceling arrangement of magnets in the respective arrays. In some embodiments, the designation of central magnet arrays 206e-f and distal magnet arrays 218e-f is defined with respect to a center line between a pair of camera units in a camera system, as described elsewhere herein.

As portrayed in FIGS. 2E-2G, camera units 200e-g include central magnet arrays 206e-f, which can be situated along the axis between the optics package of a first camera unit and an optics package of a second camera unit. Central magnet array 206e includes a central upper magnet 210e having a first polarity and a central lower magnet 212e having a polarity antiparallel to the first polarity. Camera units 200e-f also include distal magnet arrays 218e-f situated opposite the central magnet arrays 206e-f with respect to the optics packages 202e-g of the camera units 200e-g. Distal magnet array 218e includes a distal lower magnet 216e having the first polarity and a distal upper magnet 214e having the polarity antiparallel to the first polarity.

In some embodiments, camera units 200e-g include distal magnet arrays 218a-c that are situated opposite the central magnet arrays 206a-c with respect to the optics packages 202a-c of the camera units 200e-f and the distal magnet arrays 218e-f include a distal lower magnet 216e having the first polarity and a distal upper magnet 214e having the polarity antiparallel to the first polarity.

In some embodiments, camera units 200e-g include upper autofocus coils 208e-f and lower autofocus coils 228e attached to optics packages 202e-f for moving optics packages 202e-f in any of an X, Y, or Z axis, where, in some embodiments, the Z axis is the optical axis of optics packages 202e-f (thus, with at three degrees of freedom). In some embodiments, central magnet arrays 206e-f and distal magnet arrays 218e-f interact with central coils 226e and 226g and radial SP coils 224e-g.

Figure 2I:
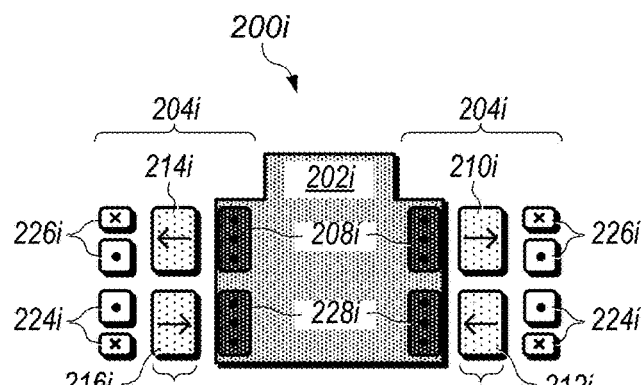
FIGS. 2I-L illustrate an example embodiment of camera module components including paired side magnet arrays usable for a multiple camera system for portable zoom, according to at least some embodiments.
Figure 2K:
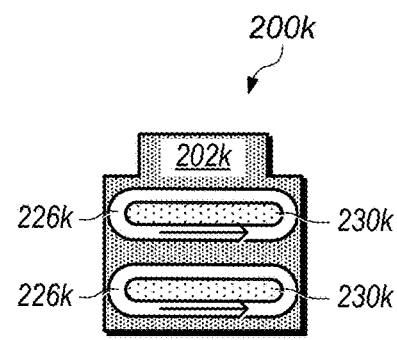
Figure 2J:
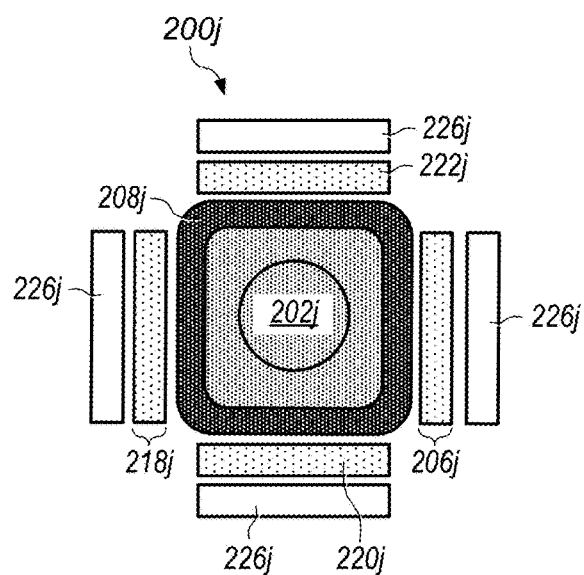
Figure 2L:
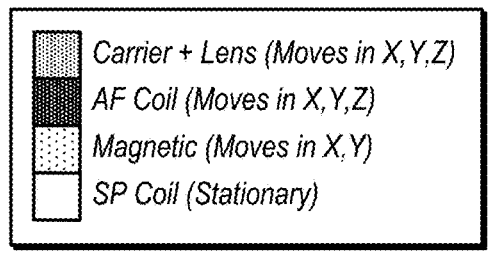

FIGS. 2I-L illustrate an example embodiment of camera module components including paired side magnet arrays usable for a multiple camera system for portable zoom, according to at least some embodiments. Each of FIGS. 2I-2K includes a different view of a camera unit 200i-k, which is one embodiment of a first camera unit or a second camera unit of a multifunction device for capturing a first image of a first or second visual field. Each of camera units 200i-k includes one of optics packages 202i-k and one of optical image stabilization actuators 204i (not labeled in FIG. 2J or shown in FIG. 2K) for moving the optical package 202i-k configured for focal length or an adjustable range of focal lengths. FIG. 2L is a legend indicating the motion capability of various components illustrated in each of FIGS. 2I-K.

Optical stabilization actuator 204i includes magnet arrays 206i-j and 218i-j, which include central magnet arrays 206i-j and distal magnet arrays 218i-j. In some embodiments, central magnet arrays 206i-j and distal magnet arrays 218i-j are arranged in opposing and mutually-canceling pairs of magnets. Additionally, in some embodiments, lower magnet array 220*j* and upper magnet array 222*j* are arranged in analogous opposing and mutually-canceling pairs. In some embodiments, the designation of central magnet arrays 206*i-j* and distal magnet arrays 218*i-j* is arbitrary, with the difference between them being the opposite and mutually canceling arrangement of magnets in the respective arrays. In some embodiments, the designation of central magnet arrays 206*i-j* and distal magnet arrays 218*i-j* is defined with respect to a center line between a pair of camera units in a camera system, as described elsewhere herein.

As portrayed in FIGS. 2I-2K, camera units 200*i-k* include central magnet arrays 206*i-j*, which can be situated along the axis between the optics package of a first camera unit and an optics package of a second camera unit. Central magnet array 206*i* includes a central upper magnet 210*i* having a first polarity and a central lower magnet 212*i* having a polarity antiparallel to the first polarity. Camera units 200*i-j* also include distal magnet arrays 218*i-j* situated opposite the central magnet arrays 206*i-j* with respect to the optics packages 202*i-j* of the camera units 200*i-j*. Distal magnet array 218*i* includes a distal lower magnet 216*i* having the first polarity and a distal upper magnet 214*i* having the polarity antiparallel to the first polarity.

In some embodiments, camera units 200*i-j* include distal magnet arrays 218*i-j* that are situated opposite the central magnet arrays 206*i-j* with respect to the optics packages 202*i-j* of the camera units 200*i-j* and the distal magnet arrays 218*i-j* include a distal lower magnet 216*i* having the first polarity and a distal upper magnet 214*i* having the polarity antiparallel to the first polarity.

In some embodiments, camera units 200*i-j* include upper autofocus coils 208*i-j* and lower autofocus coils 228*j* attached to optics packages 202*i-j* for moving optics packages 202*i-j* in any of an X, Y, or Z axis, where, in some embodiments, the Z axis is the optical axis of optics packages 202*e-f* (thus, with at three degrees of freedom). In some embodiments, central magnet arrays 206*i-j* and distal magnet arrays 218*i-j* interact with top SP coils 226*i-j* and lower SP coils 224*i* and 224*k*.

Figure 3:
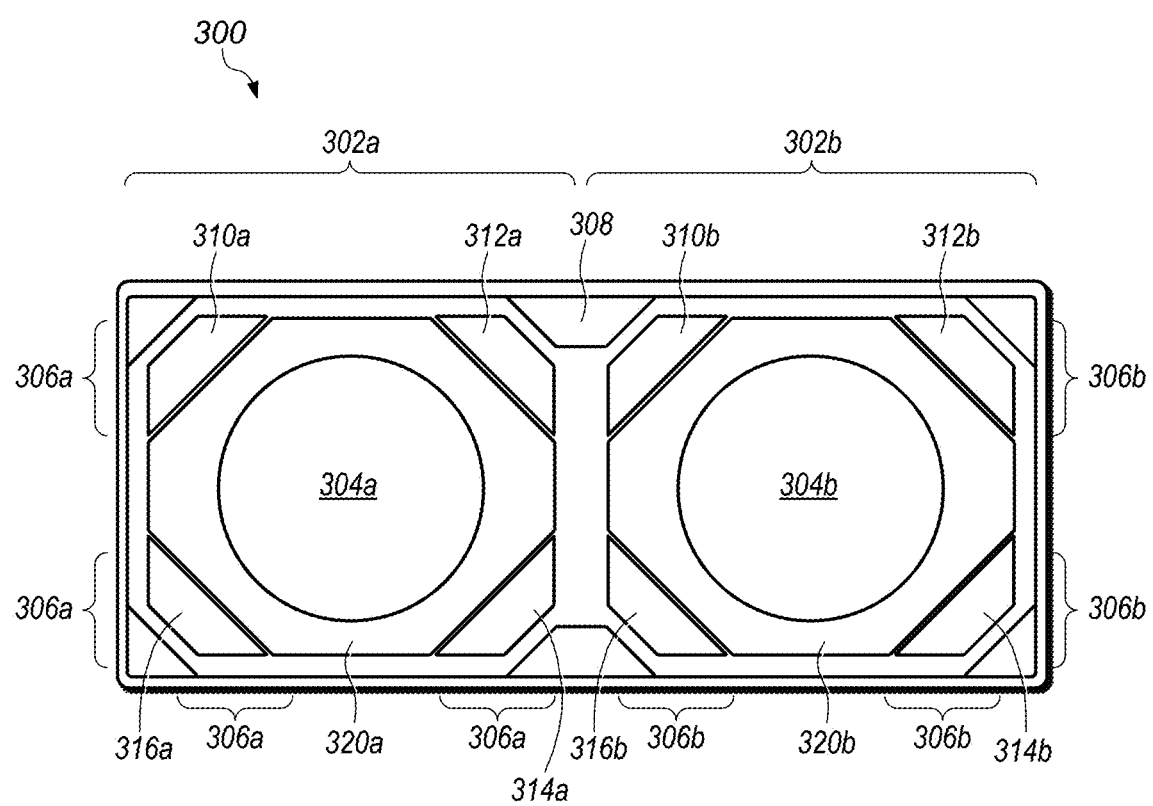
FIG. 3 depicts an example embodiment of camera modules including corner magnets in a shared magnet holder usable for a multiple camera system for portable zoom, according to at least some embodiments.
Figure 4A:
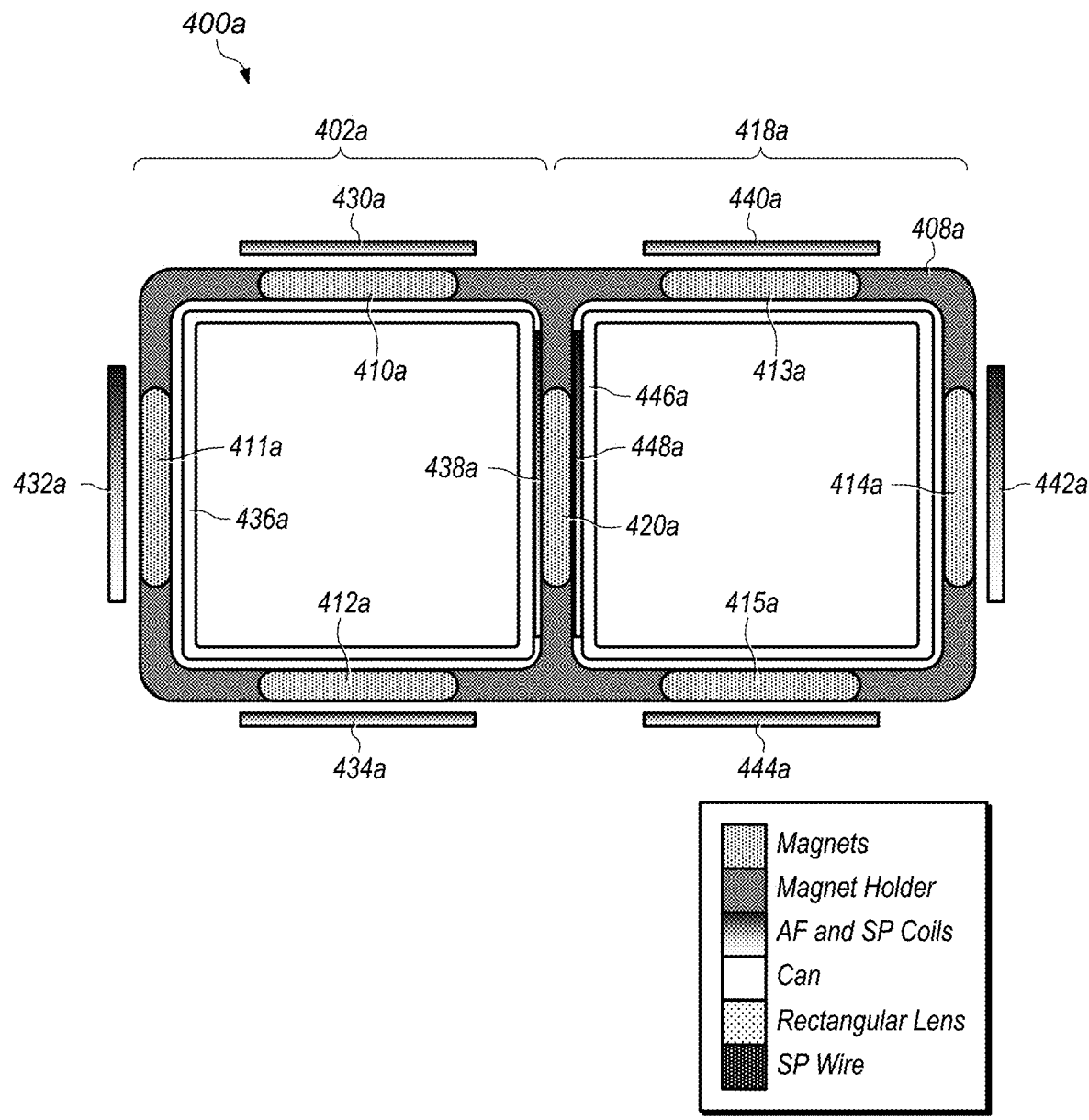
FIGS. 4A-E illustrate an example embodiment of camera module components including shared magnets usable for a multiple camera system for portable zoom, according to at least some embodiments.
Figure 4B:
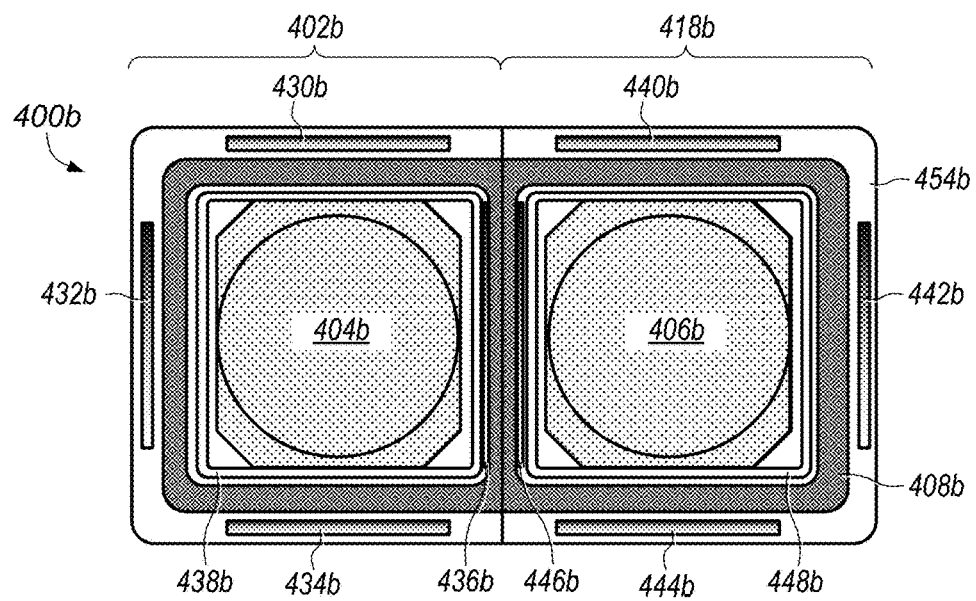
Figure 4C:
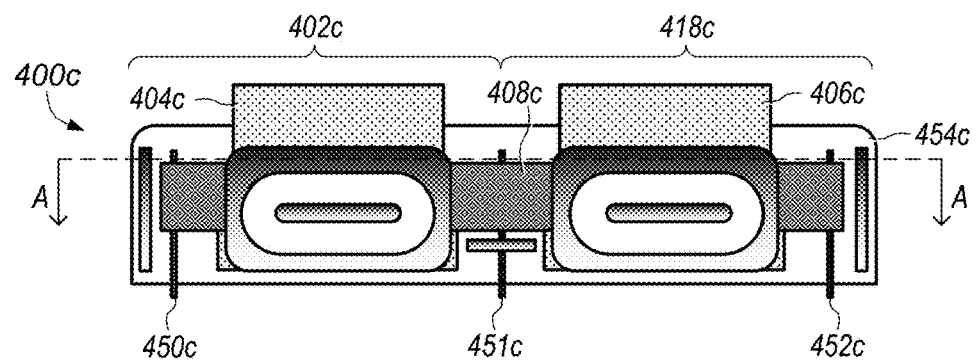
Figure 4D:
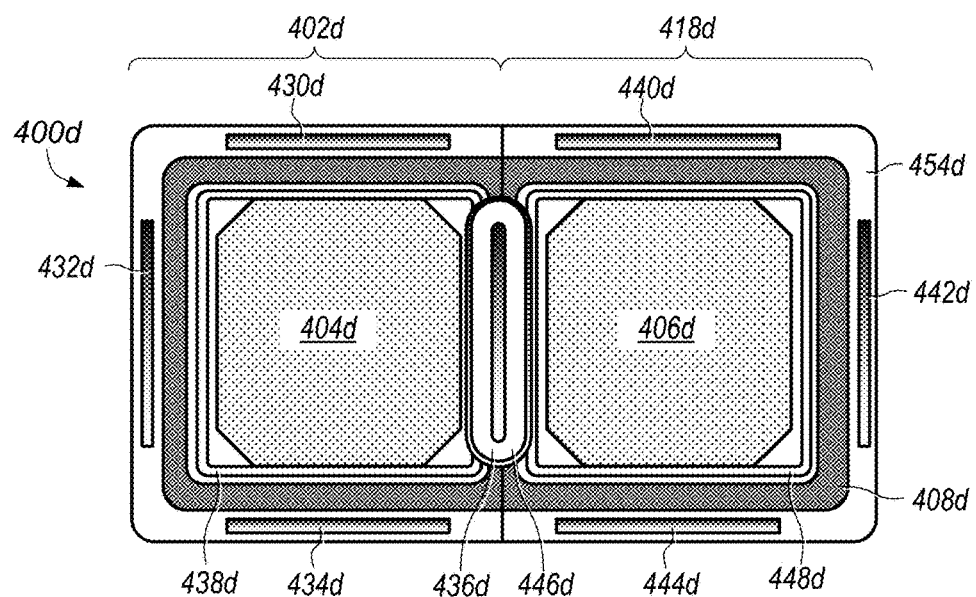
Figure 4E:
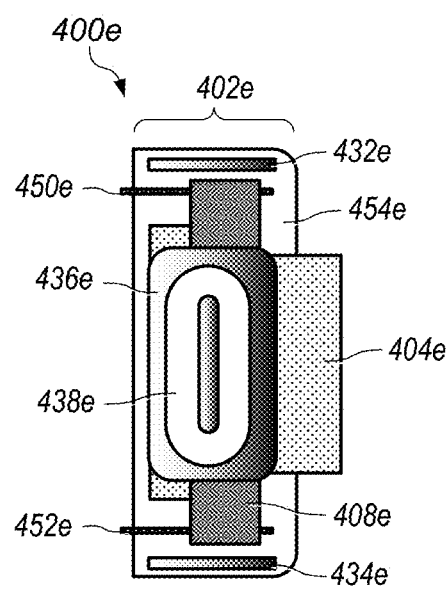

FIG. 3 depicts an example embodiment of camera modules including corner magnets in a shared magnet holder usable for a multiple camera system for portable zoom, according to at least some embodiments.

In some embodiments, the VCM applies the same OIS correction to both modules together at any given time. In some embodiments, OIS correction is a function of focal length and is different for the two modules. Thus, at any given moment the VCM can stabilize only one module.

In some embodiments, video capture involves shooting with only one lens at a time and the VCM can successfully command OIS correction as user switches between the 1× and 4× lenses.

In some embodiments, image fusion combines the wide field of view from a 1× lens and the narrow focus from a 4× lens to produce a wide angle image with extra detail and sharpness around the subject (image center). It can also be used to generate depth data (stereo vision). In some embodiments, dual OIS solution allows commanding different corrections on the two OIS modules simultaneously. In some embodiments, in fast exposure and shots with low subject motion, the two OIS corrections can be applied in succession producing the same effect.

A dual camera unit 300 includes one embodiment of a first camera unit 302*a* and a second camera unit 302*b* of a multifunction device for capturing a first image of a first or second visual field. Each of camera units 300*a-b* includes one of optics packages (circular feature) 304*a-b* and one of optical image stabilization actuators 306*a-b* using autofocus coils 320*a-b* for moving the optical package 304*a-b* configured for focal length or an adjustable range of focal lengths.

In some embodiments, the camera system of dual camera unit 300 includes a shared magnet holder 308 to which are attached one or more magnets 310*a*-316*a* of the first camera unit and one or more magnets 310*b*-316*b* of the second camera unit used to generate magnetic fields usable in creating motion in one or more of the first camera actuator 306*a* and the second camera actuator 306*b*. In some embodiments, the camera system of dual camera unit 300 includes a shared magnet holder 308 to which are attached one or more diagonal-angled corner magnets 310*a*-316*a* of the first camera unit and one or more diagonal-angled corner magnets 310*b*-316*b* of the second camera unit used to generate magnetic fields usable in creating motion in one or more of the first camera actuator 306*a* and the second camera actuator 306*b*, though other embodiments may employ shared magnet holder 308 with linear magnet pairs or linear magnets as described elsewhere herein.

FIGS. 4A-E illustrate an example embodiment of camera module components including shared magnets usable for a multiple camera system for portable zoom, according to at least some embodiments. In some embodiments, by using side magnets the VCMs can share one magnet between the two modules. In some embodiments, a shared magnet helps reduce the lens center to center distance i.e. parallax reduction (as well as overall size. A square design also permits symmetric dynamics. In some embodiments, the VCM applies the same OIS correction to both modules together at any given time. In some embodiments, OIS correction is a function of focal length and is different for the two modules. Thus, at any given moment the VCM in some embodiments stabilizes only one module.

In some embodiments, capture involves shooting with only one lens at a time and the VCM can successfully command OIS correction as user switches between the 1× and 4× lenses. In some embodiments, image fusion combines the wide field of view from the 1× lens and the narrow focus from the 4× lens to produce a wide angle image with extra detail and sharpness around the subject (image center). In some embodiments, it can also be used to generate depth data (stereo vision).

A dual camera unit 400*a-e* includes one embodiment of a first camera unit 402*a-e* and a second camera unit 418*a-d* of a multifunction device for capturing a first image of a first or second visual field. Each of camera units 402*a-e* and 418*a-d* includes one of optics packages 404*b-e* and 406*b-d* and actuator components for moving the optical packages 404*b-e* and 406*b-d* configured for focal length or an adjustable range of focal lengths. In some embodiments, the camera system of dual camera unit 400*a-e* includes a shared magnet holder 408*a-e* to which are attached one or more shared magnets 420*a* and one or more unshared magnets 410*a*-412*a* of the first camera unit 402*a-e* and one or more magnets 413*a*-415*a* of the second camera unit 418*a-d* used to generate magnetic fields usable in creating motion in one or more of the first camera unit 402*a-e* and the second camera unit 418*a-d*. In some embodiments, the camera system of dual camera unit 400*a-e* includes coils 430*a*-438*e* of the first camera unit 402*a-e* and one or more coils 440*a*-448*e* of the second camera unit used to generate force usable in creating motion in one or more of the first camera unit 402*a-e* and the second camera unit 418*a-d*. Suspension wires 450*c*-452*e* and a covering can 454*b-e* are also shown.

In some embodiments, coil 436*b-d* and coil 446*b-d* are a single shared coil. In some embodiments, shared magnet holder 408a-e is a pair of separate units articulated together.

Figure 5A:
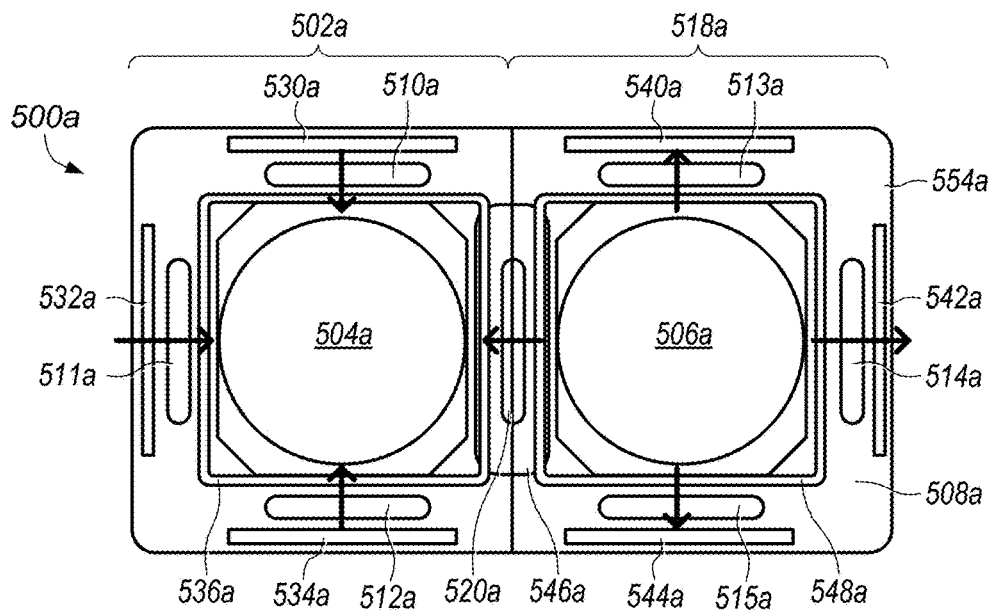
FIGS. 5A-C illustrate an example embodiment of camera module components including shared magnets usable for a multiple camera system for portable zoom, according to at least some embodiments.
Figure 5B:
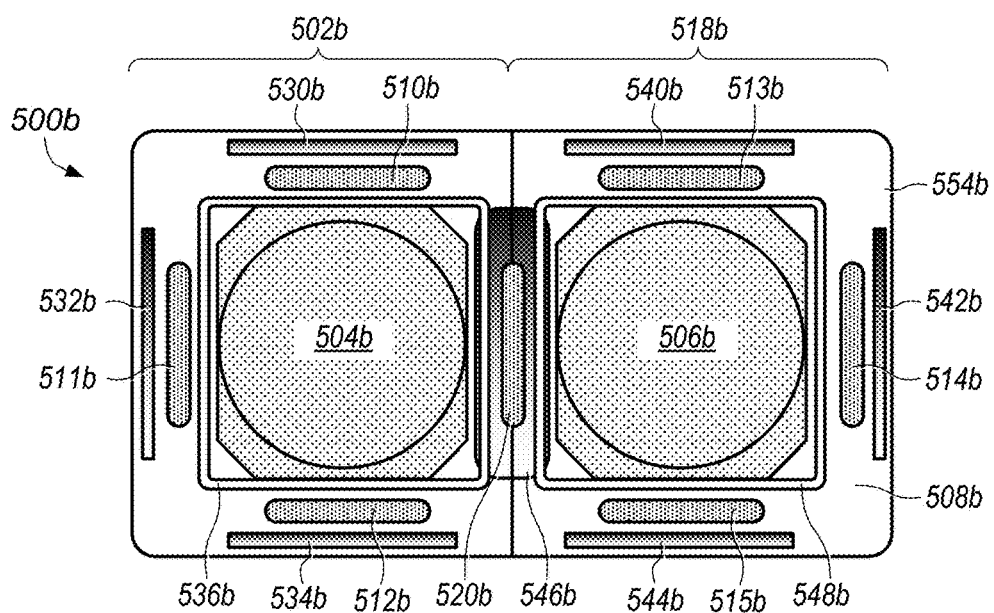
Figure 5B:
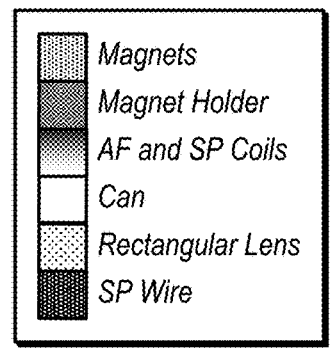
Figure 5C:
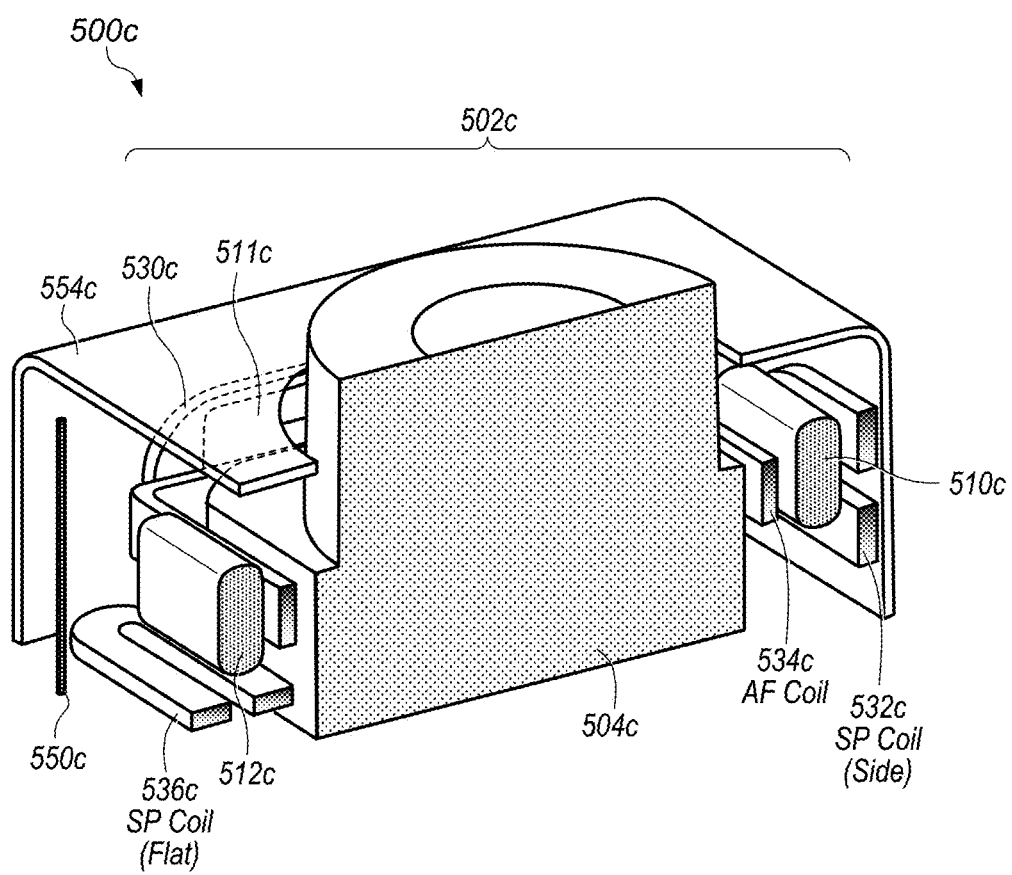

FIGS. 5A-C illustrate an example embodiment of camera module components including shared magnets usable for a multiple camera system for portable zoom, according to at least some embodiments. A dual camera unit 500a-c includes one embodiment of a first camera unit 502a-c and a second camera unit 518a-b of a multifunction device for capturing a first image of a first or second visual field. Each of camera units 502a-c and 518a-b includes one of optics packages 504a-c and 506a-b and actuator components for moving the optical packages 504a-c and 506a-b configured for focal length or an adjustable range of focal lengths. In some embodiments, the camera system of dual camera unit 500a-c includes a shared magnet holder 508a-b to which are attached one or more shared magnets 520a and one or more unshared magnets 510a-512a of the first camera unit 502a-c and one or more magnets 513a-515a of the second camera unit 518a-b used to generate magnetic fields usable in creating motion in one or more of the first camera unit 502a-c and the second camera unit 518a-d. In some embodiments, the indicated magnetic field directions of all of shared magnet 520a and one or more unshared magnets 510a-512a of the first camera unit 502a-c are oriented inward toward optics packages 504a-c while the indicated magnetic field directions of all of shared magnet 520a and one or more magnets 513a-515a of the second camera unit 518a-b are oriented outward away from optics packages 504a-b.

In some embodiments, the camera system of dual camera unit 500a-e includes coils 530a-536c of the first camera unit 502a-c and one or more coils 540a-544b of the second camera unit used to generate force usable in creating motion in one or more of the first camera unit 502a-c and the second camera unit 518a-b. Suspension wires 550c and a covering can 554a-c are also shown. In some embodiments, coil 546a-b is a single shared coil. In some embodiments, shared magnet holder 508a-b is a pair of separate units articulated together.

FIGS. 6A-E illustrate an example embodiment of camera module components including stationary magnets usable for a multiple camera system for portable zoom, according to at least some embodiments. In some embodiments, the VCM architecture of FIGS. 6A-E is based on a stationary magnet design, allowing for two OIS VCMs to be placed side by side with reduced stroke loss due to magnetic interactions between the two. In some embodiments, the VCMs can be used to independently command the required OIS corrections on the two modules.

In some embodiments, the current design allows for inclusion of 3 different independent drive channels (Drive X, Drive Y, Drive Z) and a 4th Auxiliary channel for Zoom or Electrochromic aperture.

Camera units 602a-c include one embodiment of a first camera unit and/or a second camera unit of a multifunction device for capturing a first image of a first or second visual field. Each of camera units 602a-c includes one of optics carriers 604a-b containing an optics package and actuator components for moving the optical packages in optics carriers 604a-b configured for focal length or an adjustable range of focal lengths.

In some embodiments, the camera systems of camera units 602a-c include one or more stationary magnets 610a-616a of the camera units 602a-c to generate magnetic fields usable in creating motion in one or more of the camera unit 602a-c.

In some embodiments, the camera system of camera units 602a-c includes coils 630b-632b set in a coil base 628a-c and coil holder 626a-b of the camera unit 602a-c used to generate force usable in creating motion in the camera unit 602a-c. Suspension and control wires 658a-672b provide for both suspension and transmission of control and data signals. A coil race track 632b-638c and a base 640b-c are also shown. Wires 670a-672a provide AF (+/−) signals. Wires 658a-660a provide Aux (+/−) signals. Wires 662a-664a provide SP_X (+/−) signals. Wires 666a-668a provide SP_Y (+/−) signals.

Figure 6A:
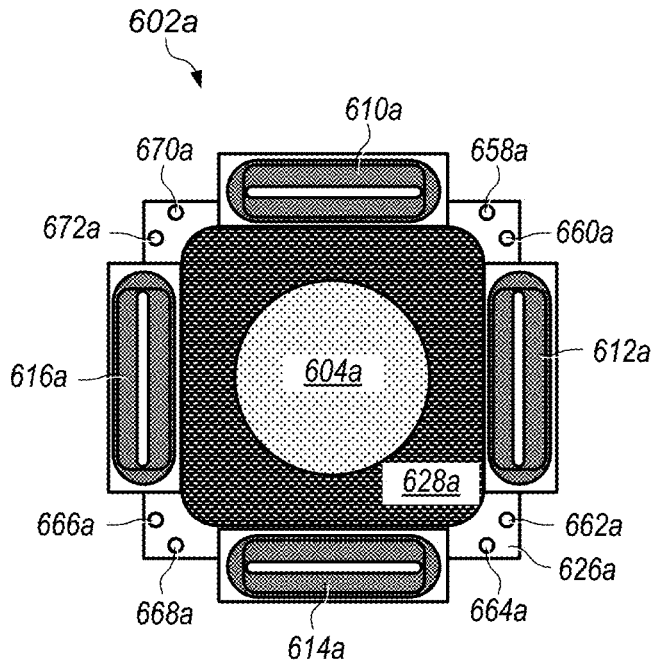
FIGS. 6A-E illustrate an example embodiment of camera module components including stationary magnets usable for a multiple camera system for portable zoom, according to at least some embodiments.
Figure 6E:
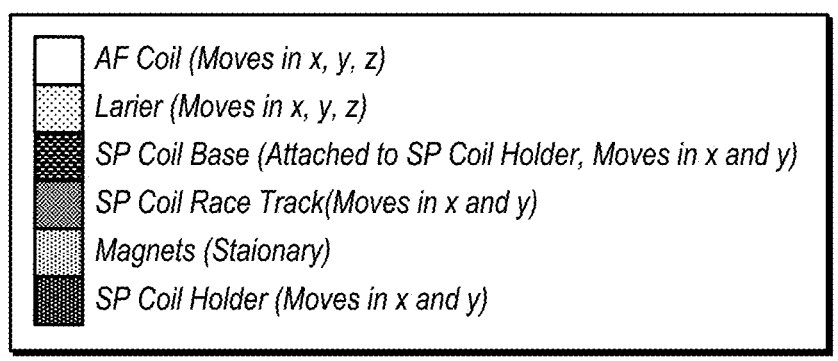
Figure 6B:
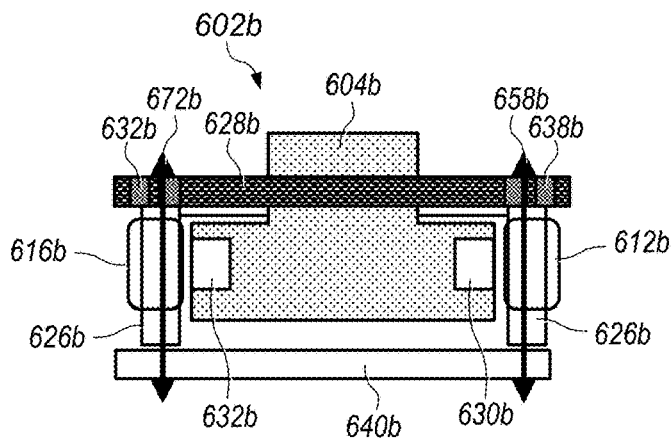
Figure 6C:
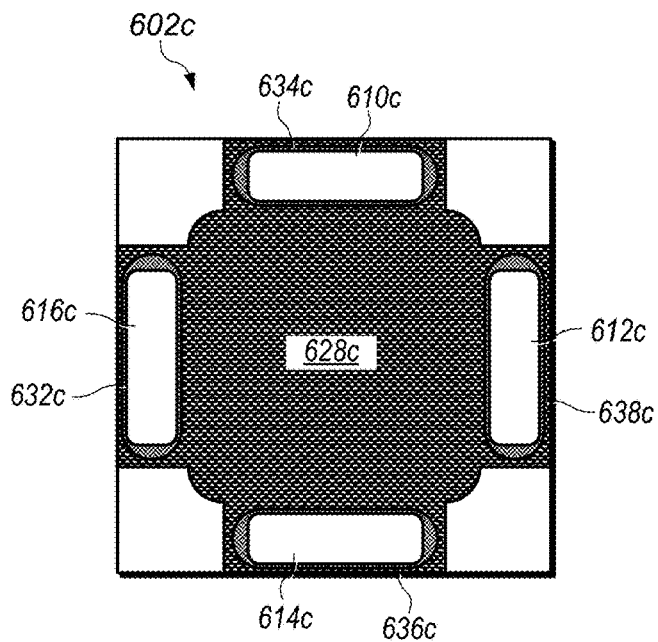
Figure 6D:
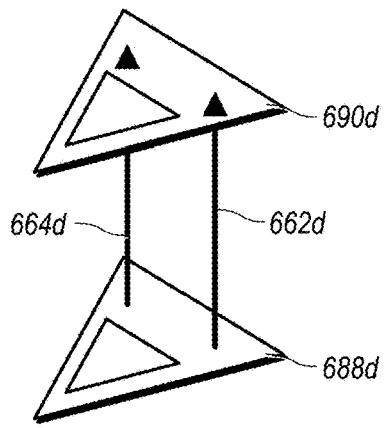

FIG. 6E contains a legend for understanding the various parts of FIGS. 6A-6C. FIG. 6D shows articulation of control wires 662a-664a to frames 688d-690d.

FIGS. 7A-D depict an example embodiment of camera module components including stationary magnets usable for a multiple camera system for portable zoom, according to at least some embodiments. Dual camera units 700a-c include embodiments of a first camera unit 702a-c and a second camera unit 718a-c of a multifunction device for capturing a first image of a first or second visual field.

Each of camera units 702a-c and 718a-c includes one of optics packages 704a-b and 709a-b and actuator components for moving the optical packages 704a-b and 709a-b configured for focal length or an adjustable range of focal lengths.

Figure 7A:
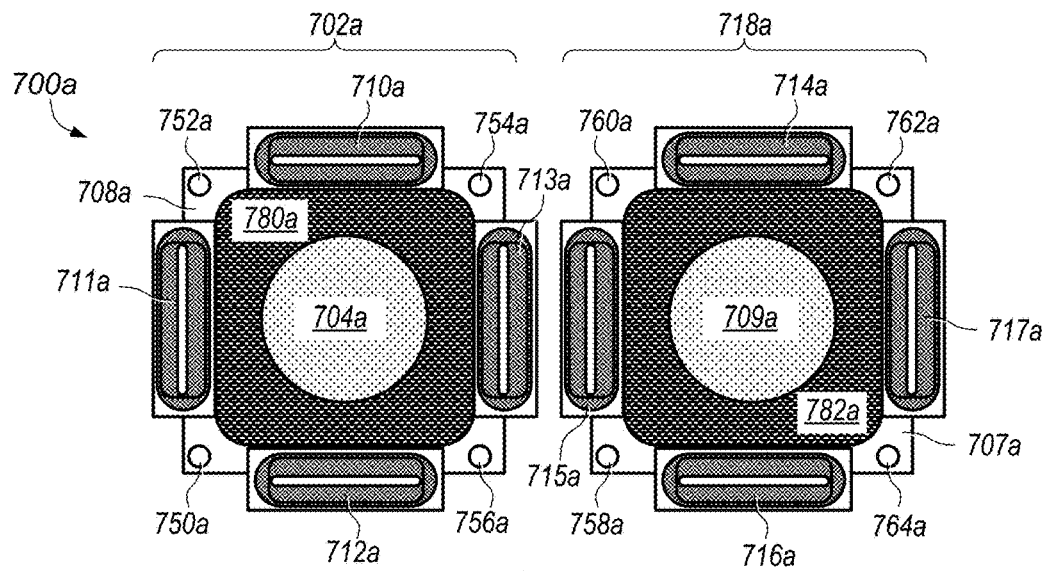
FIGS. 7A-D depict an example embodiment of camera module components including stationary magnets usable for a multiple camera system for portable zoom, according to at least some embodiments.
Figure 7B:
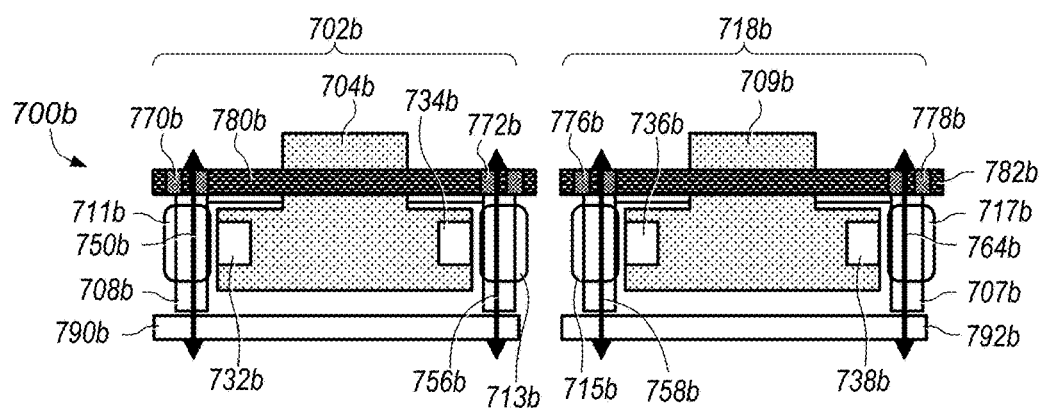
Figure 7C:
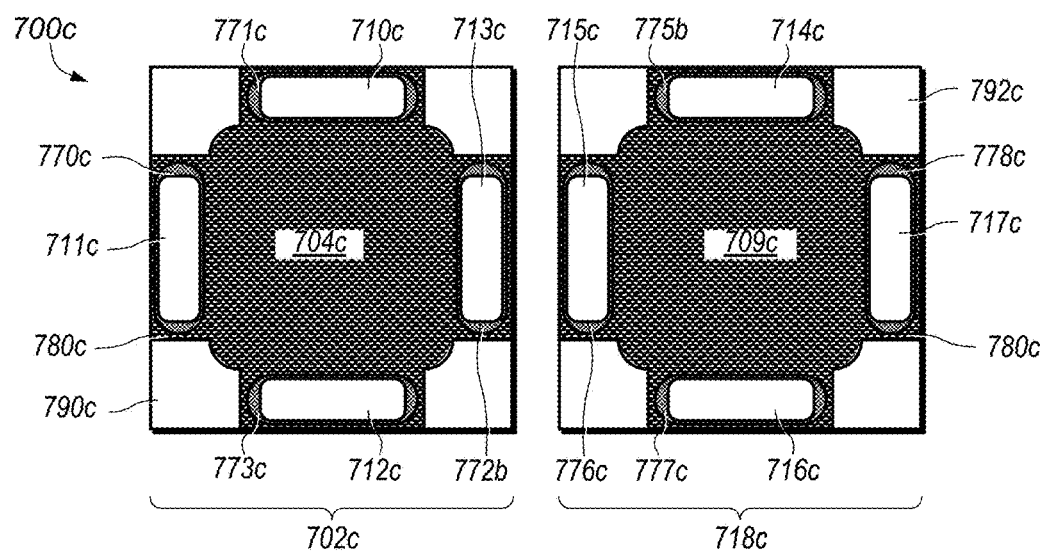
Figure 7D:
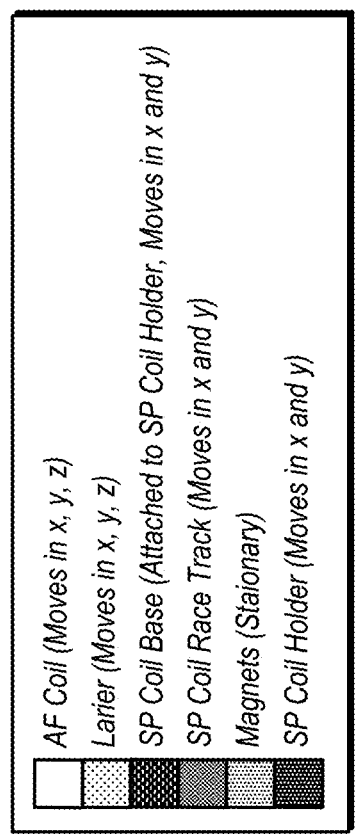

In some embodiments, the camera system of dual camera unit 700a-c includes independent magnet holders 707a-708b to which are attached one or more unshared magnets 710a-713c of the first camera unit 702a-c and one or more magnets 714a-717c of the second camera unit 718a-c used to generate magnetic fields usable in creating motion in one or more of the first camera unit 702a-c and the second camera unit 718a-c. In some embodiments, the camera system of dual camera unit 700a-c includes coils 732b-734b of the first camera unit 702b and one or more coils 736b-738b of the second camera unit used to generate force usable in creating motion in one or more of the first camera unit 702a-c and the second camera unit 718a-c. Suspension wires 750a-764b are also shown. Coil bases 780a-782c, actuator bases 790b-792c, and SP coil race tracks 770b-778c. FIG. 7D is a legend illustrating the components of FIGS. 7A-7C.

FIGS. 8A-D illustrate an example embodiment of camera module components including stationary magnets usable for a multiple camera system for portable zoom, according to at least some embodiments. Dual camera units 800a-c include embodiments of a first camera unit 802a-c sharing a magnet 815a-815c a second camera unit 818a-c of a multifunction device for capturing a first image of a first or second visual field.

Each of camera units 802a-c and 818a-c includes one of optics packages 804a-b and 809a-b and actuator components for moving the optical packages 804a-b and 809a-b configured for focal length or an adjustable range of focal lengths.

Figure 8A:
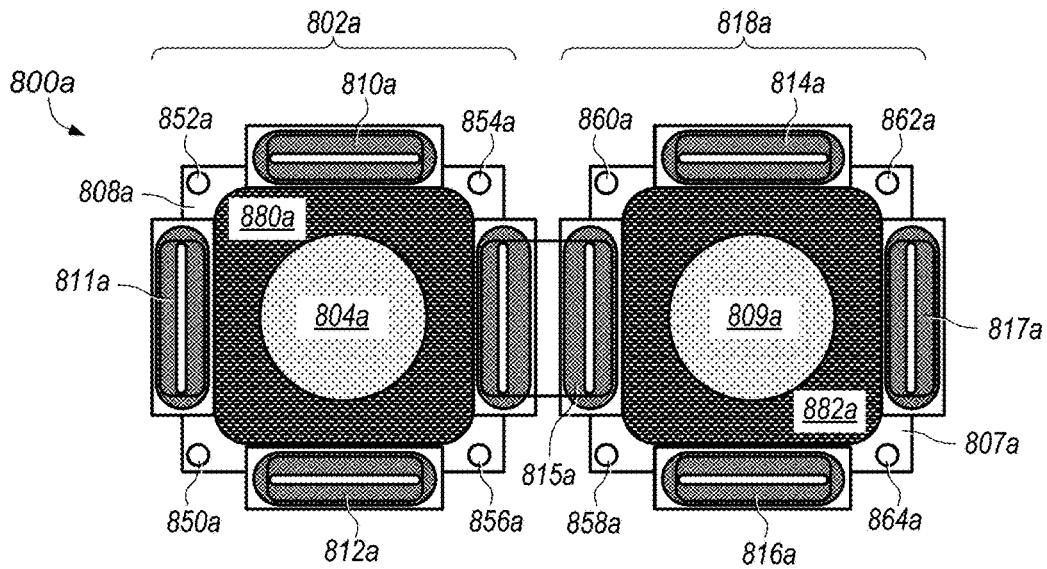
FIGS. 8A-D illustrate an example embodiment of camera module components including stationary magnets usable for a multiple camera system for portable zoom, according to at least some embodiments.
Figure 8B:
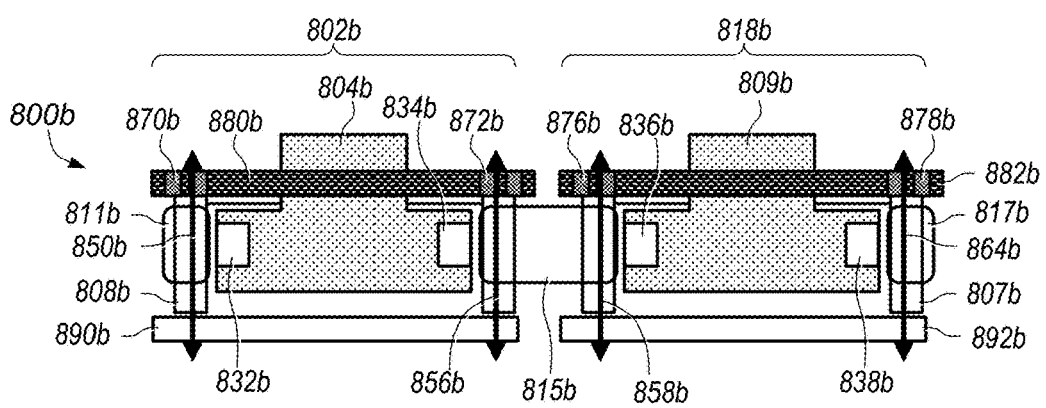
Figure 8C:
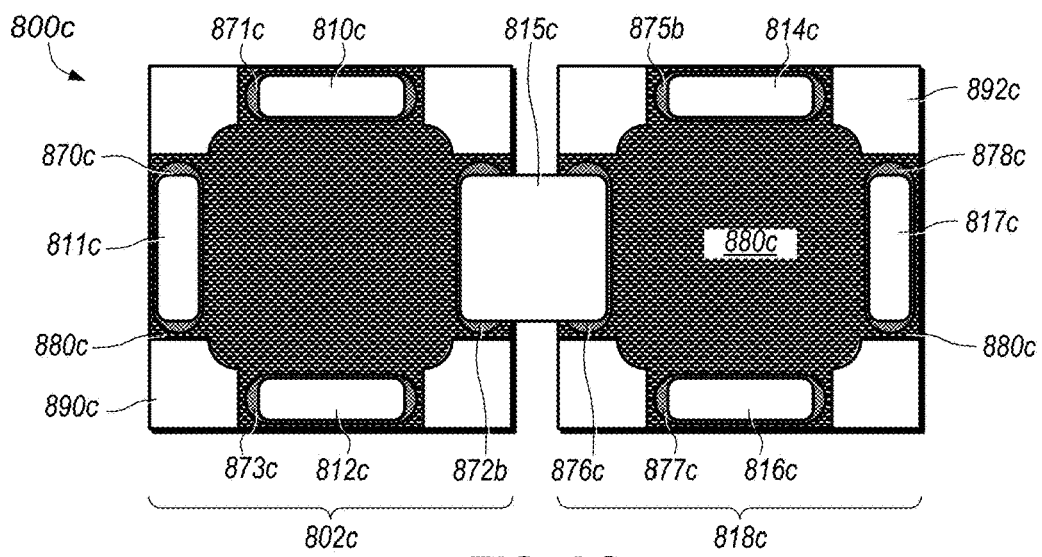
Figure 8D:
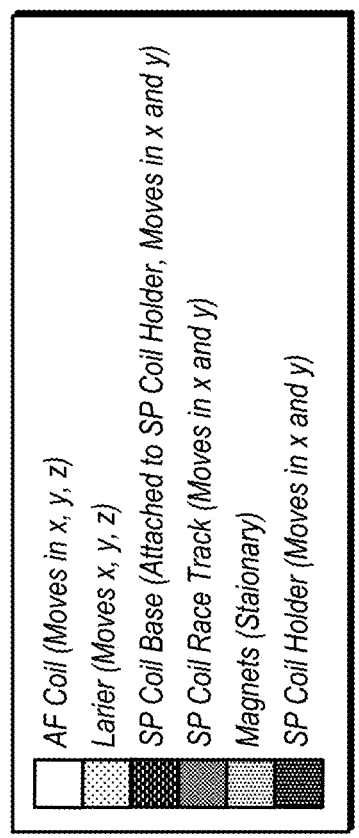
Figure 10A:
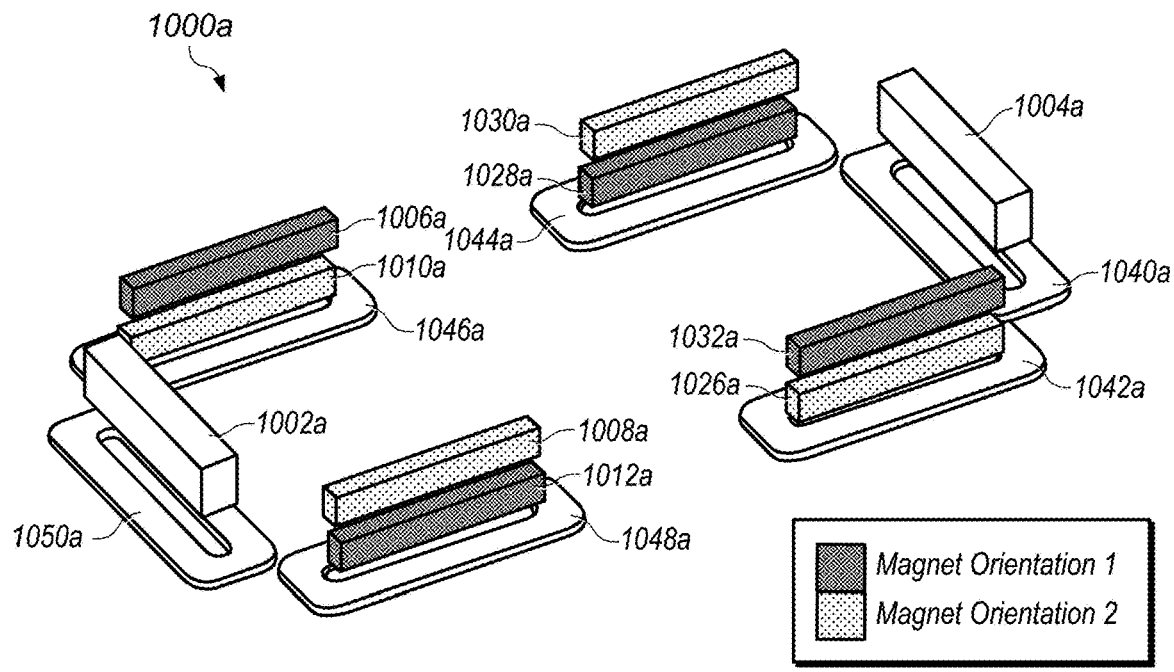
Figure 10B:
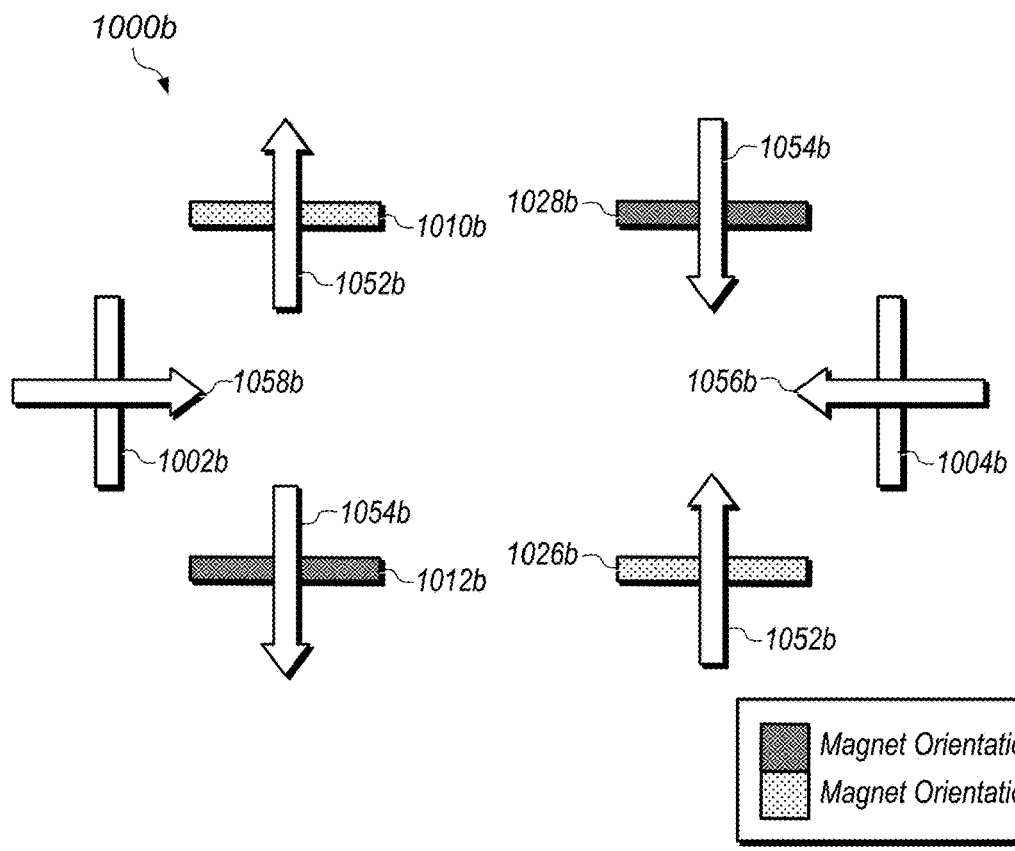
Figure 10C:
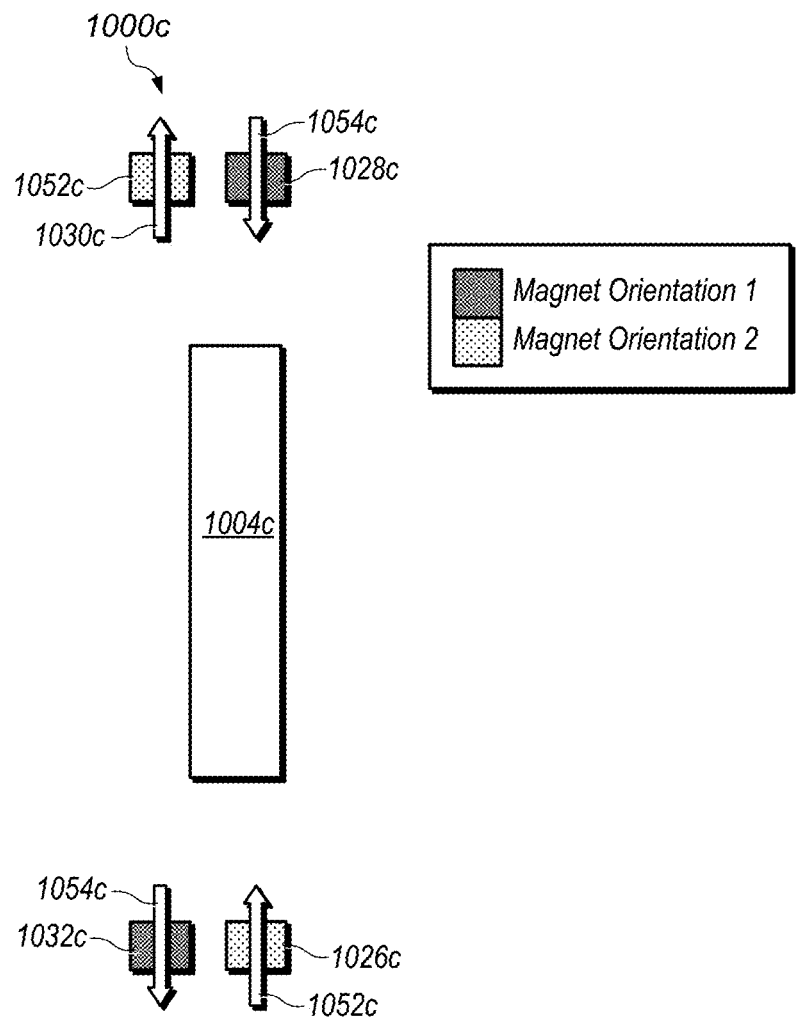
Figure 10G:
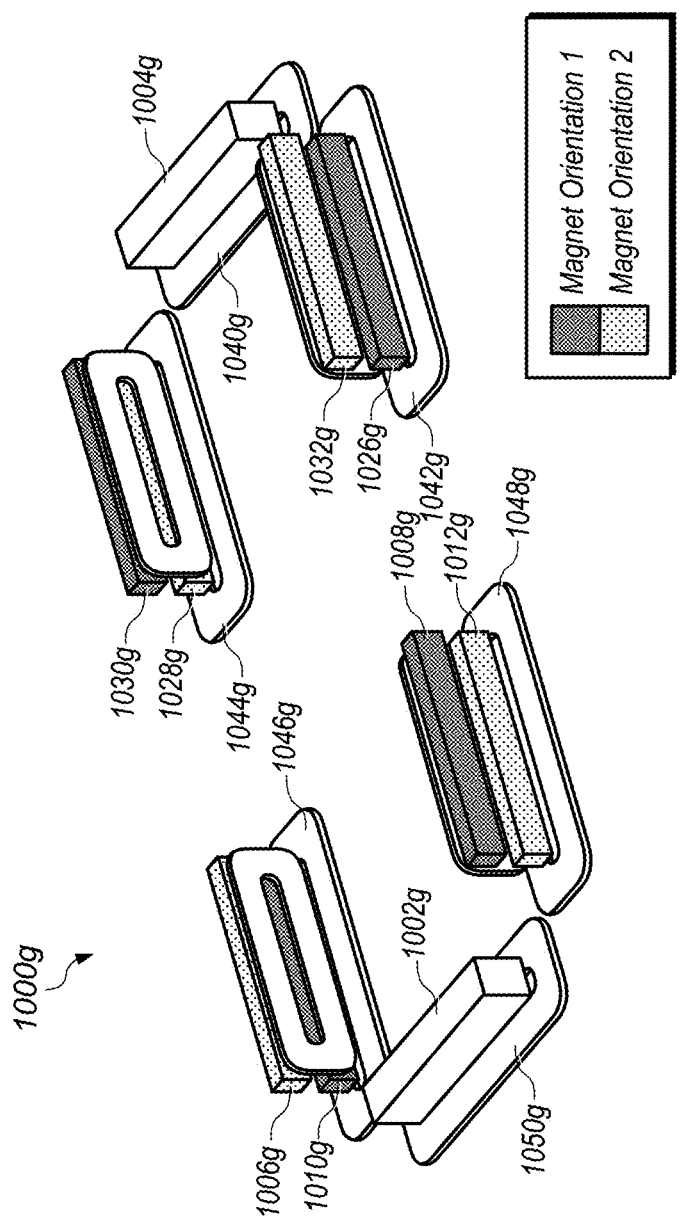

In some embodiments, the camera system of dual camera unit 800a-c includes independent magnet holders 807a-808b to which are attached one or more unshared magnets 810a-813c of the first camera unit 802a-c and one or more magnets 814a-c, shared magnets 815a-c and 816a-817c of the second camera unit 818a-c used to generate magnetic fields usable in creating motion in one or more of the first camera unit 802a-c and the second camera unit 818a-c. In some embodiments, the camera system of dual camera unit 800a-c includes coils 832b-834b of the first camera unit 802b and one or more coils 836b-838b of the second camera unit used to generate force usable in creating motion in one or more of the first camera unit 802a-c and the second camera unit 818a-c. Suspension wires 850a-864b are also shown. Coil bases 880a-882c, actuator bases 890b-892c, and SP coil race tracks 870b-878c. FIG. 8D is a legend illustrating the components of FIGS. 8A-8C.

FIGS. 9A-C depict an example embodiment of camera module components including shielded magnets usable for a multiple camera system for portable zoom, according to at least some embodiments. Some embodiments use high permeability metal to shield the magnetic field restricting it to stay within the magnet holder, thereby limiting undesirable interaction forces or disturbances from nearby magnetic materials or stray fields from other electro magnetic devices. An example using high permeability 1010 steel is shown in FIGS. 9A-C. In some embodiments, shielding material is coated or glued or insert molded into a plastic magnet holder. In some embodiments, shielding material is used to make the entire magnet holder (e.g., in metal injection molding).

Each of camera units 902a-904a includes one of optics carriers 906a, 906b and 908a containing an optics package and actuator components for moving the optical packages in optics carriers 906a-b and 908a configured for focal length or an adjustable range of focal lengths.

In some embodiments, the camera systems of camera units 902a-904a include one or more magnets 910a-916a and 910b of the camera units 902a-904a with metallic shields 920a-926a and 920b of thickness t 928b set in magnet holders 930a-936a and 930b to generate magnetic fields usable in creating motion in one or more of the camera unit 902a-904a. In some embodiments, camera units 902a-904a operate independently.

In some embodiments, the camera system of camera units 902a-904a includes coils 940a-946a and 940b set in a coil base and coil holder of the camera unit 902a-904a used to generate force usable in creating motion in the camera unit 902a-904a for movement relative to bases 952a-954a. FIG. 9C is a legend for use with FIGS. 9A-9B.

FIGS. 10A-G depict example embodiments of camera module components including arrays of magnets omitting a center magnet between modules and usable for a multiple camera system for portable zoom, according to at least some embodiments. Some embodiments use a magnet arrangement that enables side by side (dual) Optical Image Stabilization (OIS) camera modules in portable devices, with minimal magnetic interaction between adjacent modules.

While other magnet arrangements described herein have four total magnets: one in each corner of the module or one along each side of the module, the embodiments described below and illustrated in FIGS. 10A-G include a single side magnet on one side and four total magnets on the adjacent sides, each pair with opposite polarity, which totals five magnets per module. The remaining single side (e.g., center between the two actuators) does not have a permanent magnet. In some embodiments, opposing polarity magnets function to contain the fringing flux field, which might otherwise be a primary source of interaction forces between adjacent camera modules. Such embodiments reduce the interaction forces.

In some embodiments, each of FIGS. 10A-10G includes a view of a set of magnets (or a set of magnets and coils) usable for a dual camera unit, which unit is one embodiment of a first camera unit and a second camera unit of a multifunction device for capturing a first image of a first or second visual field. In some embodiments, magnets 1002a-g are lateral magnets of a first camera unit. In some embodiments, magnets 1004a-g are lateral magnets of a second camera unit. In some embodiments, the camera systems 1000a-g each include a first pair of first actuator transverse magnets 1006a-g and 1008a-g situated opposite one another with respect to an axis between lateral magnets 1002a-g and lateral magnets 1004a-g. In some embodiments, the camera systems 1000a-g further each comprise a second pair of first actuator transverse magnets 1010a-g and 1012a-g situated opposite one another with respect to an axis between lateral magnets 1002a-g and lateral magnets 1004a-g.

In some embodiments, the camera systems 1000a-g each further include a first pair of second actuator transverse magnets 1026a-g and 1028a-g situated opposite one another with respect to an axis between lateral magnets 1002a-g and lateral magnets 1004a-g. In some embodiments, the camera systems 1000a-g each further include a second pair of second actuator transverse magnets 1030a-g and 1032a-g situated opposite one another with respect to an axis between lateral magnets 1002a-g and lateral magnets 1004a-g. In some embodiments, magnets 1030a-g, 1026a-g, 1008a-g, and 1010a-g are oriented with a first polarity antiparallel to a second polarity with which magnets 1028a-g, 1026a-g, 1006a-g and 1012a-g are oriented.

In some embodiments, magnets 1006a-g and 1010a-g are arrayed in a pair with polarities opposite one another, and magnets 1032a-g and 1026a-g are arrayed in a pair with polarities opposite one another. In some embodiments, magnets 1006a-g and 1010a-g are arrayed in a pair with polarities opposite one another, and magnets 1032a-g and 1026a-g are arrayed in a pair with polarities opposite one another. In some embodiments, OIS coils 1040a-g interact with magnetic fields generated by respective ones of magnets 1002a-g-1032a-g. Some embodiments of orientations 1052b-c-1058b-c are provided in FIGS. 10B-C. In some embodiments, autofocus coils 1082e-1088g interact with magnetic fields generated by respective ones of magnets 1002a-g-1032a-g. Note that magnetic field orientations within any of FIGS. 10A-G may differ from magnetic field orientations of any other of FIGS. 10A-G, such that the use of "first orientation" or "second orientation" is arbitrary as between diagrams and represents many possible embodiments without departing from the scope or intent of the disclosure contained herein.

Figure 11A:
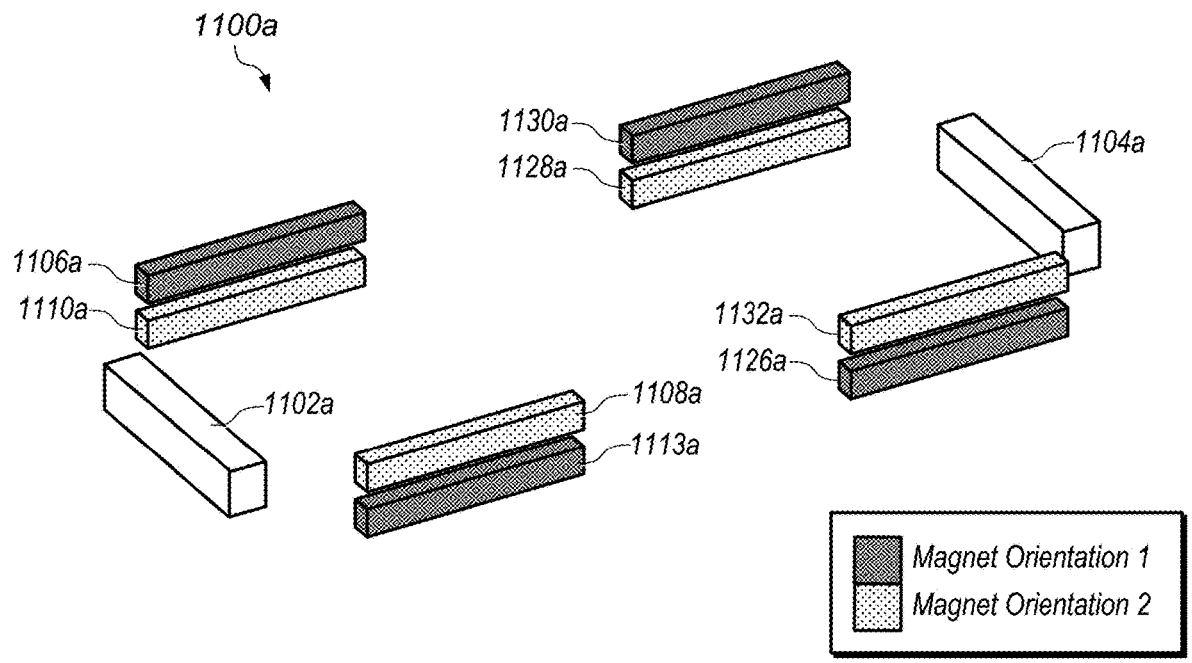
FIGS. 11A-B depict example embodiments of camera module components including arrays of magnets omitting a center magnet between modules and usable for a multiple camera system for portable zoom, according to at least some embodiments.
Figure 11B:
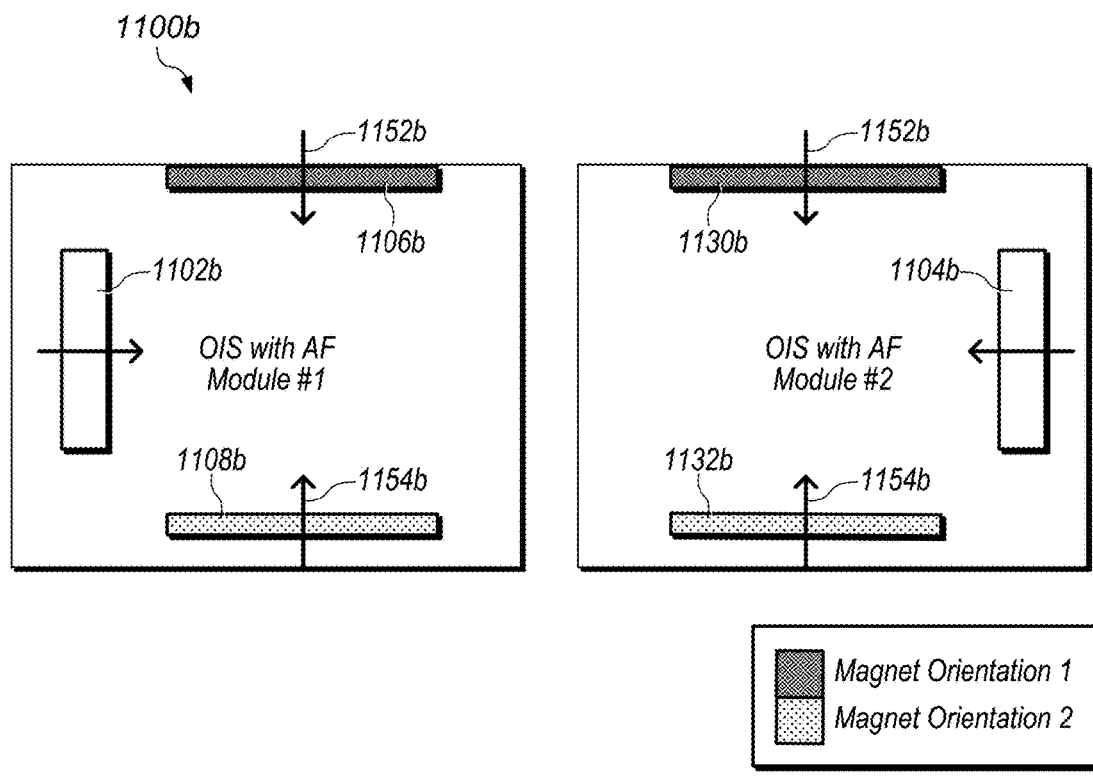

FIGS. 11A-B depict example embodiments of camera module components including arrays of magnets omitting a center magnet between modules and usable for a multiple camera system for portable zoom, according to at least some embodiments.

In some embodiments, each of FIGS. 11A-11B includes a view of a set of magnets usable for a dual camera unit, which unit is one embodiment of a first camera unit and a second camera unit of a multifunction device for capturing a first image of a first or second visual field. In some embodiments, magnets 1102a-b are lateral magnets of a first camera unit. In some embodiments, magnets 1104a-b are lateral magnets of a second camera unit. In some embodiments, the camera systems 1100a-b each include a first pair of first actuator transverse magnets 1106a-b and 1108a-b situated opposite one another with respect to an axis between lateral magnets 1102a-b and lateral magnets 1104a-b. In some embodiments, the camera systems 1100a-b further each comprise a second pair of first actuator transverse magnets 1110a and 1113a situated opposite one another with respect to an axis between lateral magnets 1102a-b and lateral magnets 1104a-b.

In some embodiments, the camera systems 1100a-b each further include a first pair of second actuator transverse magnets 1126a and 1128a situated opposite one another with respect to an axis between lateral magnets 1102a-b and lateral magnets 1104*a-b*. In some embodiments, the camera systems 1100*a-b* each further include a second pair of second actuator transverse magnets 1130*a-b* and 1132*a-b* situated opposite one another with respect to an axis between lateral magnets 1102*a-b* and lateral magnets 1104*a-b*. In some embodiments, magnets 1130*a-b*, 1126*a*, 1106*a-b*, and 1113*a* are oriented with a first polarity 1152*b* antiparallel to a second polarity 1154*b* with which magnets 1128*a*, 1132*a-b*, 1110*a* and 1108*a-b* are oriented.

In some embodiments, magnets 1106*a-b* and 1110*a* are arrayed in a pair with polarities opposite one another, and magnets 1132*a-b* and 1126*a* are arrayed in a pair with polarities opposite one another. In some embodiments, magnets 1106*a-b* and 1110*a* are arrayed in a pair with polarities opposite one another, and magnets 1132*a-b* and 1126*a* are arrayed in a pair with polarities opposite one another.

Figure 12A:
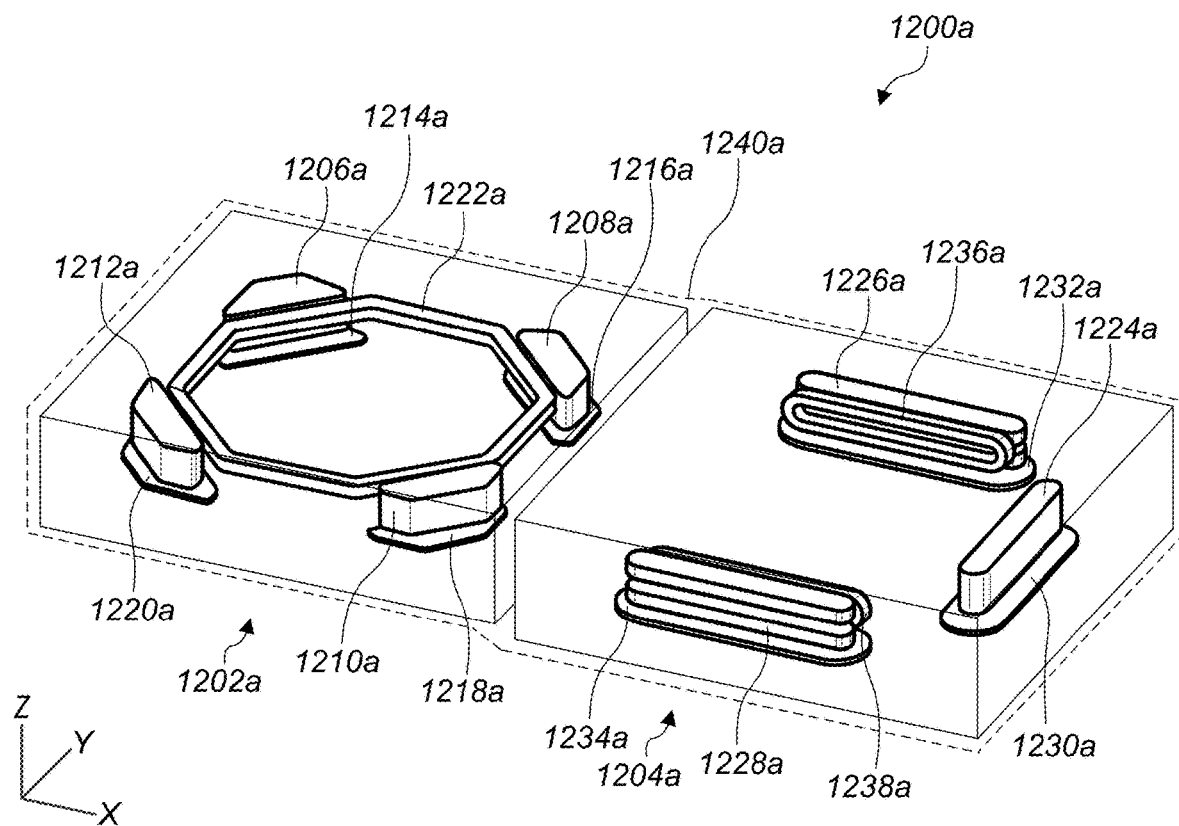
FIG. 12A depicts a perspective view of an example embodiment of a camera system including a first camera unit and a second camera unit, according to some embodiments.

FIG. 12A depicts an example embodiment of a camera system 1200*a* including a first camera unit 1202*a* and a second camera unit 1202*b*, according to some embodiments.

Figure 12B:
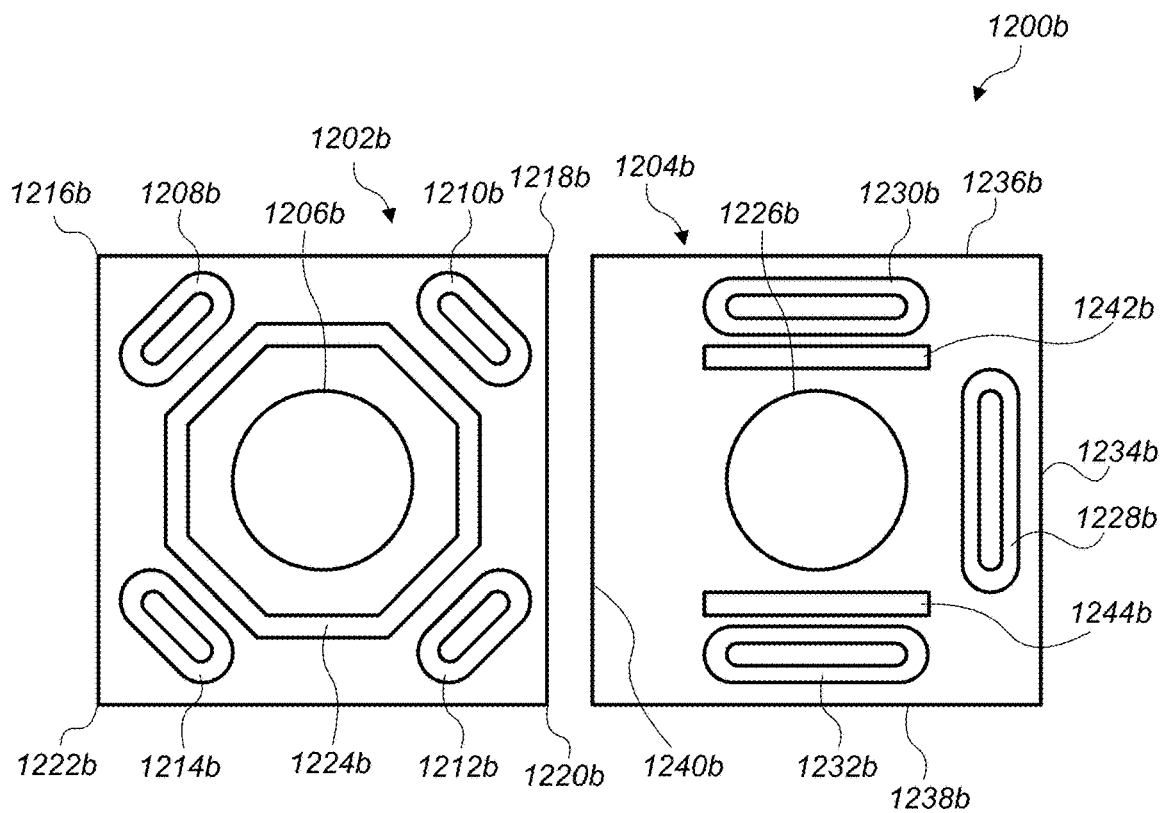
FIG. 12B depicts a top view of an example embodiment of a camera system including a first camera unit and a second camera unit, according to some embodiments. In particular.
Figure 12C:
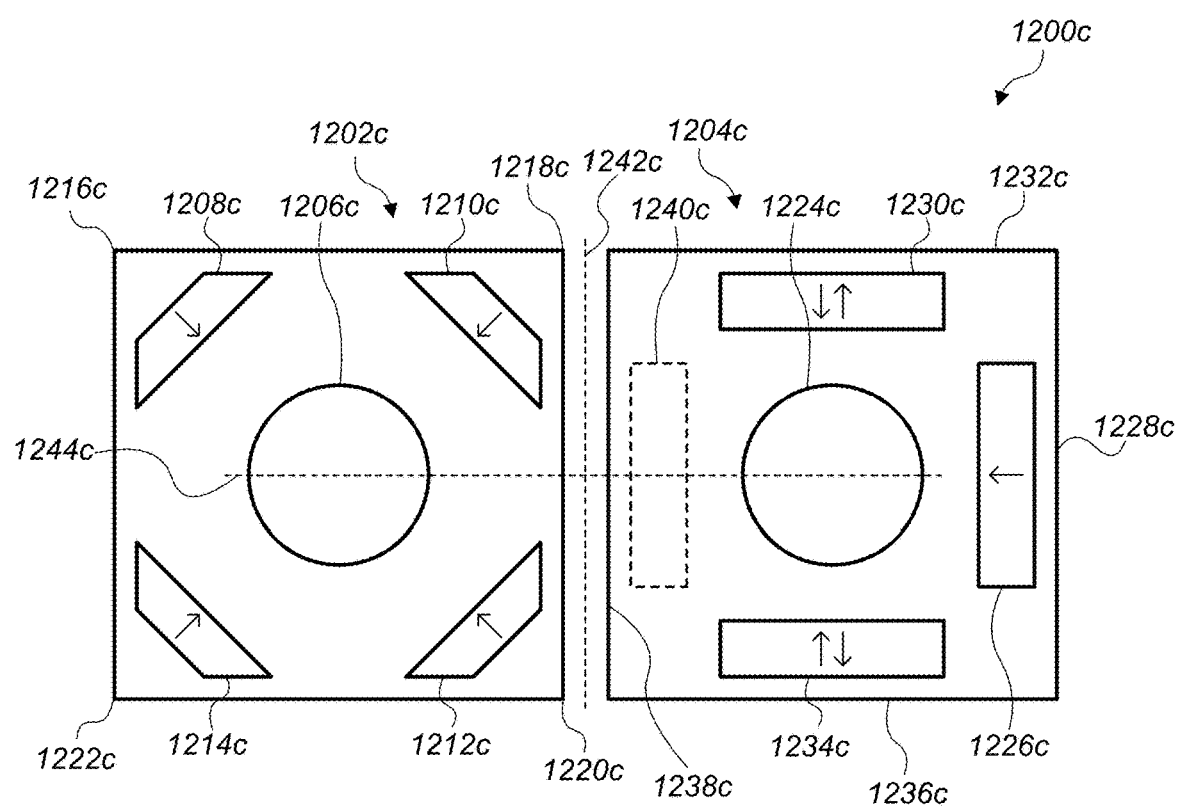
FIG. 12C depicts a top view of an example embodiment of a camera system including a first camera unit and a second camera unit, according to some embodiments. In particular.

The first camera unit 1202*a* may include a first voice coil motor (VCM) actuator configured to move a first optical package (e.g., the first optical packages 1206*b*, 1206*c* illustrated in FIGS. 12B-12C). For instance, the first VCM actuator may be configured to move the first optical package along a first optical axis and/or along a first plane that is orthogonal to the first optical axis. The first optical package may include one or more lenses that define the first optical axis.

In various examples, the first VCM actuator of the first camera unit 1202*a* may include one or more magnets and/or one or more coils for actuation along the first optical axis and/or along the first plane that is orthogonal to the first optical axis. For instance, at least one of the coils may be configured to receive a current that causes the coil to produce a magnetic field that interacts with at least one magnetic field of the one or more magnets.

In some embodiments, the first VCM actuator of the first camera unit 1202*a* may include a symmetric magnet arrangement. For example, the first camera unit may be rectangular in plan, and the symmetric magnet arrangement may include multiple magnets that are individually arranged to exhibit mirror symmetry about a respective plane that is angled, at a non-zero angle, with respect to at least one side of the first camera unit 1202*a*. In some examples, the symmetric magnet arrangement may include four magnets that are individually arranged to exhibit mirror symmetry about a respective plane that is angled, at a non-zero angle, with respect to at least one side of the first camera unit 1202*a*. For instance, in some embodiments, the magnets may be individually arranged to exhibit mirror symmetry about a respective plane that is angled at or about 45 degrees with respect to at least one side of the first camera unit 1202*a*.

In some examples, the first VCM actuator may include a first magnet 1206*a*, a second magnet 1208*a*, a third magnet 1210*a*, and a fourth magnet 1212*a*. The magnets 1206*a*-1212*a* may form the symmetric magnet arrangement. The first camera unit 1202*a* may be rectangular in plan, and the magnets 1206*a*-1212*a* may be individually arranged to exhibit mirror symmetry about a respective plane that is angled, at a non-zero angle, with respect to at least one side of the first camera unit 1202*a*. For instance, in some embodiments, the magnets 1206*a*-1212*a* may be individually arranged to exhibit mirror symmetry about a respective plane that is angled at or about 45 degrees with respect to at least one side of the first camera unit 1202*a*. As illustrated in FIG. 12A, the magnets 1206*a*-1212*a* may be corner magnets. That is, the magnets 1206*a*-1212*a* may be individually disposed proximate a respective corner of the first camera unit 1202*a*.

In some embodiments, the first VCM actuator of the first camera unit 1202*a* may include a symmetric optical image stabilization coil arrangement for actuation along the first plane that is orthogonal to the first optical axis. For example, the first camera unit 1202*a* may be rectangular in plan, and the symmetric optical image stabilization coil arrangement may include multiple optical image stabilization coils that are individually arranged to exhibit mirror symmetry about a respective plane that is angled, at a non-zero angle, with respect to at least one side of the first camera unit 1202*a*. In some examples, the symmetric optical image stabilization coil arrangement may include four optical image stabilization coils that are individually arranged to exhibit mirror symmetry about a respective plane that is angled, at a non-zero angle, with respect to at least one side of the first camera unit 1202*a*. For instance, in some embodiments, the coils may be individually arranged to exhibit mirror symmetry about a respective plane that is angled at or about 45 degrees with respect to at least one side of the first camera unit 1202*a*.

In some examples, the first VCM actuator may include a first optical image stabilization coil 1214*a*, a second optical image stabilization coil 1216*a*, a third optical image stabilization coil 1218*a*, and a fourth optical image stabilization coil 1220*a*. The optical image stabilization coils 1214*a*-1220*a* may form the symmetric optical image stabilization coil arrangement. The first camera unit 1202*a* may be rectangular in plan, and the optical image stabilization coils 1214*a*-1220*a* may be individually arranged to exhibit mirror symmetry about a respective plane that is angled, at a non-zero angle, with respect to at least one side of the first camera unit 1202*a*. For instance, in some embodiments, the optical image stabilization coils 1214*a*-1220*a* may be individually arranged to exhibit mirror symmetry about a respective plane that is angled at or about 45 degrees with respect to at least one side of the first camera unit 1202*a*. As illustrated in FIG. 12A, the optical image stabilization coils 1214*a*-1220*a* may be corner optical image stabilization coils. That is, the optical image stabilization coils 1214*a*-1220*a* may be individually disposed proximate a respective corner of the first camera unit 1202*a*.

In some embodiments, at least one magnet of the symmetric magnet arrangement may be configured to magnetically interact with a corresponding optical image stabilization coil of the symmetric optical image stabilization coil arrangement. According to some examples, the first camera unit may be rectangular in plan, and a combined arrangement of the magnet and the corresponding optical image stabilization coil may exhibit mirror symmetry about a plane that is angled, at a non-zero angle, with respect to at least one side of the first camera unit 1202*a*. For instance, in some embodiments, the combined arrangement of the magnet and the corresponding optical image stabilization coil may exhibit mirror symmetry about a plane that is angled at or about 45 degrees with respect to at least one side of the first camera unit 1202*a*.

As a non-limiting example, the first magnet 1206*a* may be configured to magnetically interact with the first optical image stabilization coil 1214*a*. The combined arrangement of the first magnet 1206*a* and the first optical image stabilization coil 1214*a* may exhibit mirror symmetry about a plane that is angled at or about 45 degrees with respect to at least one side of the first camera unit 1202*a*. Similarly, the combined arrangement of the second magnet 1208*a* and a corresponding optical image stabilization coil (e.g., the second optical image stabilization coil 1216a), the combined arrangement of the third magnet 1210a and a corresponding optical image stabilization coil (e.g., the third optical image stabilization coil 1218a), and/or the combined arrangement of the fourth magnet 1212a and a corresponding optical image stabilization coil (e.g., the fourth optical image stabilization coil 1220a) may each exhibit mirror symmetry about a plane that is angled at or about 45 degrees with respect to at least one side of the first camera unit 1202a.

In various embodiments, the first VCM actuator of the first camera unit 1202a may include at least one autofocus coil 1222a for actuation along the first optical axis. For instance, the autofocus coil 1222a may be configured to radially surround the first optical package of the first camera unit 1202a. In some embodiments, the autofocus coil 1222a may be octagonal in plan. Some or all of the magnets 1206a-1212a of the first VCM actuator may be individually disposed proximate a respective side of the octagonal autofocus coil 1222a. However, it should be understood that in other embodiments the autofocus coil may otherwise be polygonal, or circular, in plan.

In some embodiments, the second camera unit 1204a may include a second VCM actuator configured to move a second optical package (e.g., the second optical packages 1226b, 1224c illustrated in FIGS. 12B-C). For instance, the second VCM actuator may be configured to move the first optical package along a first optical axis and/or along a first plane that is orthogonal to the first optical axis. The first optical package may include one or more lenses that define the first optical axis.

In some embodiments, the second VCM actuator of the second camera unit 1204a may include one or more magnets and/or one or more coils for actuation along the second optical axis and/or along the second plane that is orthogonal to the second optical axis. For instance, at least one of the coils may be configured to receive a current that causes the coil to produce a magnetic field that interacts with at least one magnetic field of the one or more magnets.

In some embodiments, the second VCM actuator of the second camera unit 1204a may include an asymmetric magnet arrangement. For example, the second camera unit 1204a may be rectangular in plan, and the asymmetric magnet arrangement may include a first magnet 1224a (e.g., an actuator lateral magnet) disposed proximate a first side of the second camera unit 1204a, a second magnet 1226a (e.g., an actuator transverse magnet) disposed proximate a second side of the second camera unit 1204a, and a third magnet 1228a (e.g., an actuator transverse magnet) disposed proximate a third side of the second camera unit 1204a. The third side of the second camera unit 1204a may be opposite the second side of the second camera unit 1204a. In some embodiments, no magnets are disposed proximate a fourth side of the second camera unit 1204a. The fourth side of the second camera unit 1204a may be opposite the first side of the second camera unit 1204a.

In some examples, the second VCM actuator of the second camera unit 1204a may include an asymmetric optical image stabilization coil arrangement for actuation along the second plane that is orthogonal to the second optical axis. For example, the asymmetric optical image stabilization coil arrangement may include a first optical image stabilization coil 1230a disposed proximate to the first magnet 1224a of the asymmetric magnet arrangement, a second optical image stabilization coil 1232a disposed proximate to the second magnet 1226a of the asymmetric magnet arrangement, and a third optical image stabilization coil 1234a disposed proximate the third magnet 1228a of the asymmetric magnet arrangement.

In various embodiments, the second VCM actuator of the second camera unit 1202a may include one or more autofocus coils for actuation along the second optical axis. For instance, the autofocus coils of the second VCM actuator may include a first autofocus coil 1236a disposed proximate the second magnet 1226a of the asymmetric magnet arrangement, and a second autofocus coil 1238a disposed proximate the third magnet 1228a of the asymmetric magnet arrangement.

In some embodiments, the first camera unit 1202a may be disposed adjacent to the second camera unit 1204a. For example, the first camera unit 1202a and the second camera unit 1204a may each be rectangular in plan, and the first camera unit 1202a may be disposed adjacent to the second camera unit 1204a along a first axis that intersects a second axis. For instance, the second axis may extend through the first optical package of the first camera unit 1202a and the second optical package of the second camera unit 1204a. The asymmetric magnet arrangement of the second VCM actuator may include a first magnet 1224a disposed proximate a first side of the second camera unit 1204a that is distal to the first axis. Furthermore, the first magnet 1224a may have a longitudinal axis that is parallel to the first axis. In some embodiments, no magnets are disposed proximate a second side of the second camera unit 1204a that is opposite the first side of the second camera unit 1204a. The second side of the second camera unit 1204a may extend in a direction that is parallel to the first axis. In some examples, a dummy mass (e.g., the dummy mass 1240c illustrated in FIG. 12C) may be disposed proximate the second side of the second camera unit 1204a that is opposite the first side of the second camera unit. The dummy mass may be configured to act as a counterbalance to the first magnet 1224a disposed proximate the first side of the second camera unit 1204a.

In some examples, the first camera unit 1202a may be smaller in one or more dimensions than the second camera unit 1204a. For example, the corner magnet and coil arrangement of the first VCM actuator may allow for a smaller X, Y, and/or Z dimension of the first camera unit 1202a than a corresponding X, Y, and/or Z dimension of the second camera unit 1204a. For instance, the broken line illustrated in FIG. 12A includes a tapered portion 1240a that indicates a difference in size between the first camera unit 1202a and the second camera unit 1204a.

In some embodiments, the first camera unit 1202a may be configured to capture a first image of a first visual field. The second camera unit 1204a may be configured to capture a second image of a second visual field. In some examples, the first camera unit 1202a and the second camera unit 1204a may be configured to simultaneously capture the first image of the first visual field and the second image of the second visual field, respectively. The second visual field may be a subset of the first visual field. Furthermore, in some embodiments, the first optical package of the first camera unit 1202a may be configured for a first focal length, and the second optical package of the second camera unit 1204a may be configured for a second focal length. The second focal length may be a different length than the first focal length. In some examples, the first optical package of the first camera unit 1202a may be configured with a wide-angle lens and the second optical package of the second camera unit 1204a may be configured with a telephoto lens.

In some embodiments, the first camera unit 1202a and the second camera unit 1204a may include any suitable component, arrangement, architecture, and/or functionality disclosed herein. In some non-limiting examples, the first VCM actuator and/or the first camera unit 1202*a* may be configured, and/or function, similar to one or more of the camera modules that include a symmetric magnet arrangement (e.g., a corner magnet arrangement) discussed above, e.g., with reference to FIG. 3. In some non-limiting examples, the second VCM actuator and/or the second camera unit 1204*a* may be configured, and/or function, similar to one or more of the camera modules that include an asymmetric magnet arrangement discussed above, e.g., with reference to FIGS. 10A-10B. Additionally or alternatively, the first camera unit 1202*a* and/or the second camera unit 1204*a* may include an architecture similar to one or more of the architectures discussed above, e.g., with reference to FIG. 1C.

In some embodiments, the autofocus coil 1222*a* of the first VCM actuator may be attached to the first optical package of the first camera unit 1202*a*. A yoke component (not shown) of the first camera unit 1202*a* may support and house the four magnets 1206*a*-1212*a* of the first VCM actuator. Each of the magnets 1206*a*-1212*a* may be poled so as to generate a magnetic field, the useful component of which for the autofocus function is orthogonal to the first optical axis. The magnetic field for all four magnets may all either be directed towards the autofocus coil 1222*a*, or away from the autofocus coil 1222*a*, so that the Lorentz forces from all four magnets act in the same direction along the first optical axis, thereby causing the autofocus coil 1222*a* and the first optical package to move along the first optical axis. The yoke component may act as a support chassis structure for the autofocus mechanism of the first VCM actuator. The first optical package may be suspended on the yoke component by an upper spring (e.g., the upper spring 1030 illustrated in FIG. 1C) and a lower spring (e.g., the lower spring 1032 illustrated in FIG. 1C). In this way when an electric current is applied to autofocus coil 1222*a*, Lorentz forces are developed due to the presence of the four magnets 1206*a*-1220*a*, and a force substantially parallel to the first optical axis is generated to move the first optical package, and hence one or more lens elements within the first optical package, along the first optical package, relative to the yoke component so as to focus the lens. In addition to suspending the first optical package and substantially eliminating parasitic motions, the upper spring and lower spring may also resist the Lorentz forces, and hence convert the forces to a displacement of the lens.

In some embodiments, the suspension of the yoke component may be achieved by the use of four corner wires (e.g., the suspension wires 1020 illustrated in FIG. 1C), for instance, wires with a circular cross-section. Each wire may act as a flexure beam capable of bending with relatively low stiffness, thus allowing motion in both optical image stabilization degrees-of-freedom. In some embodiments, the wires may be relatively stiff in directions parallel to the optical axis, as this would require the wire to stretch or buckle, thus substantially preventing parasitic motions in these directions. Furthermore, the presence of four such wires, appropriately separated allows them to be stiff in the parasitic tilt directions of pitch and yaw, thus substantially preventing relative dynamic tilt between the lens and image sensor.

Embodiments may achieve two independent degree-of-freedom motion, orthogonal to the first optical axis, by using the optical image stabilization coils 1214*a*-1220*a*. In some cases, a first pair of the optical image stabilization coils 1214*a*-1220*a* may act together to deliver controlled motion in one linear axis orthogonal to the first optical axis, and a second pair may deliver controlled motion in a direction substantially orthogonal to the first pair. The optical image stabilization coils 1214*a*-1220*a* may be fixed to a base component (e.g., the base 1008 illustrated in FIG. 1C) of the first camera unit 1202*a*, and when current is appropriately applied, the optical image stabilization coils 1214*a*-1220*a* may interact with the magnets 1206*a*-1212*a* to generate Lorentz forces that move the first optical package as desired along one or more directions orthogonal to the first optical axis.

In various embodiments, the first camera unit 1202*a* may include an image sensor (e.g., the image sensor 1070 illustrated in FIG. 1C). The image sensor may be disposed below the first optical package such that light rays may pass through one or more lens elements of the first optical package (e.g., via an aperture at the top of the first optical package) and to the image sensor.

In some embodiments, the autofocus coils 1236*a*-1238*a* of the second VCM actuator may be attached to opposing sides, or opposing portions, of the second optical package of the second camera unit 1204*a*. A yoke component (not shown) of the first camera unit 1202*a* may support and house the magnets 1224*a*-1228*a* of the second VCM actuator. In some examples, the second magnet 1226*a* and the third magnet 1228*a* may each be dual pole magnets that interact with the autofocus coils 1236*a*-1238*a*. Each of the dual pole magnets may include opposing polarities, as discussed above with reference to FIGS. 10A-11B and as discussed below with reference to FIG. 12C. The second magnet 1226*a* may be a dual pole magnet that interacts with the first autofocus coil 1236*a*, and the third magnet 1228*a* may be a dual pole magnet that interacts with the second autofocus coil 1238*a*. The interaction between the dual pole magnets 1226*a*-1228*a* and the autofocus coils 1236*a*-1238*a* may generate forces that move the optical package along the second optical axis for optical focusing.

The second VCM actuator may include four suspension wires (e.g., the wires 1020*a* illustrated in FIG. 1C). The second optical package may be suspended with respect to a base structure (e.g., the base 1008 illustrated in FIG. 1C) by suspending one or more upper springs (e.g., the upper springs 1030 illustrated in FIG. 1C) on the suspension wires. In some embodiments, the second VCM actuator may include one or more lower springs (e.g., the lower springs 1032 illustrated in FIG. 1C). The upper spring(s) and the lower spring(s) may be flexible to allow the second optical package a range of motion along the second optical axis for optical focusing, and the suspension wires may be flexible to allow a range of motion on one or more directions orthogonal to the optical axis for optical image stabilization.

Embodiments may achieve two independent degree-of-freedom motion, orthogonal to the second optical axis, by using the optical image stabilization coils 1230*a*-1234*a*. The optical image stabilization coils 1230*a*-1234*a* may be fixed to a base component (e.g., the base 1008 illustrated in FIG. 1C) of the second camera unit 1204*a*, and when current is appropriately applied, the optical image stabilization coils 1214*a*-1220*a* may interact with the magnets 1206*a*-1212*a* to generate Lorentz forces that move the first optical package as desired along one or more directions orthogonal to the first optical axis. In some cases, a first pair of optical image stabilization coils 1232*a*-1234*a* may interact with the pair of dual pole magnets 1226*a*-1228*a* to deliver controlled motion in a first direction orthogonal to the second optical axis. The first optical image stabilization coil 1230*a* may interact with the first magnet 1224*a*, which may be a single pole magnet, to deliver controlled motion in a second direction orthogonal to the second optical axis and the first direction.

In various embodiments, the second camera unit 1204*a* may include an image sensor (e.g., the image sensor 1070 illustrated in FIG. 1C). The image sensor may be disposed below the second optical package such that light rays may pass through one or more lens elements of the second optical package (e.g., via an aperture at the top of the second optical package) and to the image sensor.

FIG. 12B depicts an example embodiment of a camera system 1200*b* including a first camera unit 1202*b* and a second camera unit 1204*b*, according to some embodiments. In particular, FIG. 12B illustrates example coil arrangements of the first camera unit 1202*b* and the second camera unit 1204*b*. The first camera unit 1202*b* and the second camera unit 1204*b* may include magnets (e.g., the example magnet arrangements illustrated in FIG. 12C) configured to magnetically interact with coils of the example coil arrangements.

The first camera unit 1202*b* may include a first VCM actuator configured to move a first optical package 1206*b*. For instance, the first VCM actuator may be configured to move the first optical package 1206*b* along a first optical axis and/or along a first plane that is orthogonal to the first optical axis. The first optical package 1206*b* may include one or more lenses that define the first optical axis.

In some embodiments, the first VCM actuator of the first camera unit 1202*b* may include a symmetric optical image stabilization coil arrangement for actuation along the first plane that is orthogonal to the first optical axis. For example, the first camera unit 1202*b* may be rectangular in plan, and the symmetric optical image stabilization coil arrangement may include multiple optical image stabilization coils that are individually arranged to exhibit mirror symmetry about a respective plane that is angled, at a non-zero angle, with respect to at least one side of the first camera unit 1202*b*. In some examples, the symmetric optical image stabilization coil arrangement may include four optical image stabilization coils that are individually arranged to exhibit mirror symmetry about a respective plane that is angled, at a non-zero angle, with respect to at least one side of the first camera unit 1202*b*. For instance, in some embodiments, the coils may be individually arranged to exhibit mirror symmetry about a respective plane that is angled at or about 45 degrees with respect to at least one side of the first camera unit 1202*b*.

In some examples, the first VCM actuator may include a first optical image stabilization coil 1208*b*, a second optical image stabilization coil 1210*b*, a third optical image stabilization coil 1212*b*, and a fourth optical image stabilization coil 1214*b*. The optical image stabilization coils 1208*b*-1214*b* may form the symmetric optical image stabilization coil arrangement. The first camera unit 1202*a* may be rectangular in plan, and the optical image stabilization coils 1214*a*-1220*a* may be individually arranged to exhibit mirror symmetry about a respective plane that is angled, at a non-zero angle, with respect to at least one side of the first camera unit 1202*b*. For instance, in some embodiments, the optical image stabilization coils 1208*b*-1214*b* may be individually arranged to exhibit mirror symmetry about a respective plane that is angled at or about 45 degrees with respect to at least one side of the first camera unit 1202*b*.

As illustrated in FIG. 12B, the optical image stabilization coils 1208*b*-1214*b* may be corner optical image stabilization coils. That is, the optical image stabilization coils 1208*b*-1214*b* may be individually disposed proximate a respective corner of the first camera unit 1202*b*. For example, the first optical image stabilization coil 1208*b* may be disposed proximate a first corner 1216*b* of the first camera unit 1202*b*, the second optical image stabilization coil 1210*b* may be disposed proximate a second corner 1218*b* of the first camera unit 1202*b*, the third optical image stabilization coil 1212*b* may be disposed proximate a third corner 1220*b* of the first camera unit 1202*b*, and/or the fourth optical image stabilization coil 1214*b* may be disposed proximate a fourth corner 1222*b* of the first camera unit 1202*b*.

In various embodiments, the first VCM actuator of the first camera unit 1202*b* may include at least one autofocus coil 1224*b* for actuation along the first optical axis. For instance, the autofocus coil 1224*b* may be configured to radially surround the first optical package 1206*b* of the first camera unit 1202*b*. In some embodiments, the autofocus coil 1224*b* may be octagonal in plan. However, it should be understood that in other embodiments the autofocus coil 1224*b* may otherwise be polygonal, or circular, in plan.

The second camera unit 1204*b* may include a second VCM actuator configured to move a second optical package 1226*b*. For instance, the second VCM actuator may be configured to move the second optical package 1226*b* along a second optical axis and/or along a second plane that is orthogonal to the second optical axis. The second optical package 1226*b* may include one or more lenses that define the second optical axis.

In some examples, the second VCM actuator of the second camera unit 1204*b* may include an asymmetric optical image stabilization coil arrangement for actuation along the second plane that is orthogonal to the second optical axis. For example, the second camera unit 1204*b* may be rectangular in plan, and the asymmetric optical image stabilization coil arrangement may include a first optical image stabilization coil 1228*b*, a second optical image stabilization coil 1230*b*, and a third optical image stabilization coil 1232*b*. The first optical image stabilization coil 1228*b* may be disposed proximate a first side 1234*b* of the second camera unit 1204*b*. In some examples, the first optical image stabilization coil 1228*b* may be a racetrack coil with a longitudinal axis that is substantially parallel to the first side 1234*b* of the second camera unit 1204*b*. The second optical image stabilization coil 1230*b* may be disposed proximate a second side 1236*b* of the second camera unit 1204*b*. In some examples, the second optical image stabilization coil 1230*b* may be a racetrack coil with a longitudinal axis that is substantially parallel to the second side 1236*b* of the second camera unit 1204*b*. The third optical image stabilization coil 1232*b* may be disposed proximate a third side 1238*b* of the second camera unit 1204*b*. The third side 1238*b* of the second camera unit 1204*b* may be opposite the second side 1236*b* of the second camera unit 1204*b*. In some examples, the third optical image stabilization coil 1232*b* may be a racetrack coil with a longitudinal axis that is substantially parallel to the third side 1238*b* of the second camera unit 1204*b*.

In some embodiments, no coils are disposed proximate a fourth side 1240*b* of the second camera unit 1204*b*. The fourth side 1240*b* of the second camera unit 1204*b* may be opposite the first side 1234*b* of the second camera unit 1204*b*.

In various embodiments, the second VCM actuator of the second camera unit 1204*b* may include one or more autofocus coils for actuation along the second optical axis. For instance, the autofocus coils of the second VCM actuator may include a first autofocus coil 1242*b* and a second autofocus coil 1244*b*. The first autofocus coil 1242*b* may be disposed proximate the second optical image stabilization coil 1230*b*. Additionally or alternatively, the first autofocus coil 1242*b* may be situated to a first side of the second optical package 1226b. In some examples, the first autofocus coil 1242b may be racetrack coil with a longitudinal axis that is substantially parallel to the second side 1236b of the second camera unit 1204b. In some embodiments, the first autofocus coil 1242b may have a lateral axis that is substantially perpendicular to a lateral axis of the second optical image stabilization coil 1230b. Likewise, the second autofocus coil 1244b may have a lateral axis that is substantially perpendicular to a lateral axis of the third optical image stabilization coil 1232b. Furthermore, the first autofocus coil 1242b may have a longitudinal axis that is substantially parallel to a longitudinal axis of the second optical image stabilization coil 1230b. Similarly, the second autofocus coil 1244b may have a longitudinal axis that is substantially parallel to a longitudinal axis of the third optical image stabilization coil 1232b.

FIG. 12C depicts an example embodiment of a camera system 1200c including a first camera unit 1202c and a second camera unit 1204c, according to some embodiments. In particular, FIG. 12C illustrates example magnet arrangements of the first camera unit 1202c and the second camera unit 1204c. The first camera unit 1202c and the second camera unit 1204c may include coils (e.g., the example coil arrangements illustrated in FIG. 12B) configured to magnetically interact with magnets of the example magnet arrangements.

The first camera unit 1202c may include a first VCM actuator configured to move a first optical package 1206c. For instance, the first VCM actuator may be configured to move the first optical package 1206c along a first optical axis and/or along a first plane that is orthogonal to the first optical axis. The first optical package 1206c may include one or more lenses that define the first optical axis.

In some embodiments, the first VCM actuator of the first camera unit 1202c may include a symmetric magnet arrangement. For example, the first camera unit may be rectangular in plan, and the symmetric magnet arrangement may include multiple magnets that are individually arranged to exhibit mirror symmetry about a respective plane that is angled, at a non-zero angle, with respect to at least one side of the first camera unit 1202c. In some examples, the symmetric magnet arrangement may include four magnets that are individually arranged to exhibit mirror symmetry about a respective plane that is angled, at a non-zero angle, with respect to at least one side of the first camera unit 1202c. For instance, in some embodiments, the magnets may be individually arranged to exhibit mirror symmetry about a respective plane that is angled at or about 45 degrees with respect to at least one side of the first camera unit 1202c.

In some examples, the first VCM actuator may include a first magnet 1208c, a second magnet 1210c, a third magnet 1212c, and a fourth magnet 1214c. The magnets 1208c-1214c may form the symmetric magnet arrangement. The first camera unit 1202c may be rectangular in plan, and the magnets 1208c-1214c may be individually arranged to exhibit mirror symmetry about a respective plane that is angled, at a non-zero angle, with respect to at least one side of the first camera unit 1202c. For instance, in some embodiments, the magnets 1208c-1214c may be individually arranged to exhibit mirror symmetry about a respective plane that is angled at or about 45 degrees with respect to at least one side of the first camera unit 1202c.

As illustrated in FIG. 12C, the magnets 1208c-1214c may be corner magnets. That is, the magnets 1208c-1214c may be individually disposed proximate a respective corner of the first camera unit 1202c. For example, the first magnet 1208c may be disposed proximate a first corner 1216c of the first camera unit 1202c, the second magnet 1210c may be disposed proximate a second corner 1218c of the first camera unit 1202c, the third magnet 1212c may be disposed proximate a third corner 1220c of the first camera unit 1202c, and/or the fourth magnet 1214c may be disposed proximate a fourth corner 1222c of the first camera unit 1202c.

In some embodiments, the first magnet 1208c, the second magnet 1210c, the third magnet 1212c, and/or the fourth magnet 1214c may each be a single pole magnet. In other embodiments, the first magnet 1208c, the second magnet 1210c, the third magnet 1212c, and/or the fourth magnet 1214c may each be a dual pole magnet. The arrows depicted in FIG. 12C indicate example polarity directions of the magnets.

The second camera unit 1204c may include a second VCM actuator configured to move a second optical package 1224c. For instance, the second VCM actuator may be configured to move the second optical package 1224c along a second optical axis and/or along a second plane that is orthogonal to the second optical axis. The second optical package 1224c may include one or more lenses that define the second optical axis.

In some embodiments, the second VCM actuator of the second camera unit 1204c may include an asymmetric magnet arrangement. For example, the second camera unit 1204c may be rectangular in plan, and the asymmetric magnet arrangement may include a first magnet 1226c (e.g., an actuator lateral magnet) disposed proximate a first side 1228c of the second camera unit 1204c, a second magnet 1230c (e.g., an actuator transverse magnet) disposed proximate a second side 1232c of the second camera unit 1204a, and a third magnet 1234c (e.g., an actuator transverse magnet) disposed proximate a third side 1236c of the second camera unit 1204c. The third side 1236c of the second camera unit 1204c may be opposite the second side 1232c of the second camera unit 1204c.

In some embodiments, no magnets are disposed proximate a fourth side 1238c of the second camera unit 1204c. The fourth side 1238c of the second camera unit 1204c may be opposite the first side 1228c of the second camera unit 1204c. In various examples, a dummy mass 1240c may be disposed proximate the fourth side 1238c of the second camera unit 1204c. The dummy mass 1240c may be configured to act as a counterbalance to the first magnet 1226c disposed proximate the first side 1228c of the second camera unit 1204c.

In some embodiments, the first magnet 1226c may be a single pole magnet. Furthermore, the second magnet 1230c and the third magnet 1234c may each be a dual pole magnet. The arrows depicted in FIG. 12C indicate example polarity directions of the magnets. It should be understood, however, that the magnets may have polarity directions that are different than those illustrated in FIG. 12C. Furthermore, in other embodiments, the first magnet 1226c may be a dual pole magnet, the second magnet 1230c may be a single pole magnet, and/or the third magnet 1234c may be a single pole magnet.

In some embodiments, the first camera unit 1202c may be disposed adjacent to the second camera unit 1204c. For example, the first camera unit 1202c and the second camera unit 1204c may each be rectangular in plan, and the first camera unit 1202c may be disposed adjacent to the second camera unit 1204c along a first axis 1242c that intersects a second axis 1244c. For instance, the second axis 1244c may extend through the first optical package 1206c of the first camera unit 1202c and the second optical package 1224c of the second camera unit 1204c. In some instances, the second axis 1244c may be substantially perpendicular to the first axis 1242c. The first side 1228c of the second camera unit 1228c may be distal to the first axis 1242c. Furthermore, the first magnet 1226c may have a longitudinal axis that is substantially parallel to the first axis 1242c. The fourth side 1238c may be proximal to the first axis 1242c. Furthermore, dummy mass 1240c may have a longitudinal axis that is substantially parallel to the first axis 1242c.

In some non-limiting examples, the first camera unit 1202c and the second camera unit 1204c may be configured such that magnetic interaction between the first camera unit 1202c and the second camera unit 1204c is mitigated. The first VCM actuator of the first camera unit 1202c may include one or more magnets that are disposed proximate the second VCM actuator of the second camera unit 1204c. For instance, in some embodiments, the second magnet 1210c and the third magnet 1212c of the second VCM actuator of the first camera unit 1202c may be disposed proximate the second camera unit 1204c, and thus may be considered as a first set of near magnets relative to the second camera unit 1204c. Similarly, the second VCM actuator of the second camera unit 1204c may include one or more magnets that are disposed proximate the first VCM actuator of the first camera unit 1202c. For instance, the second magnet 1230c and the third magnet 1234c of the second VCM actuator of the second camera unit 1204c may be disposed proximate the first camera unit 1202c, and thus may be considered as a second set of near magnets relative to the first camera unit 1202c.

In various embodiments, each magnet of the first set of near magnets of the first camera unit 1202c may be a single pole magnet, and each magnet of the second set of near magnets of the second camera unit 1204c may be a dual pole magnet. In some cases, such a configuration may mitigate magnetic interaction between the first camera unit 1202c and the second camera unit 1204c. That is, by configuring the first camera unit 1202c and the second camera unit 1204c such that single pole magnets of the first camera unit 1202c and dual pole magnets of the second camera unit 1204c are nearest each other, the magnetic interaction between the camera units 1202c and 1204c may be mitigated relative to some other configurations (e.g, the example magnet arrangement 1300a illustrated in FIG. 13A). The mitigated magnetic interaction may be due to the particular shapes and extensions of the magnetic fields of the single pole magnets and the dual pole magnets, as discussed in further detail below with reference to FIGS. 13A and 13B.

Figure 13A:
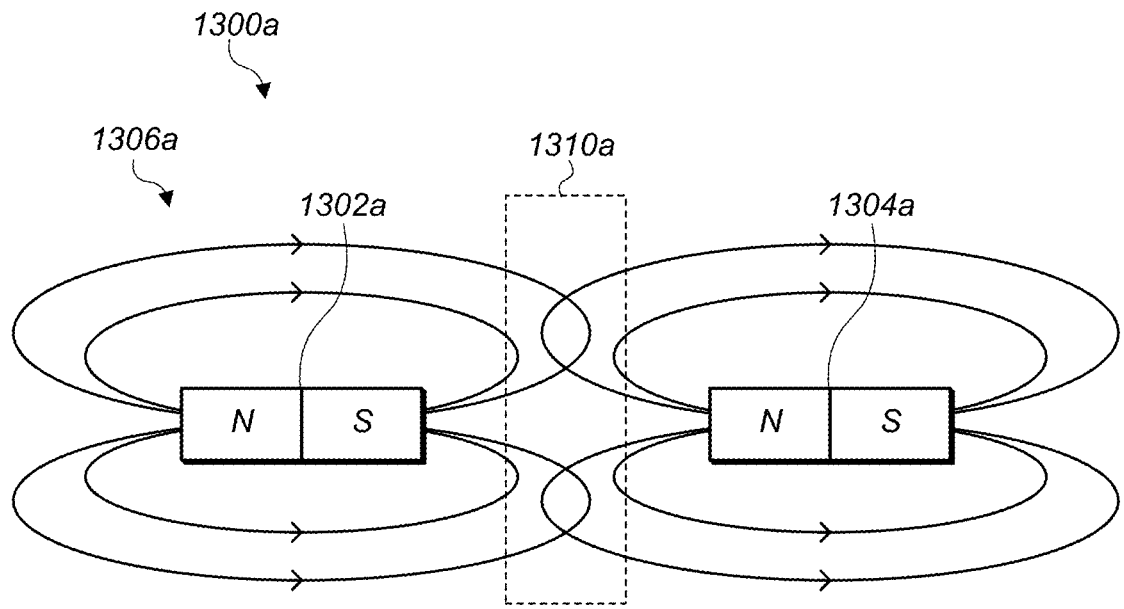
FIG. 13A depicts an example magnet arrangement that includes a first single pole magnet adjacent to a second single pole magnet.
Figure 13B:
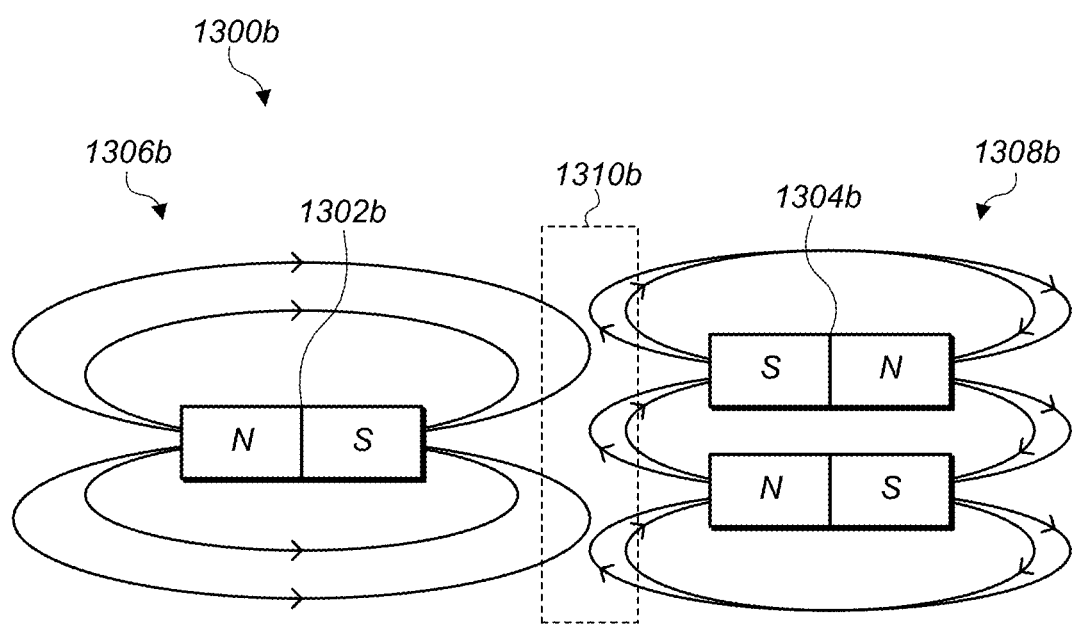
FIG. 13B depicts an example magnet arrangement that includes a single pole magnet adjacent to a dual pole magnet.

FIG. 13A depicts an example magnet arrangement that includes a first single pole magnet adjacent to a second single pole magnet. FIG. 13B depicts an example magnet arrangement that includes a single pole magnet adjacent to a dual pole magnet. FIGS. 13A and 13B illustrate a difference in amount of magnetic interaction between the single pole-single pole magnet arrangement of FIG. 13A and the single pole-dual pole magnet arrangement of FIG. 13B. In some examples, the single pole-dual pole magnet arrangement of FIG. 13B is illustrative of mitigated magnetic interaction between the first camera unit 1202c and the second camera unit 1204c described above with reference to FIG. 12C.

As illustrated in FIG. 13A, the example magnet arrangement 1300a includes a first single pole magnet 1302a and a second single pole magnet 1304a. The first single pole magnet 1302a is adjacent to the second single pole magnet 1304a. The first single pole magnet 1302a may have a first magnetic field 1306a. The second single pole magnet 1304a may have a second magnetic field 1308a. The first magnetic field 1306a may extend away from the first single pole magnet 1302a, and the second magnetic field 1308a may extend away from the second single pole magnet 1304a. For example, the first magnetic field 1306a of the first single pole magnet 1306a may extend toward the second single pole magnet 1304a and the second magnetic field 1308a may extend toward the first single pole magnet 1302a such that the first magnetic field 1306a and the second magnetic field 1308a interact, as indicated by the overlapping magnetic field lines within the dashed line rectangle 1310a.

As illustrated in FIG. 13B, the example magnet arrangement 1300b includes a single pole magnet 1302b and a dual pole magnet 1304b. The single pole magnet 1302b is adjacent to the dual pole magnet 1304b. The single pole magnet 1302b may have a first magnetic field 1306b. The dual pole magnet 1304b may have a second magnetic field 1308b. Due to the respective polarity configurations of the single pole magnet 1302b and the dual pole magnet 1304b, the first magnetic field 1306b may extend away from the single pole magnet 1302b to a greater extent than the second magnetic field 1308b extends away from dual pole magnet 1304b. The tightness of the extension of the second magnetic field 1308b with respect to the dual pole magnet 1304b may mitigate interaction between the second magnetic field 1308b of the dual pole magnet 1304b and the first magnetic field 1306b of the single pole magnet 1302b, e.g., as indicated by the magnetic field lines not overlapping within the dashed line rectangle 1310b. In some examples, the single pole-dual pole magnet arrangement of FIG. 13B is illustrative of mitigated magnetic interaction between the first camera unit 1202c and the second camera unit 1204c described above with reference to FIG. 12C.

Figure 14A:
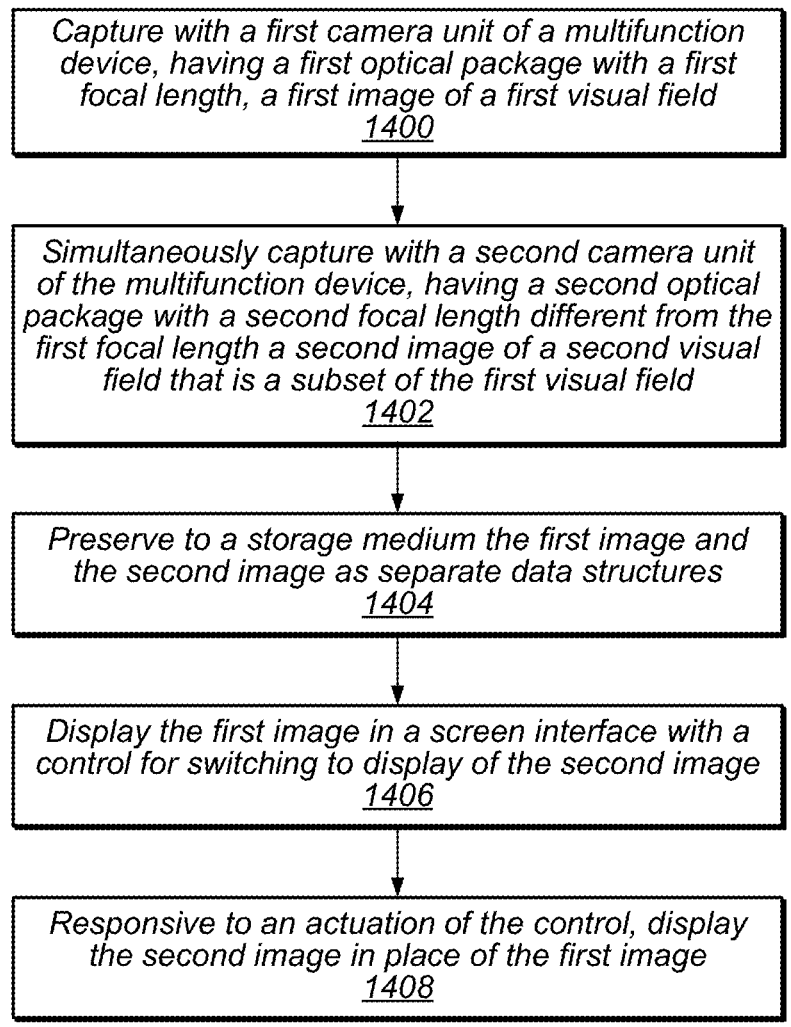
FIG. 14A is a flow chart of a method usable in a multiple camera system for portable zoom, according to at least some embodiments.

FIG. 14A is a flow chart of an example method usable in a multiple camera system for portable zoom, according to at least some embodiments. For instance, the example method may be used in connection with one or more of the embodiments described herein with reference to FIGS. 1A-13B and 15-17. In some embodiments, a first camera unit of a multifunction device, having a first optical package with a first focal length, captures a first image of a first visual field (block 1400). A second camera unit of the multifunction device, having a second optical package with a second focal length different from the first focal length simultaneously captures a second image of a second visual field that is a subset of the first visual field (block 1402). The first image and the second image are preserved to a storage medium as separate data structures (block 1404). The first image is displayed in a screen interface with a control for switching to display of the second image (block 1406). Responsive to an actuation of the control, the second image is displayed in place of the first image (block 1408).

Figure 14B:
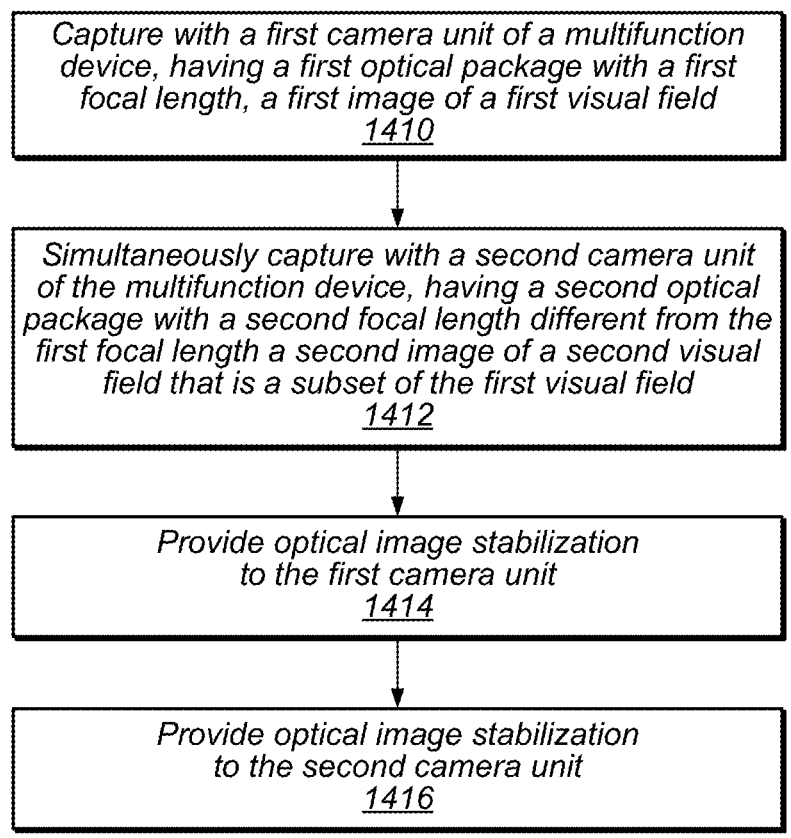
FIG. 14B is a flow chart of a method usable in a multiple camera system for portable zoom, according to at least some embodiments.

FIG. 14B is a flow chart of an example method usable in a multiple camera system for portable zoom, according to at least some embodiments. For instance, the example method may be used in connection with one or more of the embodiments described herein with reference to FIGS. 1A-13B and 15-17. In some embodiments, a first camera unit of a multifunction device, having a first optical package with a first focal length, captures a first image of a first visual field (block 1410). A second camera unit of the multifunction device, having a second optical package with a second focal length different from the first focal length simultaneously captures a second image of a second visual field that is a subset of the first visual field (block 1412). Optical image stabilization is provided to the first camera unit (block 1414). Optical image stabilization is provided to the second camera unit (block 1416).

Multifunction Device Examples

Embodiments of electronic devices, user interfaces for such devices, and associated processes for using such devices are described. In some embodiments, the device is a portable communications device, such as a mobile telephone, that also contains other functions, such as PDA and/or music player functions. Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 15:
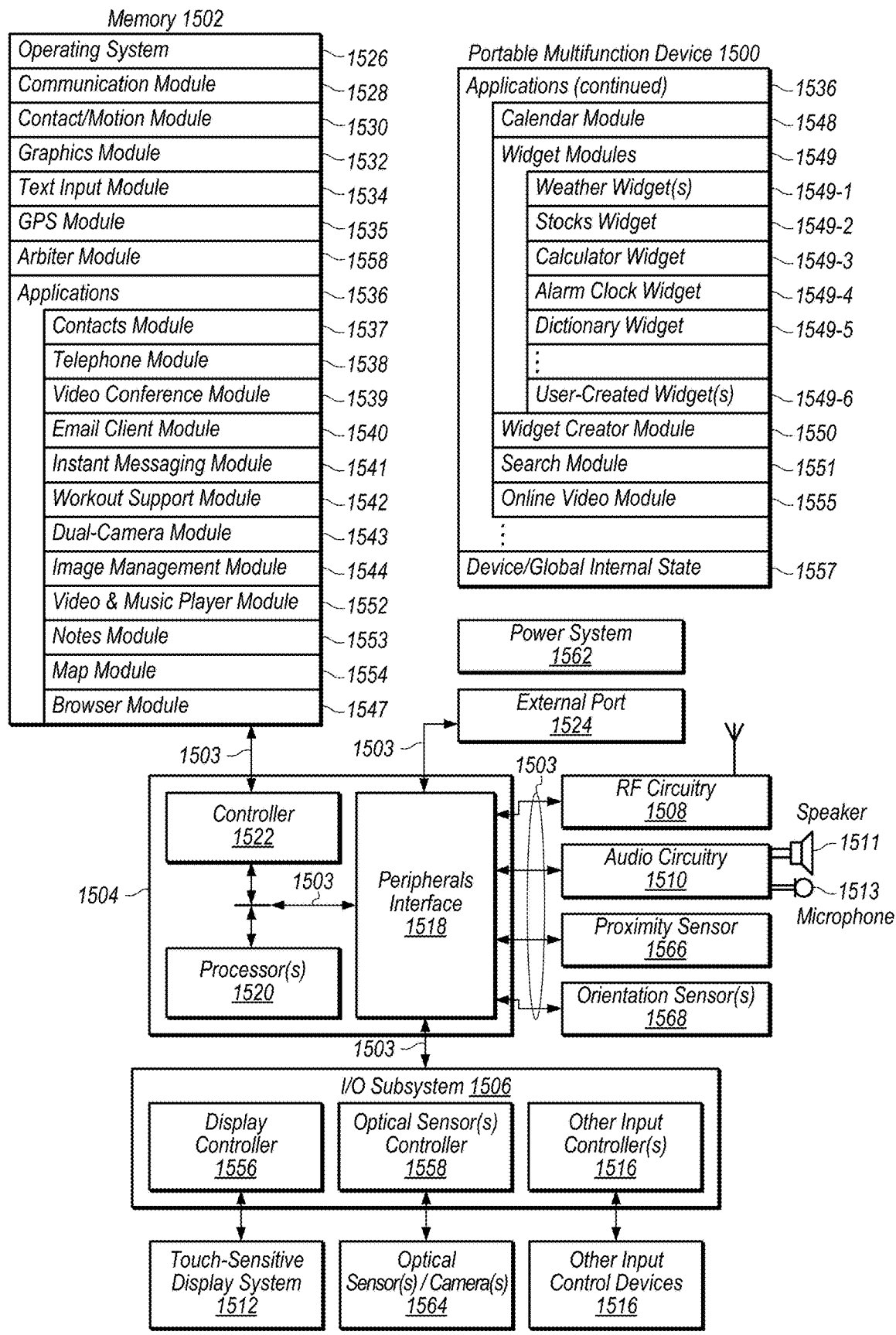
FIG. 15 illustrates a block diagram of a portable multifunction device with a camera, according to some embodiments.

Attention is now directed toward embodiments of portable devices with cameras. FIG. 15 is a block diagram illustrating portable multifunction device 1500 with cameras 1564*a-b* in accordance with some embodiments. Cameras 1564*a-b* are sometimes called "optical sensors" for convenience, and may also be known as or called an optical sensor system. Device 1500 may include memory 1502 (which may include one or more computer readable storage mediums), memory controller 1522, one or more processing units (CPU's) 1520, peripherals interface 1518, RF circuitry 1508, audio circuitry 1510, speaker 1511, touch-sensitive display system 1512, microphone 1513, input/output (I/O) subsystem 1506, other input or control devices 1516, and external port 1524. Device 1500 may include optical sensors 1564*a-b*. These components may communicate over one or more communication buses or signal lines 1503.

It should be appreciated that device 1500 is only one example of a portable multifunction device, and that device 1500 may have more or fewer components than shown, may combine two or more components, or may have a different configuration or arrangement of the components. The various components shown in various of the figures may be implemented in hardware, software, or a combination of hardware and software, including one or more signal processing and/or application specific integrated circuits.

Memory 1502 may include high-speed random access memory and may also include non-volatile memory, such as one or more magnetic disk storage devices, flash memory devices, or other non-volatile solid-state memory devices. Access to memory 1502 by other components of device 1500, such as CPU 1520 and the peripherals interface 1518, may be controlled by memory controller 1522.

Peripherals interface 1518 can be used to couple input and output peripherals of the device to CPU 1520 and memory 1502. The one or more processors 1520 run or execute various software programs and/or sets of instructions stored in memory 1502 to perform various functions for device 1500 and to process data.

In some embodiments, peripherals interface 1518, CPU 1520, and memory controller 1522 may be implemented on a single chip, such as chip 1504. In some other embodiments, they may be implemented on separate chips.

RF (radio frequency) circuitry 1508 receives and sends RF signals, also called electromagnetic signals. RF circuitry 1508 converts electrical signals to/from electromagnetic signals and communicates with communications networks and other communications devices via the electromagnetic signals. RF circuitry 1508 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1508 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1510, speaker 1511, and microphone 1513 provide an audio interface between a user and device 1500. Audio circuitry 1510 receives audio data from peripherals interface 1518, converts the audio data to an electrical signal, and transmits the electrical signal to speaker 1511. Speaker 1511 converts the electrical signal to human-audible sound waves. Audio circuitry 1510 also receives electrical signals converted by microphone 1513 from sound waves. Audio circuitry 1510 converts the electrical signal to audio data and transmits the audio data to peripherals interface

1518 for processing. Audio data may be retrieved from and/or transmitted to memory 1502 and/or RF circuitry 1508 by peripherals interface 1518. In some embodiments, audio circuitry 1510 also includes a headset jack (e.g., 1612, FIG. 16). The headset jack provides an interface between audio circuitry 1510 and removable audio input/output peripherals, such as output-only headphones or a headset with both output (e.g., a headphone for one or both ears) and input (e.g., a microphone).

I/O subsystem 1506 couples input/output peripherals on device 1500, such as touch screen 1512 and other input control devices 1516, to peripherals interface 1518. I/O subsystem 1506 may include display controller 1556 and one or more input controllers 1560 for other input or control devices. The one or more input controllers 1560 receive/send electrical signals from/to other input or control devices 1516. The other input control devices 1516 may include physical buttons (e.g., push buttons, rocker buttons, etc.), dials, slider switches, joysticks, click wheels, and so forth. In some alternate embodiments, input controller(s) 1560 may be coupled to any (or none) of the following: a keyboard, infrared port, USB port, and a pointer device such as a mouse. The one or more buttons (e.g., 1608, FIG. 16) may include an up/down button for volume control of speaker 1511 and/or microphone 1513. The one or more buttons may include a push button (e.g., 1606, FIG. 16).

Touch-sensitive display 1512 provides an input interface and an output interface between the device and a user. Display controller 1556 receives and/or sends electrical signals from/to touch screen 1512. Touch screen 1512 displays visual output to the user. The visual output may include graphics, text, icons, video, and any combination thereof (collectively termed "graphics"). In some embodiments, some or all of the visual output may correspond to user-interface objects.

Touch screen 1512 has a touch-sensitive surface, sensor or set of sensors that accepts input from the user based on haptic and/or tactile contact. Touch screen 1512 and display controller 1556 (along with any associated modules and/or sets of instructions in memory 1502) detect contact (and any movement or breaking of the contact) on touch screen 1512 and converts the detected contact into interaction with user-interface objects (e.g., one or more soft keys, icons, web pages or images) that are displayed on touch screen 1512. In an example embodiment, a point of contact between touch screen 1512 and the user corresponds to a finger of the user.

Touch screen 1512 may use LCD (liquid crystal display) technology, LPD (light emitting polymer display) technology, or LED (light emitting diode) technology, although other display technologies may be used in other embodiments. Touch screen 1512 and display controller 1556 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 1512. In an example embodiment, projected mutual capacitance sensing technology is used, such as that found in the iPhone®, iPod Touch®, and iPad® from Apple Inc. of Cupertino, Calif.

Touch screen 1512 may have a video resolution in excess of 100 dpi. In some embodiments, the touch screen has a video resolution of approximately 160 dpi. The user may make contact with touch screen 1512 using any suitable object or appendage, such as a stylus, a finger, and so forth.

In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions calculated by the user.

In some embodiments, in addition to the touch screen, device 1500 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1512 or an extension of the touch-sensitive surface formed by the touch screen.

Device 1500 also includes power system 1562 for powering the various components. Power system 1562 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1500 may also include optical sensors or cameras 1564a-b. Optical sensors 1564a-b may include charge-coupled device (CCD) or complementary metal-oxide semiconductor (CMOS) phototransistors. Optical sensors 1564a-b receive light from the environment, projected through one or more lens, and converts the light to data representing an image. In conjunction with imaging module 1543 (also called a camera module), optical sensors 1564a-b may capture still images or video. In some embodiments, an optical sensor is located on the back of device 1500, opposite touch screen display 1512 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display. In embodiments in which multiple cameras or optical sensors 1564a-b are supported, each of the multiple cameras or optical sensors 1564a-b may include its own photo sensor(s), or the multiple cameras or optical sensors 1564a-b may be supported by a shared photo sensor. Likewise, in embodiments in which multiple cameras or optical sensors 1564a-b are supported, each of the multiple cameras or optical sensors 1564a-b may include its own image processing pipeline of processors and storage units, or the multiple cameras or optical sensors 1564a-b may be supported by an image processing pipeline of processors and storage units.

Device 1500 may also include one or more proximity sensors 1566. FIG. 15 shows proximity sensor 1566 coupled to peripherals interface 1518. Alternately, proximity sensor 1566 may be coupled to input controller 1560 in I/O subsystem 1506. In some embodiments, the proximity sensor turns off and disables touch screen 1512 when the multifunction device is placed near the user's ear (e.g., when the user is making a phone call).

Device 1500 includes one or more orientation sensors 1568. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1500. In some embodiments, the one or more orientation sensors include any combination of orientation/rotation sensors. FIG. 15 shows the one or more orientation sensors 1568 coupled to peripherals interface 1518. Alternately, the one or more orientation sensors 1568 may be coupled to an input controller 1560 in I/O subsystem 1506. In some embodiments, information is displayed on the touch screen display in a portrait view or a landscape view based on an analysis of data received from the one or more orientation sensors.

In some embodiments, the software components stored in memory 1502 include operating system 1526, communication module (or set of instructions) 1528, contact/motion module (or set of instructions) 1530, graphics module (or set of instructions) 1532, text input module (or set of instructions) 1534, Global Positioning System (GPS) module (or set of instructions) 1535, arbiter module 1557 and applications (or sets of instructions) 1536. Furthermore, in some embodiments memory 1502 stores device/global internal state 1557. Device/global internal state 1557 includes one or more of: active application state, indicating which applications, if any, are currently active; display state, indicating what applications, views or other information occupy various regions of touch screen display 1512; sensor state, including information obtained from the device's various sensors and input control devices 1516; and location information concerning the device's location and/or attitude.

Operating system 1526 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1528 facilitates communication with other devices over one or more external ports 1524 and also includes various software components for handling data received by RF circuitry 1508 and/or external port 1524. External port 1524 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 1530 may detect contact with touch screen 1512 (in conjunction with display controller 1556) and other touch sensitive devices (e.g., a touchpad or physical click wheel). Contact/motion module 1530 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1530 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 1530 and display controller 1556 detect contact on a touchpad.

Contact/motion module 1530 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1532 includes various known software components for rendering and displaying graphics on touch screen 1512 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1532 stores data representing graphics to be used. Each graphic may be assigned a corresponding code. Graphics module 1532 receives, from applications etc., one or more codes specifying graphics to be displayed along with, if necessary, coordinate data and other graphic property data, and then generates screen image data to output to display controller 1556.

Text input module 1534, which may be a component of graphics module 1532, provides soft keyboards for entering text in various applications (e.g., contacts 1537, e-mail 1540, IM 1541, browser 1547, and any other application that needs text input).

GPS module 1535 determines the location of the device and provides this information for use in various applications (e.g., to telephone 1538 for use in location-based dialing, to camera 1543 as picture/video metadata, and to applications that provide location-based services such as weather widgets, local yellow page widgets, and map/navigation widgets).

Applications 1536 may include the following modules (or sets of instructions), or a subset or superset thereof:
  contacts module 1537 (sometimes called an address book or contact list);
  telephone module 1538;
  video conferencing module 1539;
  e-mail client module 1540;
  instant messaging (IM) module 1541;
  workout support module 1542;
  dual camera module 1543 for still and/or video images;
  image management module 1544;
  browser module 1547;
  calendar module 1548;
  widget modules 1549, which may include one or more of: weather widget 1549-1, stocks widget 1549-2, calculator widget 1549-3, alarm clock widget 1549-4, dictionary widget 1549-5, and other widgets obtained by the user, as well as user-created widgets 1549-6;

widget creator module 1550 for making user-created widgets 1549-6;

search module 1551;

video and music player module 1552, which may be made up of a video player module and a music player module;

notes module 1553;

map module 1554; and/or online video module 1555.

Examples of other applications 1536 that may be stored in memory 1502 include other word processing applications, other image editing applications, drawing applications, presentation applications, JAVA-enabled applications, encryption, digital rights management, voice recognition, and voice replication.

In conjunction with touch screen 1512, display controller 1556, contact module 1530, graphics module 1532, and text input module 1534, contacts module 1537 may be used to manage an address book or contact list (e.g., stored in application internal state of contacts module 1537 in memory 1502), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1538, video conference 1539, e-mail 1540, or IM 1541; and so forth.

In conjunction with RF circuitry 1508, audio circuitry 1510, speaker 1511, microphone 1513, touch screen 1512, display controller 1556, contact module 1530, graphics module 1532, and text input module 1534, telephone module 1538 may be used to enter a sequence of characters corresponding to a telephone number, access one or more telephone numbers in address book 1537, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 1508, audio circuitry 1510, speaker 1511, microphone 1513, touch screen 1512, display controller 1556, optical sensors 1564*a-b*, optical sensor controller 1558, contact module 1530, graphics module 1532, text input module 1534, contact list 1537, and telephone module 1538, videoconferencing module 1539 includes executable instructions to initiate, conduct, and terminate a video conference between a user and one or more other participants in accordance with user instructions.

In conjunction with RF circuitry 1508, touch screen 1512, display controller 1556, contact module 1530, graphics module 1532, and text input module 1534, e-mail client module 1540 includes executable instructions to create, send, receive, and manage e-mail in response to user instructions. In conjunction with image management module 1544, e-mail client module 1540 makes it very easy to create and send e-mails with still or video images taken with dual camera module 1543.

In conjunction with RF circuitry 1508, touch screen 1512, display controller 1556, contact module 1530, graphics module 1532, and text input module 1534, the instant messaging module 1541 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 1508, touch screen 1512, display controller 1556, contact module 1530, graphics module 1532, text input module 1534, GPS module 1535, map module 1554, and music player module 1546, workout support module 1542 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 1512, display controller 1556, optical sensor(s) 1564, optical sensor controller 1558, contact module 1530, graphics module 1532, and image management module 1544, dual camera module 1543 includes executable instructions to capture still images or video (including a video stream) and store them into memory 1502, modify characteristics of a still image or video, or delete a still image or video from memory 1502.

In conjunction with touch screen 1512, display controller 1556, contact module 1530, graphics module 1532, text input module 1534, and dual camera module 1543, image management module 1544 includes executable instructions to arrange, modify (e.g., edit), or otherwise manipulate, label, delete, present (e.g., in a digital slide show or album), and store still and/or video images.

In conjunction with RF circuitry 1508, touch screen 1512, display system controller 1556, contact module 1530, graphics module 1532, and text input module 1534, browser module 1547 includes executable instructions to browse the Internet in accordance with user instructions, including searching, linking to, receiving, and displaying web pages or portions thereof, as well as attachments and other files linked to web pages.

In conjunction with RF circuitry 1508, touch screen 1512, display system controller 1556, contact module 1530, graphics module 1532, text input module 1534, e-mail client module 1540, and browser module 1547, calendar module 1548 includes executable instructions to create, display, modify, and store calendars and data associated with calendars (e.g., calendar entries, to do lists, etc.) in accordance with user instructions.

In conjunction with RF circuitry 1508, touch screen 1512, display system controller 1556, contact module 1530, graphics module 1532, text input module 1534, and browser module 1547, widget modules 1549 are mini-applications that may be downloaded and used by a user (e.g., weather widget 1549-1, stocks widget 1549-2, calculator widget 15493, alarm clock widget 1549-4, and dictionary widget 1549-5) or created by the user (e.g., user-created widget 1549-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 1508, touch screen 1512, display system controller 1556, contact module 1530, graphics module 1532, text input module 1534, and browser module 1547, the widget creator module 1550 may be used by a user to create widgets (e.g., turning a user-specified portion of a web page into a widget).

In conjunction with touch screen 1512, display system controller 1556, contact module 1530, graphics module 1532, and text input module 1534, search module 1551 includes executable instructions to search for text, music, sound, image, video, and/or other files in memory 1502 that match one or more search criteria (e.g., one or more user-specified search terms) in accordance with user instructions.

In conjunction with touch screen 1512, display system controller 1556, contact module 1530, graphics module 1532, audio circuitry 1510, speaker 1511, RF circuitry 1508, and browser module 1547, video and music player module 1552 includes executable instructions that allow the user to download and play back recorded music and other sound files stored in one or more file formats, such as MP3 or AAC files, and executable instructions to display, present or otherwise play back videos (e.g., on touch screen 1512 or on an external, connected display via external port 1524). In some embodiments, device 1500 may include the functionality of an MP3 player, such as an iPod (trademark of Apple Inc.).

In conjunction with touch screen 1512, display controller 1556, contact module 1530, graphics module 1532, and text input module 1534, notes module 1553 includes executable instructions to create and manage notes, to do lists, and the like in accordance with user instructions.

In conjunction with RF circuitry 1508, touch screen 1512, display system controller 1556, contact module 1530, graphics module 1532, text input module 1534, GPS module 1535, and browser module 1547, map module 1554 may be used to receive, display, modify, and store maps and data associated with maps (e.g., driving directions; data on stores and other points of interest at or near a particular location; and other location-based data) in accordance with user instructions.

In conjunction with touch screen 1512, display system controller 1556, contact module 1530, graphics module 1532, audio circuitry 1510, speaker 1511, RF circuitry 1508, text input module 1534, e-mail client module 1540, and browser module 1547, online video module 1555 includes instructions that allow the user to access, browse, receive (e.g., by streaming and/or download), play back (e.g., on the touch screen or on an external, connected display via external port 1524), send an e-mail with a link to a particular online video, and otherwise manage online videos in one or more file formats, such as H.264. In some embodiments, instant messaging module 1541, rather than e-mail client module 1540, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 1502 may store a subset of the modules and data structures identified above. Furthermore, memory 1502 may store additional modules and data structures not described above.

In some embodiments, device 1500 is a device where operation of a predefined set of functions on the device is performed exclusively through a touch screen and/or a touchpad. By using a touch screen and/or a touchpad as the primary input control device for operation of device 1500, the number of physical input control devices (such as push buttons, dials, and the like) on device 1500 may be reduced.

The predefined set of functions that may be performed exclusively through a touch screen and/or a touchpad include navigation between user interfaces. In some embodiments, the touchpad, when touched by the user, navigates device 1500 to a main, home, or root menu from any user interface that may be displayed on device 1500. In such embodiments, the touchpad may be referred to as a "menu button." In some other embodiments, the menu button may be a physical push button or other physical input control device instead of a touchpad.

Figure 16:
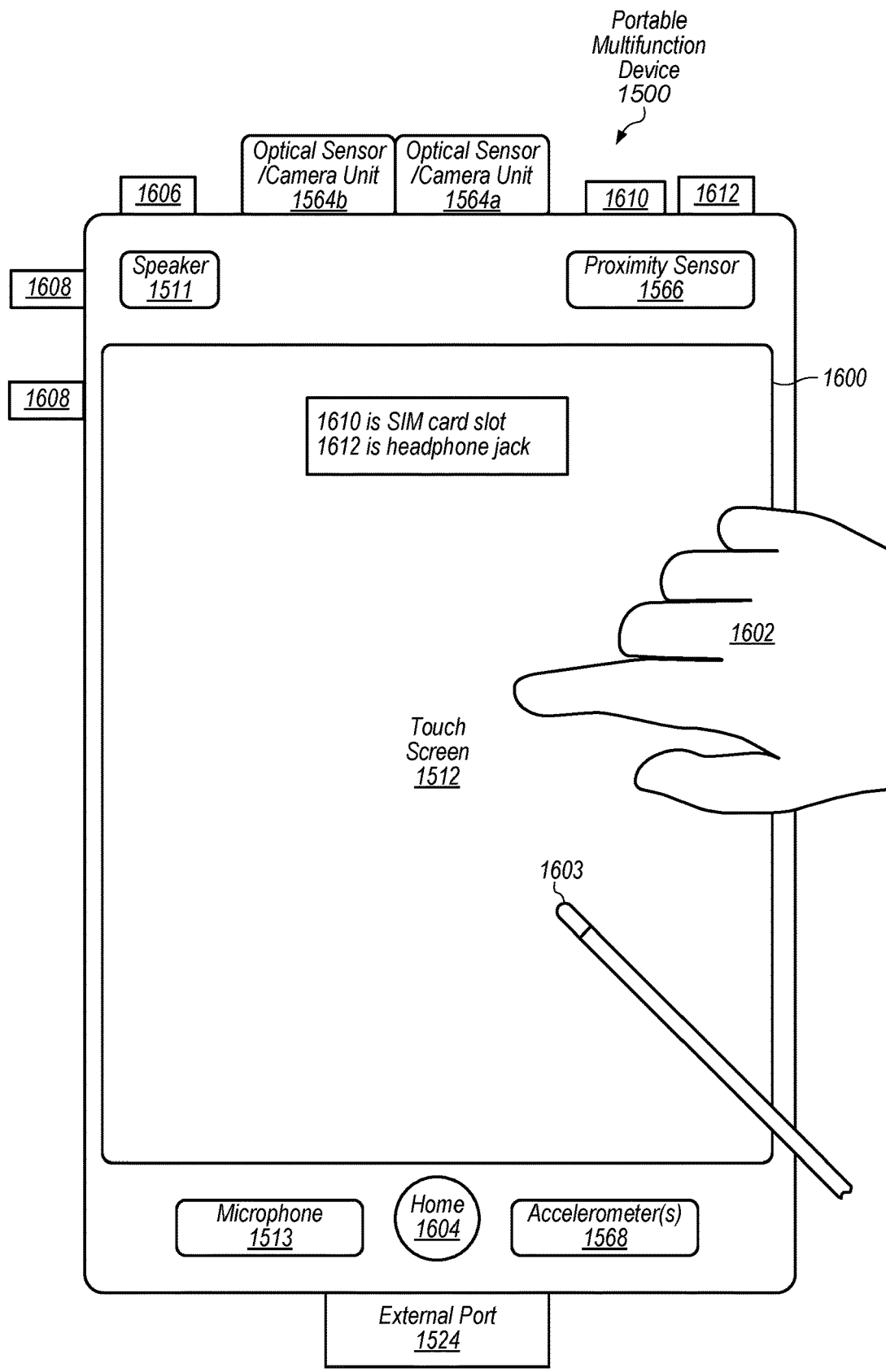
FIG. 16 depicts a portable multifunction device having a camera, according to some embodiments.

FIG. 16 illustrates a portable multifunction device 1500 having a touch screen 1512 in accordance with some embodiments. The touch screen may display one or more graphics within user interface (UI) 1600. In this embodiment, as well as others described below, a user may select one or more of the graphics by making a gesture on the graphics, for example, with one or more fingers 1602 (not drawn to scale in the figure) or one or more styluses 1603 (not drawn to scale in the figure).

Device 1500 may also include one or more physical buttons, such as "home" or menu button 1604. As described previously, menu button 1604 may be used to navigate to any application 1536 in a set of applications that may be executed on device 1500. Alternatively, in some embodiments, the menu button is implemented as a soft key in a GUI displayed on touch screen 1512.

In one embodiment, device 1500 includes touch screen 1512, menu button 1604, push button 1606 for powering the device on/off and locking the device, volume adjustment button(s) 1608, Subscriber Identity Module (SIM) card slot 1610, head set jack 1612, and docking/charging external port 1524. Push button 1606 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1500 also may accept verbal input for activation or deactivation of some functions through microphone 1513.

It should be noted that, although many of the examples herein are given with reference to optical sensors/cameras 1564*a-b* (on the front of a device), a rear-facing camera or optical sensor that is pointed opposite from the display may be used instead of or in addition to an optical sensors/cameras 1564*a-b* on the front of a device.

Example Computer System

Figure 17:
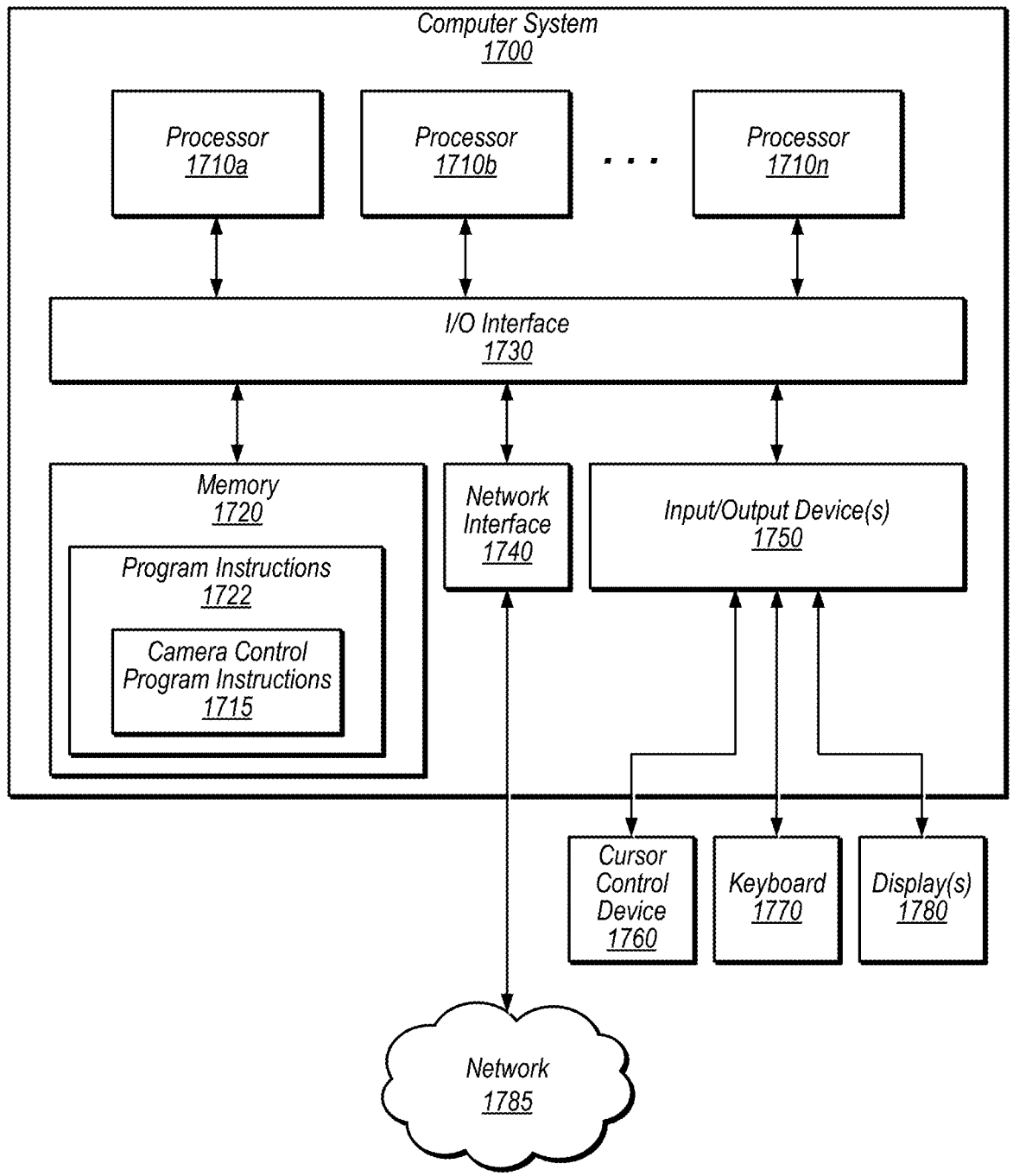
FIG. 17 illustrates an example computer system having a camera, according to some embodiments.

FIG. 17 illustrates an example computer system 1700 that may be configured to execute any or all of the embodiments described above. In different embodiments, computer system 1700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a dual-prime camera system as described herein, including embodiments of single frame camera active optical tilt alignment correction, as described herein may be executed in one or more computer systems 1700, which may interact with various other devices. Note that any component, action, or functionality described above with respect to FIGS. 1-16 may be implemented on one or more computers configured as computer system 1700 of FIG. 17, according to various embodiments. In the illustrated embodiment, computer system 1700 includes one or more processors 1710 coupled to a system memory 1720 via an input/output (I/O) interface 1730. Computer system 1700 further includes a network interface 1740 coupled to I/O interface 1730, and one or more input/output devices 1750, such as cursor control device 1760, keyboard 1770, and display(s) 1780. In some cases, it is contemplated that embodiments may be implemented using a single instance of computer system 1700, while in other embodiments multiple such systems, or multiple nodes making up computer system 1700, may be configured to host different portions or instances of embodiments. For example, in one embodiment some elements may be implemented via one or more nodes of computer system 1700 that are distinct from those nodes implementing other elements.

In various embodiments, computer system 1700 may be a uniprocessor system including one processor 1710, or a multiprocessor system including several processors 1710 (e.g., two, four, eight, or another suitable number). Processors 1710 may be any suitable processor capable of executing instructions. For example, in various embodiments processors 1710 may be general-purpose or embedded processors implementing any of a variety of instruction set architectures (ISAs), such as the x86, PowerPC, SPARC, or MIPS ISAs, or any other suitable ISA. In multiprocessor systems, each of processors 1710 may commonly, but not necessarily, implement the same ISA.

System memory 1720 may be configured to store camera control program instructions 1722 and/or camera control data accessible by processor 1710. In various embodiments, system memory 1720 may be implemented using any suitable memory technology, such as static random access memory (SRAM), synchronous dynamic RAM (SDRAM), nonvolatile/Flash-type memory, or any other type of memory. In the illustrated embodiment, program instructions 1722 may be configured to implement a lens control application 1724 incorporating any of the functionality described above. Additionally, existing camera control data 1732 of memory 1720 may include any of the information or data structures described above. In some embodiments, program instructions and/or data may be received, sent or stored upon different types of computer-accessible media or on similar media separate from system memory 1720 or computer system 1700. While computer system 1700 is described as implementing the functionality of functional blocks of previous Figures, any of the functionality described herein may be implemented via such a computer system.

In one embodiment, I/O interface 1730 may be configured to coordinate I/O traffic between processor 1710, system memory 1720, and any peripheral devices in the device, including network interface 1740 or other peripheral interfaces, such as input/output devices 1750. In some embodiments, I/O interface 1730 may perform any necessary protocol, timing or other data transformations to convert data signals from one component (e.g., system memory 1720) into a format suitable for use by another component (e.g., processor 1710). In some embodiments, I/O interface 1730 may include support for devices attached through various types of peripheral buses, such as a variant of the Peripheral Component Interconnect (PCI) bus standard or the Universal Serial Bus (USB) standard, for example. In some embodiments, the function of I/O interface 1730 may be split into two or more separate components, such as a north bridge and a south bridge, for example. Also, in some embodiments some or all of the functionality of I/O interface 1730, such as an interface to system memory 1720, may be incorporated directly into processor 1710.

Network interface 1740 may be configured to allow data to be exchanged between computer system 1700 and other devices attached to a network 1785 (e.g., carrier or agent devices) or between nodes of computer system 1700. Network 1785 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1750 may, in some embodiments, include one or more display terminals, keyboards, keypads, touchpads, scanning devices, voice or optical recognition devices, or any other devices suitable for entering or accessing data by one or more computer systems 1700. Multiple input/output devices 1750 may be present in computer system 1700 or may be distributed on various nodes of computer system 1700. In some embodiments, similar input/output devices may be separate from computer system 1700 and may interact with one or more nodes of computer system 1700 through a wired or wireless connection, such as over network interface 1740.

As shown in FIG. 17, memory 1720 may include program instructions 1722, which may be processor-executable to implement any element or action described above. In one embodiment, the program instructions may implement the methods described above. In other embodiments, different elements and data may be included. Note that data may include any data or information described above.

Those skilled in the art will appreciate that computer system 1700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1700 may be transmitted to computer system 1700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations.

Additional descriptions of embodiments:

CLAUSE 1: A camera system of a multifunction device, including: a first camera unit of a multifunction device for capturing a first image of a first visual field, wherein the first camera unit includes a first actuator for moving a first optical package configured for a first focal length; and a second camera unit of the multifunction device for simultaneously capturing a second image of a second visual field, wherein the second camera unit includes a second actuator for moving a second optical package configured for a second focal length; and the second actuator includes a second actuator lateral magnet; the first optical package and the second optical package are situated between the first actuator later magnet and the second actuator lateral magnet along an axis between the first actuator lateral magnet and the second actuator lateral magnet; no actuator lateral magnets are situated between the first optical package and the second optical package along the axis.

CLAUSE 2: The camera system of clause 1, wherein the first actuator lateral magnet and the second actuator lateral magnet have polarities aligned antiparallel to one another.

CLAUSE 3: The camera system of any of clauses 1-2, wherein the first camera unit and the second camera unit each include a respective first pair of first actuator transverse magnets situated opposite one another with respect to the axis between the first actuator lateral magnet and the second actuator lateral magnet; and the first camera unit and the second camera unit each include a respective second pair of first actuator transverse magnets situated opposite one another with respect to the axis between the first actuator lateral magnet and the second actuator lateral magnet.

CLAUSE 4: The camera system of clause 3, wherein the magnets of the respective first pair of first actuator transverse magnets have polarity alignments parallel to the respective alignments of corresponding respective magnets of the first pair of second actuator transverse magnets.

CLAUSE 5: The camera system of clause 3, wherein the magnets of the respective first pair of first actuator transverse magnets have polarity alignments antiparallel to the respective alignments of corresponding respective magnets of the first pair of second actuator transverse magnets.

CLAUSE 6: The camera system of clause 5, wherein the first actuator lateral magnet and the second actuator lateral magnet have polarities aligned at right angles to polarities of the respective first pair of first actuator transverse magnets.

CLAUSE 7: The camera system of any of clauses 1-6, further including:
coils aligned with current circulating in a plane parallel to a plane in which the first actuator lateral magnet and the second actuator lateral magnet have polarities aligned.

CLAUSE 8: A camera unit of a multifunction device, including: an optical package; an actuator for moving the optical package to a first focal length, wherein the actuator includes: a lateral magnet to one side of the optical package, a first pair of first actuator transverse magnets situated on sides opposite one another with respect to an axis between the optical package and the lateral magnet, wherein the lateral magnet is situated one on one side of the optical package at which no transverse magnets are present; and wherein no actuator lateral magnet is situated on a remaining side of the optical package at which nether the lateral magnet nor the transverse magnets are situated.

CLAUSE 9: The camera unit of clause 8, further including: coils aligned with current circulating in a plane parallel to a plane in which the lateral magnet and the transverse magnets have polarities aligned.

CLAUSE 10: The camera unit of any of clauses 8-9, further including: coils aligned with current circulating in a plane perpendicular to a plane in which the lateral magnet and the transverse magnets have polarities aligned.

CLAUSE 11: The camera unit of any of clauses 8-10, further including: a second pair of first actuator transverse magnets situated opposite one another with respect to the axis between the lateral magnet and the optical package.

CLAUSE 12: The camera unit of clause 11, further including: the magnets of the first pair of transverse magnets have polarity alignments antiparallel to one another.

CLAUSE 13: The camera unit of clause 11, further including: the magnets of the second pair of transverse magnets have polarity alignments antiparallel to one another.

CLAUSE 14: The camera unit of clause 11, further including: the magnets of the first pair of transverse magnets have polarity alignments antiparallel to magnets of the second pair of transverse magnets situated on a same side of the axis between the lateral magnet and the optical package.

CLAUSE 15: An actuator, including: a lateral magnet for moving an optical package, wherein the lateral magnet is situated to one side of the optical package, a first pair of first actuator transverse magnets situated on sides opposite one another with respect to an axis between the optical package and the lateral magnet, wherein the lateral magnet is situated one on one side of the optical package at which no transverse magnets are present; and wherein no actuator lateral magnet is situated on a remaining side of the optical package at which nether the lateral magnet nor the transverse magnets are situated.

CLAUSE 16: The actuator of clause 15, further including: coils aligned with current circulating in a plane parallel to a plane in which the lateral magnet and the transverse magnets have polarities aligned.

CLAUSE 17: The actuator of any of clauses 15-16, further including: coils aligned with current circulating in a plane perpendicular to a plane in which the lateral magnet and the transverse magnets have polarities aligned.

CLAUSE 18: The actuator of any of clauses 15-17, further including: a second pair of first actuator transverse magnets situated opposite one another with respect to the axis between the lateral magnet and the optical package.

CLAUSE 19: The actuator of clause 18, wherein: the magnets of the first pair of transverse magnets have polarity alignments antiparallel to one another.

CLAUSE 20: The actuator of clause 18, wherein: the magnets of the second pair of transverse magnets have polarity alignments antiparallel to one another.

CLAUSE 21: A camera system of a multifunction device, including: a first camera unit of a multifunction device for capturing a first image of a first visual field, wherein the first camera unit includes a first optical image stabilization actuator for moving a first optical package configured for a first focal length; and a second camera unit of the multifunction device for simultaneously capturing a second image of a second visual field, wherein the second camera unit includes a second optical image stabilization actuator for moving a second optical package configured for a second focal length, and the first focal length is different from the second focal length.

CLAUSE 22: The camera system of clause 21, wherein: the camera system includes a shared magnet positioned between the first camera unit and the second camera unit to generate magnetic fields usable in creating motion in both the first camera actuator and the second camera actuator.

CLAUSE 23: The camera system of any of clauses 21-22, wherein: the camera system includes a shared magnet positioned between the first camera unit and the second camera unit to generate magnetic fields usable in creating motion in both the first camera actuator and the second camera actuator; the camera system further includes a first actuator lateral magnet positioned opposite the shared magnet with respect to an optical axis of the first camera unit; the camera system further includes a pair of first actuator transverse magnets situated opposite one another with respect to an axis between the shared magnet and the first actuator lateral magnet; the camera system further includes a second actuator lateral magnet positioned opposite the shared magnet with respect to an optical axis of the second camera unit; and the camera system further includes a pair of second actuator transverse magnets situated opposite one another with respect to an axis between the shared magnet and the second actuator lateral magnet.

CLAUSE 24: The camera system of any of clauses 21-23, wherein: the camera system includes a shared magnet holder to which are attached one or more magnets of the first camera unit and one or more magnets of the second camera unit used to generate magnetic fields usable in creating motion in one or more of the first camera actuator and the second camera actuator.

CLAUSE 25: The camera system of any of clauses 21-24, wherein: the camera system includes one or more stationary magnets secured at fixed positions relative to image sensors of the first camera unit and the second camera unit to generate magnetic fields usable in creating motion in one or more of the first camera actuator and the second camera actuator.

CLAUSE 26: The camera system of any of clauses 21-25, wherein: the second camera unit includes a second central magnet array situated along the axis between the first optics package of the first camera unit and the second optics package of the second camera unit; the second central magnet array includes an second central upper magnet having a first polarity and a second central lower magnet having a polarity antiparallel to the first polarity; the second camera unit includes a second distal magnet array situated opposite the second central magnet array with respect to the second optics package of the second camera unit; and the second distal magnet array includes a second distal lower magnet having the first polarity and a second distal upper magnet having the polarity antiparallel to the first polarity.

CLAUSE 27: The camera system of clause 26, wherein: the first camera unit includes a first central magnet array situated along an axis between a first optics package of the first camera unit and a second optics package of the second camera unit; the first central magnet array includes a first central upper magnet having a first polarity and a first central lower magnet having a polarity antiparallel to the first polarity; the first camera unit includes a first distal magnet array situated opposite the first central magnet array with respect to the first optics package of the first camera unit; and the first distal magnet array includes a first distal lower magnet having the first polarity and a first distal upper magnet having the polarity antiparallel to the first polarity.

CLAUSE 28: The camera system of any of clauses 21-27, further including: a magnetic shield between the first optical image stabilization actuator and the second optical image stabilization actuator.

CLAUSE 29: The camera system of any of clauses 21-28, further including: a metallic shield between the first optical image stabilization actuator and the second optical image stabilization actuator, wherein the metallic shield includes steel including at least a quantity of iron, a quantity of manganese, a quantity of Sulphur, a quantity of phosphorus, and a quantity of carbon.

CLAUSE 30: A method, including: a first camera unit of a multifunction device capturing a first image of a first visual field; a second camera unit of the multifunction device simultaneously capturing a second image of a second visual field, wherein the first camera unit includes a first optical package with a first focal length, the second camera unit includes a second optical package with a second focal length, the first focal length is different from the second focal length, and the first visual field is a subset of the second visual field; providing optical image stabilization to the first camera unit; and providing optical image stabilization to the second camera unit.

CLAUSE 31: The method of clause 30, wherein: the providing optical image stabilization to the first camera unit and the providing optical image stabilization to the second camera unit further include moving the first camera unit and the second camera unit independently of one another.

CLAUSE 32: The method of any of clauses 30-31, wherein: the providing optical image stabilization to the first camera unit and the providing optical image stabilization to the second camera unit further include moving the first camera unit and the second camera unit in unison.

CLAUSE 33: The method of any of clauses 30-32, wherein: the providing optical image stabilization to the first camera unit and the providing optical image stabilization to the second camera unit further include generating a first magnetic field in the first camera unit and a second magnetic field in the second camera unit based on a magnet shared between the first camera unit and the second camera unit.

CLAUSE 34: The method of any of clauses 30-33, wherein: the providing optical image stabilization to the first camera unit and the providing optical image stabilization to the second camera unit further include moving the first camera unit and the second camera unit in unison through operation of a first camera unit actuator and a second camera unit actuator that share a central magnet.

CLAUSE 35: The method of any of clauses 30-34, wherein: the providing optical image stabilization to the first camera unit and the providing optical image stabilization to the second camera unit further include moving the first camera unit and the second camera unit in unison through operation of a first camera unit actuator and a second camera unit actuator that share a magnet holder.

CLAUSE 36: A non-transitory computer-readable storage medium, storing program instructions, wherein the program instructions are computer-executable to implement: capturing a first image of a first visual field with a first camera unit of a multifunction device; simultaneously capturing a second image of a second visual field with a second camera unit of the multifunction device, wherein the first camera unit includes a first optical package with a first focal length, the second camera unit includes a second optical package with a second focal length, the first focal length is different from the second focal length, and the first visual field is a subset of the second visual field; providing optical image stabilization to the first camera unit; and providing optical image stabilization to the second camera unit.

CLAUSE 37: The non-transitory computer-readable storage medium of clause 36, wherein: the program instructions computer-executable to implement providing optical image stabilization to the first camera unit and the providing optical image stabilization to the second camera unit further include program instructions computer-executable to implement moving the first camera unit and the second camera unit independently of one another.

CLAUSE 38: The non-transitory computer-readable storage medium of any of clauses 36-37, wherein: the program instructions computer-executable to implement providing optical image stabilization to the first camera unit and the providing optical image stabilization to the second camera unit further include program instructions computer-executable to implement moving the first camera unit and the second camera unit in unison.

CLAUSE 39: The non-transitory computer-readable storage medium of any of clauses 36-38, wherein the program instructions computer-executable to implement providing optical image stabilization to the first camera unit and the program instructions computer-executable to implement providing optical image stabilization to the second camera unit further include program instructions computer-executable to implement generating a first magnetic field in the first camera unit and a second magnetic field in the second camera unit based on a magnet shared between the first camera unit and the second camera unit.

CLAUSE 40: The non-transitory computer-readable storage medium of any of clauses 36-39, wherein: the program instructions computer-executable to implement providing optical image stabilization to the first camera unit and the program instructions computer-executable to implement providing optical image stabilization to the second camera unit further include program instructions computer-executable to implement moving the first camera unit and the second camera unit in unison through operation of a first camera unit actuator and a second camera unit actuator that share a magnet holder.

CLAUSE 41: A camera system of a multifunction device, including: a first camera unit of a multifunction device for capturing a first image of a first visual field, wherein the first camera unit includes a first actuator for moving a first optical package; and a second camera unit of the multifunction device for simultaneously capturing a second image of a second visual field, wherein the second camera unit includes a second actuator for moving a second optical package, the second camera unit includes a second central magnet array situated along the axis between the first optics package of the first camera unit and the second optics package of the second camera unit, the second central magnet array includes a second central upper magnet having a first polarity and a second central lower magnet having a polarity antiparallel to the first polarity, the second camera unit includes a second distal magnet array situated opposite the second central magnet array with respect to the second optics package of the second camera unit, and the second distal magnet array includes a second distal lower magnet having the first polarity and a second distal upper magnet having the polarity antiparallel to the first polarity.

CLAUSE 42: The camera system of clause 41, wherein: the first camera unit includes a first central magnet array situated along an axis between a first optics package of the first camera unit and a second optics package of the second camera unit; the first central magnet array includes a first central upper magnet having a first polarity and a first central lower magnet having a polarity antiparallel to the first polarity; the first camera unit includes a first distal magnet array situated opposite the first central magnet array with respect to the first optics package of the first camera unit; and the first distal magnet array includes a first distal lower magnet having the first polarity and a first distal upper magnet having the polarity antiparallel to the first polarity.

CLAUSE 43: The camera system of any of clauses 41-42, further including: an autofocus coil unit of the second actuator, wherein the autofocus coil unit is situated between the second optical package and the second central magnet array.

CLAUSE 44: The camera system of clause 43, further including: an autofocus coil unit of the second actuator, wherein the autofocus coil unit is situated between the second optical package and the second central magnet array; and an exterior coil unit of the second actuator, wherein the exterior coil unit includes one or more SP coils situated between the second central magnet array and the first camera unit.

CLAUSE 45: The camera system of clause 44, wherein the exterior coil unit includes: an upper exterior coil segment radially surrounding the second optical package and having a current circulating in a first direction around the second optical package, and a lower exterior coil segment radially surrounding the second optical package and having a current circulating in a second direction around the second optical package; and the second direction is opposite the first direction.

CLAUSE 46: The camera system of clause 44, wherein the exterior coil unit includes: an upper exterior coil segment situated at a side of the second optical package and having a current circulating along a side of the second optical package, and a lower exterior coil segment situated at the side of the second optical package and having a current circulating along the side of the second optical package.

CLAUSE 47: The camera system of clause 43, wherein the autofocus coil unit includes: an upper autofocus coil segment radially surrounding the second optical package and having a current circulating in a first direction around the second optical package, and a lower autofocus coil segment radially surrounding the second optical package and having a current circulating in a second direction around the second optical package; and the second direction is opposite the first direction.

CLAUSE 48: A camera unit of a multifunction device, including: an optical package; and an actuator, wherein the actuator includes: one or more magnet arrays including a plurality of magnets arranged at multiple sides of the optical package, one or more autofocus coils arranged between respective ones of the magnet arrays and the optical package, and one or more exterior coils arranged opposite the autofocus coils with respect to the magnet arrays.

CLAUSE 49: The camera unit of clause 48, wherein: the one or more autofocus coils radially surround the optical package.

CLAUSE 50: The camera unit of any of clauses 48-49, wherein: each of the one or more magnet arrays includes an upper magnet having a magnetic field aligned in a first direction inward toward the optical package; and each of the one or more magnet arrays further includes a lower magnet having a magnetic field aligned in a second direction outward from the optical package.

CLAUSE 51: The camera unit of any of clauses 48-50, wherein: each of the one or more magnet arrays includes an upper magnet having a magnetic field aligned in a first direction; and each of the one or more magnet arrays further includes a lower magnet having a magnetic field aligned in a second direction antiparallel to the first direction.

CLAUSE 52: The camera unit of any of clauses 48-51, wherein: the one or more autofocus coils include: an upper autofocus coil segment radially surrounding the second optical package and having a current circulating in a first direction around the second optical package, and a lower autofocus coil segment radially surrounding the second optical package and having a current circulating in a second direction around the second optical package; and the second direction is opposite the first direction.

CLAUSE 53: The camera unit of any of clauses 48-52, wherein the one or more exterior coils include: an upper exterior coil segment radially surrounding the second optical package and having a current circulating in a first direction around the second optical package, and a lower exterior coil segment radially surrounding the second optical package and having a current circulating in a second direction around the second optical package; and the second direction is opposite the first direction.

CLAUSE 54: The camera unit of any of clauses 48-53, the one or more exterior coils include: an upper exterior coil segment situated at a side of the second optical package and having a current circulating along a side of the second optical package, and a lower exterior coil segment situated at the side of the second optical package and having a current circulating along the side of the second optical package in a same direction as the upper exterior coil segment.

CLAUSE 55: A camera system, including: a first camera unit for capturing a first image of a first visual field, wherein the first camera unit includes a first actuator for moving a first optical package within a first range of focal lengths; and a second camera unit for simultaneously capturing a second image of a second visual field, wherein the second visual field is a subset of the first visual field, the second camera unit includes a second actuator for moving a second optical package, the second camera unit includes a second central magnet array situated along the axis between the first optics package of the first camera unit and the second optics package of the second camera unit, the second central magnet array includes a second central upper magnet having a first polarity and a second central lower magnet having a polarity antiparallel to the first polarity.

CLAUSE 56: The camera system of clause 55, wherein: the second camera unit includes a second distal magnet array situated opposite the second central magnet array with respect to the second optics package of the second camera unit, and the second distal magnet array includes a second distal lower magnet having the first polarity and a second distal upper magnet having the polarity antiparallel to the first polarity.

CLAUSE 57: The camera system of any of clauses 55-56, wherein: the first camera unit includes a first central magnet array situated along an axis between a first optics package of the first camera unit and a second optics package of the second camera unit; and the first central magnet array includes a first central upper magnet having a first polarity and a first central lower magnet having a polarity antiparallel to the first polarity.

CLAUSE 58: The camera system of clause 57, wherein: the first camera unit includes a first distal magnet array situated opposite the first central magnet array with respect to the first optics package of the first camera unit; and the first distal magnet array includes a first distal lower magnet having the first polarity and a first distal upper magnet having the polarity antiparallel to the first polarity.

CLAUSE 59: The camera system of any of clauses 55-58, further including: an autofocus coil unit of the second actuator, wherein the autofocus coil unit is situated between the second optical package and the second central magnet array.

CLAUSE 60: The camera system of any of clauses 55-59, further including: an exterior coil unit of the second actuator, wherein the exterior coil unit includes one or more SP coils situated between the second central magnet array and the first camera unit.

CLAUSE 61: A camera system of a multifunction device, including: a first camera unit of a multifunction device for capturing a first image of a first visual field, wherein the first camera unit includes a first actuator for moving a first optical package configured for a first focal length; and a second camera unit of the multifunction device for simultaneously capturing a second image of a second visual field, wherein the second camera unit includes a second actuator for moving a second optical package configured for a second focal length, and the camera system includes a shared magnet positioned between the first camera unit and the second camera unit to generate magnetic fields usable in creating motion in both the first camera actuator and the second camera actuator.

CLAUSE 62: The camera system of clause 61, wherein: the camera system includes a shared magnet holder for the first actuator and the second actuator, to which are attached one or more magnets of the first camera unit and one or more magnets of the second camera unit to generate magnetic fields usable in creating motion in the first camera actuator and the second camera actuator.

CLAUSE 63: The camera system of any of clauses 61-62, wherein: the camera system includes a shared magnet holder for the first actuator and the second actuator, from which the first camera actuator and the second camera actuator are suspended using respective sets of control wires mounted with a pair of control wires in each corner of each respective actuator.

CLAUSE 64: The camera system of any of clauses 61-63, wherein: the camera system includes a shared magnet holder for the first actuator and the second actuator, from which the first camera actuator and the second camera actuator are attached using respective sets of control wires.

CLAUSE 65: The camera system of any of clauses 61-64, wherein: the camera system further includes a first actuator lateral magnet positioned opposite the shared magnet with respect to an optical axis of the first camera unit; the camera system further includes a pair of first actuator transverse magnets situated opposite one another with respect to an axis between the shared magnet and the first actuator lateral magnet; the camera system further includes a second actuator lateral magnet positioned opposite the shared magnet with respect to an optical axis of the second camera unit; and the camera system further includes a pair of second actuator transverse magnets situated opposite one another with respect to an axis between the shared magnet and the second actuator lateral magnet.

CLAUSE 66: The camera system of any of clauses 61-65, wherein: the camera system includes a shared magnet holder to which are attached one or more side-mounted magnets of the first camera unit and one or more side-mounted magnets of the second camera unit used to generate magnetic fields usable in creating motion in one or more of the first camera actuator and the second camera actuator.

CLAUSE 67: The camera system of any of clauses 61-66, wherein: the camera system includes a shared magnet holder to which are movably articulated one or more coils of the first camera unit and one or more corner-mounted magnets of the second camera unit used to usable in creating motion in one or more of the first camera actuator and the second camera actuator.

CLAUSE 68: A camera system of a multifunction device, including: a first camera unit of a multifunction device for capturing a first image of a first visual field, wherein the first camera unit includes a first actuator for moving a first optical package configured for a first focal length; and a second camera unit of the multifunction device for simultaneously capturing a second image of a second visual field, wherein the second camera unit includes a second actuator for moving a second optical package configured for a second focal length, and the camera system includes a shared magnet holder for the first actuator and the second actuator.

CLAUSE 69: The camera system of clause 68, wherein: the camera system includes one or more corner magnets of the first camera unit and one or more corner magnets of the second camera unit to generate magnetic fields usable in creating motion in both the first camera actuator and the second camera actuator, and the corner magnets are attached to the shared magnet holder.

CLAUSE 70: The camera system of any of clauses 68-69, wherein: the camera system includes one or more side magnets of the first camera unit and one or more side magnets of the second camera unit to generate magnetic fields usable in creating motion in both the first camera actuator and the second camera actuator, and the magnets are attached to the shared magnet holder.

CLAUSE 71: The camera system of any of clauses 68-70, wherein: the camera system includes one or more magnets of the first camera unit and one or more magnets of the second camera unit to generate magnetic fields usable in creating motion in both the first camera actuator and the second camera actuator, the magnets are attached to the shared magnet holder, and the magnets include a magnet shared between the first camera unit and the second camera unit.

CLAUSE 72: The camera system of any of clauses 68-71, wherein: the first camera actuator and the second actuator are attached to the shared magnet holder using respective sets of control wires mounted with a pair of control wires in each corner of each respective actuator.

CLAUSE 73: The camera system of any of clauses 68-72, wherein: the first camera actuator and the second actuator are suspended from the shared magnet holder using respective sets of control wires mounted in each corner of each respective actuator.

CLAUSE 74: The camera system of any of clauses 68-73, wherein: the camera system further includes a first actuator lateral magnet positioned opposite the shared magnet with respect to an optical axis of the first camera unit; the camera system further includes a pair of first actuator transverse magnets situated opposite one another with respect to an axis between the shared magnet and the first actuator lateral magnet; the camera system further includes a second actuator lateral magnet positioned opposite the shared magnet with respect to an optical axis of the second camera unit; and the camera system further includes a pair of second actuator transverse magnets situated opposite one another with respect to an axis between the shared magnet and the second actuator lateral magnet.

CLAUSE 75: A camera unit of a multifunction device, including: an optical package; and an actuator, wherein the actuator includes: one or more magnets arranged at multiple sides of the optical package, wherein one of the one or more magnets is shared with a second actuator for moving a second optical package, one or more autofocus coils arranged between respective ones of the magnets and the optical package.

CLAUSE 76: The camera unit of clause 75, wherein: the one or more autofocus coils radially surround the optical package.

CLAUSE 77: The camera system of any of clauses 75-76, wherein: the actuator is attached to a magnet holder of the camera using respective sets of control wires mounted with a pair of control wires in each corner of each respective actuator.

CLAUSE 78: The camera system of any of clauses 75-77, wherein: the actuator is articulated to a magnet holder of the camera using respective sets of control wires mounted with a pair of control wires in each corner of the actuator, wherein the magnet holder is shared with one or more magnets of the second actuator.

CLAUSE 79: The camera system of any of clauses 75-78, wherein: the actuator is attached to a magnet holder of the camera using a control wire mounted control wires in each corner of the actuator.

CLAUSE 80: The camera system of any of clauses 75-79, wherein: the actuator is suspended from a magnet holder of the camera using a control wire mounted control wires in each corner of the actuator.

CLAUSE 81: A camera system, comprising: a first camera unit including: a first voice coil motor (VCM) actuator configured to move a first optical package, wherein the first VCM actuator includes a symmetric magnet arrangement; and a second camera unit disposed adjacent to the first camera unit, the second camera unit including a second VCM actuator configured to move a second optical package, wherein the second VCM actuator includes an asymmetric magnet arrangement.

CLAUSE 82: The camera system of clause 81, wherein: the first optical package includes one or more lenses that define an optical axis; and the first VCM actuator is configured to move the first optical package along the optical axis and along a plane that is orthogonal to the optical axis.

CLAUSE 83: The camera system of any of clauses 81-82, wherein: the second optical package includes one or more lenses that define an optical axis; and the second VCM actuator is configured to move the second optical package along the optical axis and along a plane that is orthogonal to the optical axis.

CLAUSE 84: The camera system of clause 81, wherein: the first optical package includes one or more lenses that define a first optical axis; the first VCM actuator is configured to move the first optical package along the first optical axis and along a first plane that is orthogonal to the first optical axis; the second optical package includes one or more lenses that define a second optical axis; and the second VCM actuator is configured to move the second optical package along the second optical axis and along a second plane that is orthogonal to the second optical axis.

CLAUSE 85: The camera system of any of clauses 81-84, wherein: the first camera unit is rectangular in plan; and the symmetric magnet arrangement of the first VCM actuator includes four magnets that are individually arranged to exhibit mirror symmetry about a respective plane that is angled at or about 45 degrees to at least one side of the first camera unit.

CLAUSE 86: The camera system of any of clauses 81-85, wherein: the first optical package includes one or more lenses that define an optical axis; and the first VCM actuator further includes a symmetric optical image stabilization coil arrangement for actuation along a plane that is orthogonal to the optical axis.

CLAUSE 87: The camera system of any of clauses 81-86, wherein: the first camera unit is rectangular in plan; and the symmetric optical image stabilization coil arrangement of the first VCM actuator includes four optical image stabilization coils that are individually arranged to exhibit mirror symmetry about a respective plane that is angled at or about 45 degrees to at least one side of the first camera unit.

CLAUSE 88: The camera system of any of clauses 81-87, wherein: the first optical package includes one or more lenses that define an optical axis; and the first VCM actuator further includes an autofocus coil radially surrounding the first optical package for actuation along the optical axis.

CLAUSE 89: The camera system of any of clauses 81-88, wherein: the second camera unit is rectangular in plan; the asymmetric magnet arrangement of the second VCM actuator includes: a first magnet disposed proximate a first side of the second camera unit; a second magnet disposed proximate a second side of the second camera unit; and a third magnet disposed proximate a third side of the second camera unit, the third side opposite the second side; and no magnets are disposed proximate a fourth side of the second camera unit, the fourth side opposite the first side.

CLAUSE 90: The camera system of any of clauses 81-89, wherein: the second optical package includes one or more lenses that define an optical axis; and the second VCM actuator further includes: an asymmetric optical image stabilization coil arrangement for actuation along a plane that is orthogonal to the optical axis, the asymmetric optical image stabilization coil arrangement including: a first optical image stabilization coil disposed proximate the first magnet; a second optical image stabilization coil disposed proximate the second magnet; and a third optical image stabilization coil disposed proximate the third magnet; a plurality of autofocus coils for actuation along the optical axis, the plurality of autofocus coils including: a first autofocus coil disposed proximate the second magnet; and a second autofocus coil disposed proximate the third magnet.

CLAUSE 91: The camera system of any of clauses 81-90, wherein: the first camera unit is rectangular in plan; the second camera unit is rectangular in plan; the first camera unit is disposed adjacent to the second camera unit along a first axis that intersects a second axis, the second axis extending through the first optical package and the second optical package; the symmetric magnet arrangement of the first VCM actuator includes four magnets that are individually disposed proximate a respective corner of the first camera unit and individually arranged to exhibit mirror symmetry about a respective plane that is angled at or about 45 degrees to at least one side of the first camera unit; the asymmetric magnet arrangement of the second VCM actuator includes a magnet disposed proximate a first side of the second camera unit that is distal to the first axis, the magnet having a longitudinal axis that is parallel to the first axis; and no magnets are disposed proximate a second side of the second camera unit that is opposite the first side of the second camera unit and proximate the first axis, the second side extending in a direction parallel to the first axis.

CLAUSE 92: A mobile multifunction device, comprising: a first camera unit including: a first voice coil motor (VCM) actuator configured to move a first optical package, wherein: the first optical package includes one or more lenses that define a first optical axis; and the first VCM actuator includes a symmetric optical image stabilization coil arrangement for actuation along a plane that is orthogonal to the first optical axis; and a second camera unit including: a second VCM actuator configured to move a second optical package, wherein: the second optical package includes one or more lenses that define a second optical axis; and the second VCM actuator includes an asymmetric optical image stabilization coil arrangement for actuation along a plane that is orthogonal to the second optical axis.

CLAUSE 93: The mobile multifunction device of clause 92, wherein: the first VCM actuator is configured to move the first optical package along the first optical axis and along a first plane that is orthogonal to the first optical axis; and the second VCM actuator is configured to move the second optical package along the second optical axis and along a second plane that is orthogonal to the second optical axis.

CLAUSE 94: The mobile multifunction device of any of clauses 92-93, wherein: the first VCM actuator further includes: a symmetric magnet arrangement; and an autofocus coil for actuation along the first optical axis, the autofocus coil radially surrounding the first optical package; and the second VCM actuator further includes: an asymmetric magnet arrangement; and autofocus coils for actuation along the second optical axis.

CLAUSE 95: The mobile multifunction device of any of clauses 92-94, wherein: the first camera unit is rectangular in plan; the second camera unit is rectangular in plan; the first camera unit is disposed adjacent to the second camera unit along a first axis that intersects a second axis, the second axis extending through the first optical package and the second optical package; the symmetric magnet arrangement of the first VCM actuator includes four magnets that are individually disposed proximate a respective corner of the first camera unit and individually arranged to exhibit mirror symmetry about a respective plane that is angled at or about 45 degrees to at least one side of the first camera unit; the asymmetric magnet arrangement of the second VCM actuator includes a first magnet disposed proximate a first side of the second camera unit that is distal to the first axis, the first magnet having a longitudinal axis that is parallel to the first axis; and no magnets are disposed proximate a second side of the second camera unit that is opposite the first side of the second camera unit and proximate the first axis, the second side extending in a direction parallel to the first axis.

CLAUSE 96: The mobile multifunction device of any of clauses 92-95, wherein: the asymmetric magnet arrangement further includes: a second magnet disposed proximate a third side of the second camera unit; and a third magnet disposed proximate a fourth side of the second camera unit that is opposite the third side; and at least one of the second magnet or the third magnet is a dual pole magnet.

CLAUSE 97: A system, comprising: a first voice coil motor (VCM) actuator that includes a symmetric magnet arrangement; and a second VCM actuator disposed adjacent to the first VCM actuator, wherein the second VCM actuator includes an asymmetric magnet arrangement.

CLAUSE 98: The system of clause 97, wherein: the symmetric magnet arrangement of the first VCM actuator includes: a first single pole magnet; and a second single pole magnet; and the asymmetric magnet arrangement of the second VCM actuator includes: a first dual pole magnet disposed proximate the first single pole magnet of the symmetric magnet arrangement of the first VCM actuator; and a second dual pole magnet disposed proximate the second single pole magnet of the symmetric magnet arrangement of the first VCM actuator.

CLAUSE 99: The system of any of clauses 97-98, wherein: the first VCM actuator is part of a first module that is rectangular in plan; the second VCM actuator is part of a second module that is rectangular in plan; the symmetric magnet arrangement of the first VCM actuator includes four magnets that are individually arranged to exhibit mirror symmetry about a respective plane that is angled at or about 45 degrees to at least one side of the first module; the asymmetric magnet arrangement of the second VCM actuator includes: a first magnet disposed proximate a first side of the second module; a second magnet disposed proximate a second side of the second module; and a third magnet disposed proximate a third side of the second module, the third side opposite the second side; and no magnets are disposed proximate a fourth side of the second module, the fourth side opposite the first side.

CLAUSE 100: The system of any of clauses 97-99, wherein: the first VCM actuator further includes a symmetric coil arrangement, wherein the symmetric coil arrangement includes multiple coils that are individually configured to interact with at least one magnet of the symmetric magnet arrangement at least partly responsive to receiving a current; and the second VCM actuator further includes an asymmetric coil arrangement, wherein the asymmetric coil arrangement includes multiple coils that are individually configured to interact with at least one magnet of the asymmetric magnet arrangement at least partly responsive to receiving a current.

Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An actuator module for a camera, comprising:
an optical package defining an optical axis; and
an actuator configured to move the optical package for image stabilization or for autofocus, the actuator comprising:
a plurality of coils, wherein a coil of the plurality of coils radially surrounds the optical axis, and
a magnet array having one or more sets of vertically stacked magnets vertically stacked along an optical axis of the optical package, wherein multiple coils of the plurality of coils interact with at least one magnet of a set of vertically stacked magnets of the one or more sets of vertically stacked magnets to move the optical package along a same axis.

2. The actuator module of claim 1, wherein:
the one or more sets of magnets are arranged at multiple sides of the optical package;
the plurality of coils includes one or more autofocus coils and one or more OIS coils;
the one or more autofocus coils are arranged between respective magnets of the one or more sets of magnets and the optical package; and
the one or more OIS coils are arranged opposite the one or more autofocus coils with respect to the one or more sets of magnets.

3. The actuator module of claim 1, wherein the coil of the plurality of coils radially surrounds the optical package.

4. The actuator module of claim 1, wherein:
the one or more sets of magnets comprise a respective upper magnet having a magnetic field aligned in a first direction inward toward the optical package; and
the one or more sets of magnets further comprise a respective lower magnet having a magnetic field aligned in a second direction outward from the optical package.

5. The actuator module of claim 1, wherein the one or more sets of magnets comprise:
a respective upper magnet having a magnetic field aligned in a first direction; and
a respective lower magnet having a magnetic field aligned in a second direction antiparallel to the first direction.

6. The actuator module of claim 1, wherein the plurality of coils comprises:
an upper autofocus coil segment radially surrounding the optical package and having a current circulating in a first direction around the optical package; and
a lower autofocus coil segment radially surrounding the optical package and having a current circulating in a second direction around the optical package, wherein the second direction is opposite the first direction.

7. The actuator module of claim 1, wherein the plurality of coils comprises:
one or more OIS coils including:
an upper exterior coil segment radially surrounding the optical package and positioned at an upper location along the optical axis of the optical package, and
a lower exterior coil segment radially surrounding the optical package and positioned at a lower location along the optical axis of the optical package, wherein the upper exterior coil segment comprises a current circulating in a first direction around the optical package, wherein the lower exterior coil segment comprises a current circulating in a second direction around the optical package, and wherein the second direction is opposite the first direction.

8. A camera, comprising:
an optical package defining an optical axis;
an image sensor configured to capture an image based on light refracted through the optical package; and
an actuator module for moving the optical package relative to the image sensor for at least one of optical image stabilization (OIS) or autofocus, the actuator module comprising:
   a plurality of coils, wherein a coil of the plurality of coils radially surrounds the optical axis, and
   a magnet array having one or more sets of vertically stacked magnets vertically stacked along an optical axis of the optical package, wherein multiple coils of the plurality of coils interact with at least one magnet of a set of vertically stacked magnets of the one or more sets of vertically stacked magnets to move the optical package along a same axis.

9. The camera of claim 8, wherein:
the camera comprises a first camera;
the actuator module comprises a first actuator module;
the optical package comprises a first optical package;
the magnet array comprising a first central magnet array;
the coil of the plurality of coils is situated between the first optical package and the first central magnet array;
the first central magnet array situated along an axis between the first optical package of the first camera and a second optical package of a second camera;
the first central magnet array comprises a first central upper magnet having a first polarity and a first central lower magnet having a second polarity antiparallel to the first polarity;
the first actuator module comprises a first distal magnet array situated opposite the first central magnet array with respect to the first optical package of the first camera; and
the first distal magnet array comprises a first distal lower magnet having the first polarity and a first distal upper magnet having the second polarity antiparallel to the first polarity.

10. The camera of claim 9, wherein the plurality of coils comprises an exterior coil unit, wherein the exterior coil unit comprises one or more OIS coils.

11. The camera of claim 10, wherein:
the exterior coil unit comprises:
   an upper exterior coil segment radially surrounding the first optical package and having a current circulating in a first direction around the first optical package, and
   a lower exterior coil segment radially surrounding the first optical package and having a current circulating in a second direction around the first optical package; and
   the second direction is opposite the first direction.

12. The camera of claim 10, wherein the exterior coil unit comprises:
an upper exterior coil segment situated at a side of the first optical package and having a current circulating along a side of the first optical package, and
a lower exterior coil segment situated at the side of the first optical package and having a current circulating along the side of the first optical package.

13. The camera of claim 8, wherein:
the plurality of coils comprises one or more OIS coils;
the one or more OIS coils comprise:
   an upper exterior coil segment radially surrounding the optical package and having a current circulating in a first direction around the optical package, and
   a lower exterior coil segment radially surrounding the optical package and having a current circulating in a second direction around the optical package; and
   the second direction is opposite the first direction.

14. The camera of claim 8, wherein:
the plurality of coils comprises:
   an upper autofocus coil segment radially surrounding the optical package and positioned at an upper location along an optical axis of the optical package, and
   a lower autofocus coil segment radially surrounding the optical package and positioned at a lower location along the optical axis of the optical package;
the upper autofocus coil segment comprises a current circulating in a first direction around the optical package;
the lower autofocus coil segment comprises a current circulating in a second direction around the optical package; and
the second direction is opposite the first direction.

15. A device, comprising:
a camera comprising:
   an optical package defining an optical axis,
   an image sensor configured to capture an image based on light refracted through the optical package, and
   an actuator module for moving the optical package relative to the image sensor for at least one of optical image stabilization (OIS) or autofocus, the actuator module comprising:
      the plurality of coils, wherein a coil of the plurality of coils radially surrounds the optical axis, and
      a magnet array having one or more sets of vertically stacked magnets vertically stacked along the optical axis of the optical package, wherein multiple coils of the plurality of coils interact with at least one magnet of a set of vertically stacked magnets of the one or more sets of vertically stacked magnets to move the optical package along a same axis;
a display; and
a processor and a memory storing program instructions executable by the processor to cause the image to be displayed on the display.

16. The device of claim 15, wherein:
the actuator module comprises a distal magnet array situated opposite the magnet array with respect to the optical package, and
the distal magnet array comprises a distal lower magnet having a first polarity and a second distal upper magnet having a second polarity antiparallel to the first polarity.

17. The device of claim 16, wherein:
the magnet array comprises an upper magnet having a third polarity and a lower magnet having a fourth polarity antiparallel to the third polarity.

18. The device of claim 17, wherein:
the actuator module further comprises a first distal magnet array situated opposite the magnet array with respect to the optical package; and
the first distal magnet array comprises a first distal lower magnet having a fifth polarity and a first distal upper magnet having a sixth polarity antiparallel to the fifth polarity.

19. The device of claim 15, wherein the plurality of coils includes one or more autofocus coils that are situated between the optical package and the magnet array.

20. The device of claim 15, wherein the plurality of coils includes one or more OIS coils comprising:

an upper exterior coil segment radially surrounding the optical package and positioned at an upper location along the optical axis of the optical package; and a lower exterior coil segment radially surrounding the optical package and positioned at a lower location along the optical axis of the optical package, wherein the upper exterior coil segment comprises a current circulating along a side of the optical package, and wherein the lower exterior coil segment comprises a current circulating along the side of the optical package.

* * * * *